US010300374B2

United States Patent
Briggs et al.

(10) Patent No.: US 10,300,374 B2
(45) Date of Patent: *May 28, 2019

(54) MULTI-PLATFORM GAMING SYSTEMS AND METHODS

(71) Applicant: MQ GAMING, LLC, Irvine, CA (US)

(72) Inventors: Rick A. Briggs, Springfield, IL (US); Denise Chapman Weston, Wakefield, RI (US)

(73) Assignee: MQ Gaming, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/829,528

(22) Filed: Dec. 1, 2017

(65) Prior Publication Data

US 2018/0214769 A1 Aug. 2, 2018

Related U.S. Application Data

(63) Continuation of application No. 15/647,652, filed on Jul. 12, 2017, now Pat. No. 9,861,887, which is a
(Continued)

(51) Int. Cl.
*A63F 13/213* (2014.01)
*A63F 13/235* (2014.01)
(Continued)

(52) U.S. Cl.
CPC .............. *A63F 13/213* (2014.09); *A63F 9/24* (2013.01); *A63F 13/08* (2013.01); *A63F 13/23* (2014.09);
(Continued)

(58) Field of Classification Search
CPC ...... A63F 13/213; A63F 13/23; A63F 13/235; A63F 13/25; A63F 13/655; A63F 13/79;
(Continued)

(56) References Cited

U.S. PATENT DOCUMENTS

| 973,105 A | 10/1910 | Chamberlain, Jr. |
| 1,661,058 A | 2/1928 | Theremin |

(Continued)

FOREIGN PATENT DOCUMENTS

| CN | 1032246 | 4/1989 |
| CN | 2113224 U | 2/1992 |

(Continued)

OTHER PUBLICATIONS

U.S. Pat. No. 6,634,949, Non-Final Rejection, dated May 21, 2002, Response after Non-Final Action, dated Nov. 21, 2002, Notice of Allowance, dated Jan. 27, 2003.

(Continued)

*Primary Examiner* — Omkar A Deodhar
*Assistant Examiner* — Matthew D Hoel
(74) *Attorney, Agent, or Firm* — Knobbe, Martens, Olson & Bear, LLP

(57) ABSTRACT

A multi-media interactive play system has a number of play elements situated in a variety of play environments or play media. The play elements are linked to a common record of participant performance, progress, character attributes, etc. The participant's performance in the play elements determines the play elements to which the participant may proceed as well as the play parameters of the play element in which the participant is currently involved. The play elements are thus interlinked to define a sequence or path network along which the participant advances. By advancing through the play elements the participant carries out a plot, story, theme, etc. that attaches a significance to the successful completion of a given play element or elements. Also disclosed in a variety of play elements suitable for use in the system, an example of a plot or theme that may be carried out by the system, and a send/receive radio fre- (Continued)

quency network that may be used to track play participants in a play center.

20 Claims, 10 Drawing Sheets

Related U.S. Application Data continuation of application No. 15/280,793, filed on Sep. 29, 2016, now Pat. No. 9,731,194, which is a continuation of application No. 14/874,306, filed on Oct. 2, 2015, now Pat. No. 9,468,854, which is a continuation of application No. 14/310,522, filed on Jun. 20, 2014, now Pat. No. 9,186,585, which is a continuation of application No. 13/846,762, filed on Mar. 18, 2013, now Pat. No. 8,758,136, which is a continuation of application No. 13/723,717, filed on Dec. 21, 2012, now Pat. No. 8,888,576, which is a continuation of application No. 12/829,905, filed on Jul. 2, 2010, now Pat. No. 8,342,929, which is a continuation of application No. 09/545,658, filed on Apr. 10, 2000, now Pat. No. 7,749,089, which is a continuation-in-part of application No. 09/514,480, filed on Feb. 28, 2000, now Pat. No. 6,634,949.

(60) Provisional application No. 60/128,318, filed on Apr. 8, 1999, provisional application No. 60/122,137, filed on Feb. 26, 1999.

(51) Int. Cl.
*A63F 13/25* (2014.01)
*A63F 13/79* (2014.01)
*A63F 9/24* (2006.01)
*G07F 17/32* (2006.01)
*A63F 13/90* (2014.01)
*A63F 13/23* (2014.01)
*A63F 13/655* (2014.01)
*A63F 13/77* (2014.01)
*A63F 13/95* (2014.01)
*A63F 9/18* (2006.01)
*A63F 11/00* (2006.01)

(52) U.S. Cl.
CPC ............ *A63F 13/235* (2014.09); *A63F 13/25* (2014.09); *A63F 13/655* (2014.09); *A63F 13/77* (2014.09); *A63F 13/79* (2014.09); *A63F 13/95* (2014.09); *G07F 17/32* (2013.01); *G07F 17/3223* (2013.01); *G07F 17/3239* (2013.01); *A63F 9/183* (2013.01); *A63F 2009/2401* (2013.01); *A63F 2009/245* (2013.01); *A63F 2009/2489* (2013.01); *A63F 2011/0097* (2013.01)

(58) Field of Classification Search
CPC .. A63F 13/95; A63F 9/183; A63F 2009/2401; A63F 2009/245; A63F 2009/2489; A63F 2011/0097
See application file for complete search history.

(56) References Cited

U.S. PATENT DOCUMENTS

| | | |
|---|---|---|
| 1,789,680 A | 1/1931 | Gwinnett |
| 2,001,366 A | 5/1935 | Mittelman |
| 2,752,725 A | 7/1956 | Unsworth |
| 2,902,023 A | 9/1959 | Waller |
| 3,135,512 A | 6/1964 | Taylor |
| 3,336,030 A | 8/1967 | Martell et al. |
| 3,395,920 A | 8/1968 | Moe |
| 3,454,920 A | 7/1969 | Mehr |
| 3,456,134 A | 7/1969 | Ko |
| 3,468,533 A | 9/1969 | House, Jr. |
| 3,474,241 A | 10/1969 | Kuipers |
| D220,268 S | 3/1971 | Kliewer |
| 3,572,712 A | 3/1971 | Vick |
| 3,633,904 A | 1/1972 | Kojima |
| 3,660,648 A | 5/1972 | Kuipers |
| 3,660,926 A | 5/1972 | Lerner et al. |
| 3,707,055 A | 12/1972 | Pearce |
| 3,795,805 A | 3/1974 | Swanberg et al. |
| 3,843,127 A | 10/1974 | Lack |
| 3,949,364 A | 4/1976 | Clark et al. |
| 3,949,679 A | 4/1976 | Barber |
| 3,973,257 A | 8/1976 | Rowe |
| 3,978,481 A | 8/1976 | Angwin et al. |
| 3,997,156 A | 12/1976 | Barlow et al. |
| 4,009,619 A | 3/1977 | Snymann |
| 4,038,876 A | 8/1977 | Morris |
| 4,055,341 A | 10/1977 | Martinez |
| 4,063,111 A | 12/1977 | Dobler et al. |
| 4,153,250 A | 5/1979 | Anthony |
| 4,166,406 A | 9/1979 | Maughmer |
| 4,171,737 A | 10/1979 | McLaughlin |
| 4,175,665 A | 11/1979 | Dogliotti |
| 4,205,785 A | 6/1980 | Stanley |
| 4,231,077 A * | 10/1980 | Joyce ................. A63H 33/22 362/109 |
| 4,240,638 A | 12/1980 | Morrison et al. |
| 4,282,681 A | 8/1981 | McCaslin |
| 4,287,765 A | 9/1981 | Kreft |
| 4,296,929 A | 10/1981 | Meyer et al. |
| 4,303,978 A | 12/1981 | Shaw |
| 4,318,245 A | 3/1982 | Stowell et al. |
| 4,321,678 A | 3/1982 | Krogmann |
| 4,325,199 A | 4/1982 | McEdwards |
| 4,337,948 A | 7/1982 | Breslow |
| 4,342,985 A | 8/1982 | Desjardins |
| 4,402,250 A | 9/1983 | Baasch |
| 4,412,205 A | 10/1983 | Von Kemenczky |
| 4,425,488 A | 1/1984 | Moskin |
| 4,443,866 A | 4/1984 | Burgiss |
| 4,450,325 A | 5/1984 | Luque |
| 4,503,299 A | 3/1985 | Henrard |
| 4,514,600 A | 4/1985 | Lentz |
| 4,514,798 A | 4/1985 | Lesche |
| 4,540,176 A | 9/1985 | Baer |
| 4,546,551 A | 10/1985 | Franks |
| 4,558,604 A | 12/1985 | Auer |
| 4,561,299 A | 12/1985 | Orlando |
| 4,575,621 A | 3/1986 | Dreifus |
| 4,578,674 A | 3/1986 | Baker et al. |
| 4,595,369 A | 6/1986 | Downs |
| 4,623,887 A | 11/1986 | Welles |
| 4,623,930 A | 11/1986 | Oshima |
| 4,627,620 A | 12/1986 | Yang |
| 4,645,458 A | 2/1987 | Williams |
| 4,672,374 A | 6/1987 | Desjardins |
| 4,678,450 A * | 7/1987 | Scolari ................. A63H 33/009 315/241 P |
| 4,695,058 A * | 9/1987 | Carter, III ................. F41J 5/02 434/16 |
| 4,695,953 A | 9/1987 | Blair et al. |
| 4,699,379 A | 10/1987 | Chateau et al. |
| 4,700,501 A | 10/1987 | Bryan |
| 4,729,751 A | 3/1988 | Schiavo et al. |
| 4,739,128 A | 4/1988 | Grisham |
| 4,750,733 A | 6/1988 | Foth |
| 4,761,540 A | 8/1988 | McGeorge |
| 4,776,253 A | 10/1988 | Downes |
| 4,787,051 A | 11/1988 | Olson |
| 4,807,031 A | 2/1989 | Broughton et al. |
| 4,816,810 A | 3/1989 | Moore |
| 4,817,950 A | 4/1989 | Goo |
| 4,819,182 A | 4/1989 | King et al. |
| 4,837,568 A | 6/1989 | Snaper et al. |
| 4,839,838 A | 6/1989 | LaBiche et al. |

(56) References Cited

U.S. PATENT DOCUMENTS

| | | | |
|---|---|---|---|
| 4,843,568 A * | 6/1989 | Krueger | G06F 3/011 |
| | | | 345/632 |
| 4,849,655 A | 7/1989 | Bennett | |
| 4,851,685 A | 7/1989 | Dubgen | |
| 4,858,390 A | 8/1989 | Kenig | |
| 4,858,930 A | 8/1989 | Sato | |
| 4,862,165 A | 8/1989 | Gart | |
| 4,882,717 A | 11/1989 | Hayakawa et al. | |
| 4,891,032 A * | 1/1990 | Davis | A63H 33/00 |
| | | | 446/484 |
| 4,904,222 A * | 2/1990 | Gastgeb | A63H 5/00 |
| | | | 310/331 |
| 4,910,677 A | 3/1990 | Remedio et al. | |
| 4,914,598 A | 4/1990 | Krogmann | |
| 4,918,293 A | 4/1990 | McGeorge | |
| 4,924,358 A * | 5/1990 | Von Heck | F21K 2/06 |
| | | | 362/102 |
| 4,932,917 A | 6/1990 | Klitsner | |
| 4,957,291 A | 9/1990 | Miffitt | |
| 4,960,275 A | 10/1990 | Magon | |
| 4,961,369 A | 10/1990 | McGill | |
| 4,964,837 A | 10/1990 | Collier | |
| 4,967,321 A * | 10/1990 | Cimock | A63H 33/00 |
| | | | 362/101 |
| 4,969,647 A | 11/1990 | Mical et al. | |
| 4,980,519 A | 12/1990 | Mathews | |
| 4,988,981 A | 1/1991 | Zimmerman et al. | |
| 4,994,795 A | 2/1991 | MacKenzie | |
| 5,011,161 A | 4/1991 | Galphin | |
| 5,036,442 A * | 7/1991 | Brown | A63B 15/00 |
| | | | 362/102 |
| RE33,662 E | 8/1991 | Blair et al. | |
| 5,045,843 A | 9/1991 | Hansen | |
| 5,048,831 A | 9/1991 | Sides | |
| D320,624 S | 10/1991 | Taylor | |
| 5,058,480 A | 10/1991 | Suzuki et al. | |
| 5,059,958 A | 10/1991 | Jacobs et al. | |
| 5,062,696 A | 11/1991 | Oshima | |
| 5,068,645 A | 11/1991 | Drumm | |
| D322,242 S | 12/1991 | Cordell | |
| 5,076,584 A | 12/1991 | Openiano | |
| D325,225 S | 4/1992 | Adhida | |
| 5,114,155 A | 5/1992 | Tillery et al. | |
| 5,114,344 A | 5/1992 | Fumagalli et al. | |
| 5,124,938 A | 6/1992 | Algrain | |
| 5,127,657 A * | 7/1992 | Ikezawa | A63F 9/0291 |
| | | | 434/21 |
| 5,128,671 A | 7/1992 | Thomas, Jr. | |
| D328,463 S | 8/1992 | King et al. | |
| 5,136,222 A | 8/1992 | Yamamoto | |
| 5,138,154 A | 8/1992 | Hotelling | |
| 5,145,446 A * | 9/1992 | Kuo | A63H 5/04 |
| | | | 446/405 |
| D331,058 S | 11/1992 | Morales | |
| 5,166,502 A | 11/1992 | Rendleman | |
| 5,170,002 A * | 12/1992 | Suzuki | G10H 1/00 |
| | | | 84/600 |
| 5,175,481 A | 12/1992 | Kanno | |
| 5,177,311 A * | 1/1993 | Suzuki | G10H 1/00 |
| | | | 84/600 |
| 5,178,477 A | 1/1993 | Gambaro | |
| 5,181,181 A | 1/1993 | Glynn | |
| 5,184,830 A | 2/1993 | Okada et al. | |
| 5,188,368 A | 2/1993 | Ryan | |
| 5,190,285 A | 3/1993 | Levy et al. | |
| 5,192,082 A | 3/1993 | Inoue et al. | |
| 5,192,823 A * | 3/1993 | Suzuki | G10H 1/00 |
| | | | 84/600 |
| 5,194,006 A | 3/1993 | Zaenglein, Jr. | |
| 5,194,048 A | 3/1993 | Briggs | |
| 5,202,844 A | 4/1993 | Kamio | |
| 5,203,563 A | 4/1993 | Loper, III | |
| 5,207,426 A | 5/1993 | Inoue et al. | |
| 5,212,368 A | 5/1993 | Hara | |
| 5,213,327 A | 5/1993 | Kitaue | |
| 5,220,260 A | 6/1993 | Schuler | |
| 5,223,698 A | 6/1993 | Kapur | |
| 5,231,568 A | 7/1993 | Cohen et al. | |
| D338,242 S | 8/1993 | Cordell | |
| 5,232,223 A * | 8/1993 | Dornbusch | A63F 13/005 |
| | | | 43/4 |
| 5,236,200 A | 8/1993 | McGregor et al. | |
| 5,247,651 A | 9/1993 | Clarisse | |
| D340,042 S | 10/1993 | Copper et al. | |
| 5,259,626 A | 11/1993 | Ho | |
| 5,262,777 A | 11/1993 | Low et al. | |
| D342,256 S | 12/1993 | Payne et al. | |
| 5,277,645 A * | 1/1994 | Kelley | A63H 3/36 |
| | | | 221/227 |
| 5,279,513 A * | 1/1994 | Connelly | A63H 33/009 |
| | | | 446/219 |
| 5,280,744 A | 1/1994 | DeCarlo | |
| D345,164 S | 3/1994 | Grae | |
| 5,290,964 A | 3/1994 | Hiyoshi et al. | |
| 5,292,124 A * | 3/1994 | Carpenter | A63B 67/08 |
| | | | 273/109 |
| 5,292,254 A | 3/1994 | Miller et al. | |
| 5,296,871 A | 3/1994 | Paley | |
| 5,299,967 A | 4/1994 | Gilbert | |
| 5,307,325 A | 4/1994 | Scheiber | |
| 5,310,192 A | 5/1994 | Miyake | |
| 5,317,394 A | 5/1994 | Hale | |
| 5,319,548 A | 6/1994 | Germain | |
| 5,320,358 A * | 6/1994 | Jones | A63B 63/00 |
| | | | 273/371 |
| 5,320,362 A * | 6/1994 | Bear | A63F 9/0291 |
| | | | 273/445 |
| 5,325,719 A | 7/1994 | Petri et al. | |
| 5,329,276 A * | 7/1994 | Hirabayashi | A61F 4/00 |
| | | | 340/870.31 |
| 5,332,322 A | 7/1994 | Gambaro | |
| 5,339,095 A | 8/1994 | Redford | |
| D350,736 S | 9/1994 | Takahashi et al. | |
| D350,782 S | 9/1994 | Barr | |
| D351,430 S | 10/1994 | Barr | |
| 5,354,057 A * | 10/1994 | Pruitt | A63B 69/02 |
| | | | 273/454 |
| 5,356,343 A * | 10/1994 | Lovetere | A63J 21/00 |
| | | | 362/102 |
| 5,357,267 A | 10/1994 | Inoue | |
| 5,359,321 A | 10/1994 | Ribic | |
| 5,359,348 A | 10/1994 | Pilcher et al. | |
| 5,362,271 A | 11/1994 | Butt | |
| 5,363,120 A | 11/1994 | Drumm | |
| 5,365,214 A | 11/1994 | Angott et al. | |
| 5,366,229 A | 11/1994 | Suzuki | |
| 5,369,580 A | 11/1994 | Monji | |
| 5,369,889 A | 12/1994 | Callaghan | |
| 5,372,365 A | 12/1994 | McTeigue et al. | |
| 5,373,857 A | 12/1994 | Travers et al. | |
| 5,378,197 A | 1/1995 | Briggs | |
| 5,382,026 A * | 1/1995 | Harvard | A63F 9/0291 |
| | | | 463/30 |
| 5,393,074 A * | 2/1995 | Bear | A63F 9/0291 |
| | | | 273/440 |
| 5,396,227 A | 3/1995 | Carroll et al. | |
| 5,396,265 A | 3/1995 | Ulrich et al. | |
| 5,403,238 A | 4/1995 | Baxter et al. | |
| 5,405,294 A | 4/1995 | Briggs | |
| 5,411,269 A | 5/1995 | Thomas | |
| 5,414,337 A | 5/1995 | Schuler | |
| 5,416,535 A | 5/1995 | Sato et al. | |
| 5,421,575 A | 6/1995 | Triner | |
| 5,421,590 A | 6/1995 | Robbins | |
| 5,422,956 A | 6/1995 | Wheaton | |
| 5,429,361 A | 7/1995 | Raven et al. | |
| 5,430,435 A | 7/1995 | Hoch | |
| 5,432,864 A | 7/1995 | Lu et al. | |
| 5,435,561 A | 7/1995 | Conley | |
| 5,435,569 A | 7/1995 | Zilliox | |
| D360,903 S | 8/1995 | Barr et al. | |
| 5,439,199 A | 8/1995 | Briggs et al. | |

(56) References Cited

U.S. PATENT DOCUMENTS

| | | | |
|---|---|---|---|
| 5,440,326 A | 8/1995 | Quinn | |
| 5,443,261 A | 8/1995 | Lee et al. | |
| 5,452,893 A | 9/1995 | Faulk et al. | |
| 5,453,053 A | 9/1995 | Danta et al. | |
| 5,453,758 A | 9/1995 | Sato | |
| D362,870 S | 10/1995 | Oikawa | |
| 5,459,489 A * | 10/1995 | Redford | G01C 9/06 345/158 |
| 5,466,181 A | 11/1995 | Bennett et al. | |
| 5,469,194 A | 11/1995 | Clark et al. | |
| 5,481,957 A | 1/1996 | Paley | |
| 5,482,510 A | 1/1996 | Ishii et al. | |
| 5,484,355 A | 1/1996 | King | |
| 5,485,171 A | 1/1996 | Copper et al. | |
| 5,488,362 A | 1/1996 | Ullman et al. | |
| 5,490,058 A | 2/1996 | Yamasaki | |
| 5,498,002 A | 3/1996 | Gechter | |
| 5,502,806 A | 3/1996 | Mahoney et al. | |
| 5,506,605 A | 4/1996 | Paley | |
| 5,509,806 A | 4/1996 | Ellsworth | |
| 5,512,892 A | 4/1996 | Corballis et al. | |
| 5,516,105 A * | 5/1996 | Eisenbrey | A63F 13/06 273/148 B |
| 5,517,183 A | 5/1996 | Bozeman | |
| 5,520,806 A * | 5/1996 | Menke | B03D 1/1431 210/221.2 |
| 5,523,800 A | 6/1996 | Dudek | |
| 5,524,637 A | 6/1996 | Erickson | |
| 5,526,022 A | 6/1996 | Donahue et al. | |
| 5,528,222 A | 6/1996 | Moskowitz | |
| 5,528,265 A | 6/1996 | Harrison | |
| 5,531,443 A | 7/1996 | Cruz | |
| 5,533,933 A | 7/1996 | Garnjost et al. | |
| 5,541,358 A | 7/1996 | Wheaton et al. | |
| 5,541,860 A | 7/1996 | Takei et al. | |
| 5,542,672 A | 8/1996 | Meredith | |
| 5,543,672 A | 8/1996 | Nishitani et al. | |
| 5,550,721 A | 8/1996 | Rapisarda | |
| 5,551,701 A | 9/1996 | Bouton et al. | |
| 5,554,033 A | 9/1996 | Bizzi et al. | |
| 5,554,980 A | 9/1996 | Hashimoto et al. | |
| 5,561,543 A * | 10/1996 | Ogawa | H04B 1/202 348/734 |
| 5,563,628 A | 10/1996 | Stroop | |
| 5,569,085 A | 10/1996 | Igarashi et al. | |
| D375,326 S | 11/1996 | Yokoi et al. | |
| 5,572,221 A | 11/1996 | Marlevi et al. | |
| 5,573,011 A | 11/1996 | Felsing | |
| 5,574,479 A | 11/1996 | Odell | |
| 5,576,727 A | 11/1996 | Rosenberg et al. | |
| 5,579,025 A | 11/1996 | Itoh | |
| D376,826 S | 12/1996 | Ashida | |
| 5,580,319 A * | 12/1996 | Hamilton | A63B 67/02 473/150 |
| 5,581,484 A | 12/1996 | Prince | |
| 5,585,584 A * | 12/1996 | Usa | G10H 1/00 84/600 |
| 5,586,767 A | 12/1996 | Bohland | |
| 5,587,558 A | 12/1996 | Matsushima | |
| 5,587,740 A * | 12/1996 | Brennan | G03B 17/53 348/143 |
| 5,594,465 A | 1/1997 | Poulachon | |
| 5,598,187 A | 1/1997 | Ide et al. | |
| 5,598,197 A * | 1/1997 | Zaba | B41J 2/16526 347/22 |
| 5,602,569 A | 2/1997 | Kato | |
| 5,603,658 A | 2/1997 | Cohen | |
| 5,605,505 A | 2/1997 | Han | |
| 5,606,343 A | 2/1997 | Tsuboyama | |
| 5,611,731 A | 3/1997 | Bouton et al. | |
| 5,613,913 A | 3/1997 | Ikematsu et al. | |
| 5,615,132 A | 3/1997 | Horton | |
| 5,621,459 A | 4/1997 | Ueda | |
| 5,623,581 A | 4/1997 | Attenberg | |
| 5,624,117 A | 4/1997 | Ohkubo et al. | |
| 5,627,565 A | 5/1997 | Morishita et al. | |
| 5,629,981 A | 5/1997 | Nerlikar | |
| 5,632,878 A | 5/1997 | Kitano | |
| D379,832 S | 6/1997 | Ashida | |
| 5,636,994 A | 6/1997 | Tong | |
| 5,640,152 A * | 6/1997 | Copper | G06F 3/0338 340/12.22 |
| 5,641,288 A | 6/1997 | Zzenglein, Jr. | |
| 5,642,931 A * | 7/1997 | Gappelberg | F21L 15/04 362/102 |
| 5,643,087 A | 7/1997 | Marcus et al. | |
| 5,645,077 A | 7/1997 | Foxlin | |
| 5,645,277 A | 7/1997 | Cheng | |
| 5,647,796 A | 7/1997 | Cohen | |
| 5,649,867 A | 7/1997 | Briggs | |
| 5,651,049 A * | 7/1997 | Easterling | H04M 1/6505 340/7.63 |
| 5,655,053 A | 8/1997 | Renie | |
| 5,662,332 A | 9/1997 | Garfield | |
| 5,662,525 A | 9/1997 | Briggs | |
| 5,666,138 A | 9/1997 | Culver | |
| 5,667,217 A | 9/1997 | Kelly et al. | |
| 5,667,220 A | 9/1997 | Cheng | |
| 5,670,845 A | 9/1997 | Grant | |
| 5,670,988 A * | 9/1997 | Tickle | G06F 3/0338 345/157 |
| 5,672,090 A | 9/1997 | Liu | |
| 5,674,128 A | 10/1997 | Holch et al. | |
| 5,676,450 A * | 10/1997 | Sink | F41A 33/02 362/112 |
| 5,676,540 A | 10/1997 | Williams et al. | |
| 5,676,673 A | 10/1997 | Ferre et al. | |
| 5,679,004 A | 10/1997 | McGowan et al. | |
| 5,682,181 A | 10/1997 | Nguyen et al. | |
| 5,685,776 A * | 11/1997 | Stambolic | A63F 9/24 463/37 |
| 5,685,778 A | 11/1997 | Sheldon et al. | |
| 5,691,898 A | 11/1997 | Rosenberg et al. | |
| 5,694,340 A | 12/1997 | Kim | |
| 5,698,784 A | 12/1997 | Hotelling et al. | |
| 5,701,131 A | 12/1997 | Kuga | |
| 5,702,232 A | 12/1997 | Moore | |
| 5,702,305 A | 12/1997 | Norman et al. | |
| 5,702,323 A | 12/1997 | Poulton | |
| 5,703,623 A | 12/1997 | Hall et al. | |
| 5,713,792 A | 2/1998 | Ohzono et al. | |
| 5,716,216 A | 2/1998 | O'Loughlin et al. | |
| 5,716,281 A * | 2/1998 | Dote | F41J 9/14 463/2 |
| 5,724,106 A | 3/1998 | Autry et al. | |
| 5,724,497 A | 3/1998 | San et al. | |
| 5,726,675 A | 3/1998 | Inoue | |
| 5,730,655 A | 3/1998 | Meredith | |
| 5,733,131 A * | 3/1998 | Park | G09B 5/065 340/7.48 |
| 5,734,371 A | 3/1998 | Kaplan | |
| 5,734,373 A | 3/1998 | Rosenberg | |
| 5,734,807 A | 3/1998 | Sumi | |
| D393,884 S | 4/1998 | Hayami | |
| 5,736,970 A | 4/1998 | Bozeman | |
| 5,739,811 A | 4/1998 | Rosenberg et al. | |
| 5,741,182 A * | 4/1998 | Lipps | A63B 15/005 463/36 |
| 5,741,189 A | 4/1998 | Briggs | |
| 5,742,233 A | 4/1998 | Hoffman et al. | |
| 5,742,331 A | 4/1998 | Uomori | |
| 5,745,226 A | 4/1998 | Gigioli, Jr. | |
| D394,264 S | 5/1998 | Sakamoto et al. | |
| 5,746,602 A * | 5/1998 | Kikinis | A63H 3/48 369/30.02 |
| 5,751,273 A | 5/1998 | Cohen | |
| 5,752,880 A | 5/1998 | Gabai et al. | |
| 5,752,882 A | 5/1998 | Acres et al. | |
| 5,757,305 A | 5/1998 | Xydis | |
| 5,757,354 A | 5/1998 | Kawamura | |
| 5,757,360 A | 5/1998 | Nitta et al. | |
| D395,464 S | 6/1998 | Shiibashi et al. | |

(56) References Cited

U.S. PATENT DOCUMENTS

| | | |
|---|---|---|
| 5,764,224 A | 6/1998 | Lilja et al. |
| 5,766,077 A | 6/1998 | Hongo |
| 5,769,719 A | 6/1998 | Hsu |
| 5,770,533 A | 6/1998 | Franchi |
| 5,771,038 A | 6/1998 | Wang |
| 5,772,508 A | 6/1998 | Sugita et al. |
| D396,468 S | 7/1998 | Schindler et al. |
| 5,775,998 A | 7/1998 | Ikematsu et al. |
| 5,779,240 A | 7/1998 | Santella |
| 5,785,317 A | 7/1998 | Sasaki |
| 5,785,592 A * | 7/1998 | Jacobsen ............... A63F 9/0291 273/349 |
| 5,785,952 A | 7/1998 | Taylor et al. |
| 5,786,626 A | 7/1998 | Brady et al. |
| D397,162 S | 8/1998 | Yokoi et al. |
| D397,371 S | 8/1998 | Bagley |
| D397,372 S | 8/1998 | Riggs |
| 5,791,648 A | 8/1998 | Hohl |
| 5,794,081 A | 8/1998 | Itoh |
| 5,796,354 A | 8/1998 | Cartabiano et al. |
| D397,729 S | 9/1998 | Schulz et al. |
| 5,803,740 A | 9/1998 | Gesink et al. |
| 5,803,840 A * | 9/1998 | Young ................... A63B 43/00 473/457 |
| 5,806,849 A | 9/1998 | Rutkowski |
| 5,807,284 A | 9/1998 | Foxlin |
| 5,810,666 A | 9/1998 | Mero et al. |
| 5,811,896 A | 9/1998 | Grad |
| 5,819,206 A | 10/1998 | Horton et al. |
| 5,820,462 A | 10/1998 | Yokoi et al. |
| 5,820,471 A | 10/1998 | Briggs |
| 5,820,472 A | 10/1998 | Briggs |
| 5,821,859 A | 10/1998 | Schrott et al. |
| 5,822,713 A | 10/1998 | Profeta |
| 5,825,298 A | 10/1998 | Walter |
| 5,825,350 A | 10/1998 | Case, Jr. et al. |
| D400,885 S | 11/1998 | Goto |
| 5,830,065 A | 11/1998 | Sitrick |
| 5,831,553 A | 11/1998 | Lenssen et al. |
| 5,833,549 A | 11/1998 | Zur et al. |
| 5,835,077 A | 11/1998 | Dao et al. |
| 5,835,156 A | 11/1998 | Blonstein et al. |
| 5,835,576 A | 11/1998 | Katz |
| 5,836,817 A | 11/1998 | Acres et al. |
| 5,838,138 A | 11/1998 | Henty |
| 5,841,409 A | 11/1998 | Ishibashi et al. |
| D402,328 S | 12/1998 | Ashida |
| 5,847,854 A | 12/1998 | Benson, Jr. |
| 5,850,624 A | 12/1998 | Gard |
| 5,851,149 A | 12/1998 | Xidos et al. |
| 5,853,327 A | 12/1998 | Gilboa |
| 5,853,332 A | 12/1998 | Briggs |
| 5,854,622 A | 12/1998 | Brannon |
| 5,855,483 A | 1/1999 | Collins et al. |
| D405,071 S | 2/1999 | Gambaro |
| 5,865,680 A | 2/1999 | Briggs |
| 5,867,146 A | 2/1999 | Kim et al. |
| 5,874,941 A | 2/1999 | Yamada |
| 5,875,257 A | 2/1999 | Marrin et al. |
| D407,071 S | 3/1999 | Keating |
| 5,889,672 A | 3/1999 | Schuler et al. |
| D407,761 S | 4/1999 | Barr |
| 5,893,562 A | 4/1999 | Spector |
| 5,897,437 A | 4/1999 | Nishiumi |
| 5,898,421 A | 4/1999 | Quinn |
| 5,900,867 A | 5/1999 | Schindler et al. |
| 5,901,246 A | 5/1999 | Hoffberg et al. |
| 5,902,968 A | 5/1999 | Sato et al. |
| 5,906,542 A | 5/1999 | Neumann |
| D410,909 S | 6/1999 | Tickle |
| 5,908,996 A * | 6/1999 | Litterst ................ G10H 1/34 200/56 A |
| 5,911,634 A | 6/1999 | Nidata et al. |
| 5,912,612 A | 6/1999 | DeVolpi |
| 5,913,019 A | 6/1999 | Attenberg |
| 5,913,727 A | 6/1999 | Ahdoot |
| D412,016 S | 7/1999 | Meredith |
| 5,919,149 A | 7/1999 | Allen |
| 5,923,317 A | 7/1999 | Sayler et al. |
| 5,924,695 A | 7/1999 | Heykoop |
| 5,926,780 A | 7/1999 | Fox et al. |
| 5,929,607 A | 7/1999 | Rosenberg et al. |
| 5,929,782 A | 7/1999 | Stark et al. |
| 5,929,841 A | 7/1999 | Fujii |
| 5,929,846 A | 7/1999 | Rosenberg et al. |
| 5,929,848 A | 7/1999 | Albukerk et al. |
| D412,940 S | 8/1999 | Kato et al. |
| D413,359 S | 8/1999 | Larian |
| 5,931,739 A | 8/1999 | Layer et al. |
| 5,942,969 A | 8/1999 | Wicks |
| 5,944,533 A * | 8/1999 | Wood ................... A63H 3/28 434/167 |
| 5,946,444 A | 8/1999 | Evans et al. |
| 5,947,789 A * | 9/1999 | Chan ................... A63H 33/009 362/277 |
| 5,947,868 A | 9/1999 | Dugan |
| 5,955,713 A | 9/1999 | Titus |
| 5,955,988 A | 9/1999 | Blonstein |
| 5,956,035 A | 9/1999 | Sciammarella |
| 5,957,779 A | 9/1999 | Larson |
| 5,961,386 A | 10/1999 | Sawaguchi |
| 5,963,136 A | 10/1999 | O'Brien |
| 5,964,660 A | 10/1999 | James et al. |
| 5,967,898 A | 10/1999 | Takasaka et al. |
| 5,967,901 A | 10/1999 | Briggs |
| 5,971,270 A | 10/1999 | Barna |
| 5,971,271 A | 10/1999 | Wynn et al. |
| 5,973,757 A | 10/1999 | Aubuchon et al. |
| 5,977,951 A | 11/1999 | Danieli et al. |
| 5,978,770 A * | 11/1999 | Waytena ............... G06Q 10/02 705/5 |
| 5,980,254 A | 11/1999 | Muehle et al. |
| 5,982,352 A | 11/1999 | Pryor |
| 5,982,356 A | 11/1999 | Akiyama |
| 5,984,785 A | 11/1999 | Takeda et al. |
| 5,984,788 A | 11/1999 | Lebensfeld et al. |
| 5,986,570 A | 11/1999 | Black et al. |
| 5,986,644 A | 11/1999 | Herder |
| 5,987,402 A | 11/1999 | Murata et al. |
| 5,987,420 A * | 11/1999 | Maeda .................. G06Q 10/02 705/5 |
| 5,987,421 A * | 11/1999 | Chuang ................ G06Q 10/02 705/7.24 |
| 5,989,120 A | 11/1999 | Truchsess |
| 5,991,085 A | 11/1999 | Rallison et al. |
| 5,991,693 A | 11/1999 | Zalewski |
| 5,996,033 A | 11/1999 | Chiu-Hao |
| 5,999,168 A | 12/1999 | Rosenberg |
| 6,001,014 A | 12/1999 | Ogata |
| 6,001,015 A | 12/1999 | Nishiumi et al. |
| 6,002,394 A | 12/1999 | Schein |
| 6,009,458 A | 12/1999 | Hawkins et al. |
| D419,199 S | 1/2000 | Cordell et al. |
| D419,200 S | 1/2000 | Ashida |
| 6,010,406 A | 1/2000 | Kajikawa et al. |
| 6,011,526 A | 1/2000 | Toyoshima et al. |
| 6,012,980 A | 1/2000 | Yoshida et al. |
| 6,012,984 A | 1/2000 | Roseman |
| 6,013,007 A | 1/2000 | Root et al. |
| 6,016,144 A | 1/2000 | Blonstein |
| 6,019,680 A | 2/2000 | Cheng |
| 6,020,876 A | 2/2000 | Rosenberg |
| 6,024,647 A * | 2/2000 | Bennett ................ A63G 31/16 472/43 |
| 6,024,675 A | 2/2000 | Kashiwaguchi |
| 6,025,830 A | 2/2000 | Cohen |
| 6,037,882 A | 3/2000 | Levy |
| 6,044,297 A | 3/2000 | Sheldon |
| 6,049,823 A | 4/2000 | Hwang |
| 6,052,083 A | 4/2000 | Wilson |
| 6,057,788 A | 5/2000 | Cummings |
| 6,058,342 A | 5/2000 | Orbach |
| 6,059,576 A | 5/2000 | Brann |
| 6,060,847 A | 5/2000 | Hettema et al. |

(56) References Cited

U.S. PATENT DOCUMENTS

| | | | |
|---|---|---|---|
| 6,066,075 A | 5/2000 | Poulton | |
| 6,069,594 A | 5/2000 | Barnes et al. | |
| 6,072,467 A | 6/2000 | Walker | |
| 6,072,470 A | 6/2000 | Ishigaki | |
| 6,075,443 A | 6/2000 | Schepps et al. | |
| 6,075,575 A | 6/2000 | Schein et al. | |
| 6,076,734 A | 6/2000 | Dougherty et al. | |
| 6,077,106 A | 6/2000 | Mish | |
| 6,078,789 A | 6/2000 | Bodenmann | |
| 6,079,982 A | 6/2000 | Meader | |
| 6,080,063 A | 6/2000 | Khosla | |
| 6,081,819 A | 6/2000 | Ogino | |
| 6,084,315 A | 7/2000 | Schmitt | |
| 6,084,577 A | 7/2000 | Sato et al. | |
| 6,085,805 A | 7/2000 | Bates | |
| 6,087,950 A | 7/2000 | Capan | |
| 6,089,987 A | 7/2000 | Briggs | |
| 6,091,342 A | 7/2000 | Janesch et al. | |
| D429,718 S | 8/2000 | Rudolph | |
| 6,095,926 A | 8/2000 | Hettema et al. | |
| 6,102,406 A | 8/2000 | Miles et al. | |
| 6,106,392 A | 8/2000 | Meredith | |
| 6,110,000 A | 8/2000 | Ting | |
| 6,110,039 A | 8/2000 | Oh | |
| 6,110,041 A | 8/2000 | Walker et al. | |
| 6,115,028 A | 9/2000 | Balakrishnan | |
| 6,127,928 A | 10/2000 | Issacman et al. | |
| 6,127,990 A | 10/2000 | Zwern | |
| 6,129,549 A | 10/2000 | Thompson | |
| 6,132,318 A | 10/2000 | Briggs | |
| 6,137,457 A | 10/2000 | Tokuhashi | |
| D433,381 S | 11/2000 | Talesfore | |
| 6,142,870 A | 11/2000 | Wada | |
| 6,142,876 A * | 11/2000 | Cumbers | G06K 9/00597 235/380 |
| 6,144,367 A | 11/2000 | Berstis | |
| 6,146,278 A | 11/2000 | Kobayashi | |
| 6,148,100 A | 11/2000 | Anderson et al. | |
| 6,149,490 A | 11/2000 | Hampton | |
| 6,150,947 A | 11/2000 | Shima | |
| 6,154,723 A | 11/2000 | Cox et al. | |
| D435,554 S | 12/2000 | Meredith | |
| 6,155,926 A | 12/2000 | Miyamoto et al. | |
| 6,160,405 A | 12/2000 | Needle | |
| 6,160,540 A * | 12/2000 | Fishkin | A63F 13/00 345/156 |
| 6,160,986 A * | 12/2000 | Gabai | G09B 5/04 434/307 R |
| 6,162,122 A | 12/2000 | Acres et al. | |
| 6,162,123 A * | 12/2000 | Woolston | A63F 13/10 273/148 B |
| 6,162,191 A | 12/2000 | Foxin | |
| 6,164,808 A | 12/2000 | Shibata | |
| 6,167,353 A | 12/2000 | Piernot et al. | |
| 6,171,190 B1 | 1/2001 | Thanasack et al. | |
| 6,173,209 B1 * | 1/2001 | Laval | G06Q 10/02 235/382 |
| 6,174,242 B1 * | 1/2001 | Briggs | A63B 9/00 472/116 |
| 6,176,837 B1 * | 1/2001 | Foxlin | G01C 21/165 128/897 |
| 6,181,253 B1 | 1/2001 | Eschenbach et al. | |
| 6,181,329 B1 | 1/2001 | Stork et al. | |
| 6,183,364 B1 | 2/2001 | Trovato | |
| 6,183,365 B1 | 2/2001 | Tonomura et al. | |
| 6,184,847 B1 | 2/2001 | Fateh et al. | |
| 6,184,862 B1 * | 2/2001 | Leiper | G06F 19/321 345/156 |
| 6,184,863 B1 | 2/2001 | Sibert | |
| 6,186,902 B1 | 2/2001 | Briggs | |
| 6,190,174 B1 | 2/2001 | Lam | |
| 6,191,774 B1 | 2/2001 | Schena | |
| 6,196,893 B1 | 3/2001 | Casola et al. | |
| 6,198,295 B1 | 3/2001 | Hill | |
| 6,198,470 B1 | 3/2001 | Agam et al. | |
| 6,198,471 B1 | 3/2001 | Cook | |
| 6,200,216 B1 | 3/2001 | Peppel | |
| 6,200,219 B1 | 3/2001 | Rudell et al. | |
| 6,200,253 B1 | 3/2001 | Nishiumi | |
| 6,201,554 B1 | 3/2001 | Lands | |
| 6,206,745 B1 * | 3/2001 | Gabai | A63H 3/28 446/175 |
| 6,206,782 B1 | 3/2001 | Walker et al. | |
| 6,210,287 B1 | 4/2001 | Briggs | |
| 6,211,861 B1 | 4/2001 | Rosenberg et al. | |
| 6,214,155 B1 | 4/2001 | Leighton | |
| 6,217,450 B1 | 4/2001 | Meredith | |
| 6,217,478 B1 | 4/2001 | Vohmann | |
| 6,220,171 B1 | 4/2001 | Hettema et al. | |
| 6,220,963 B1 | 4/2001 | Meredith | |
| 6,220,964 B1 | 4/2001 | Miyamoto | |
| 6,220,965 B1 * | 4/2001 | Hanna | A63G 7/00 463/52 |
| 6,222,522 B1 * | 4/2001 | Mathews | G06F 3/044 178/19.01 |
| D442,998 S | 5/2001 | Ashida | |
| 6,224,486 B1 | 5/2001 | Walker et al. | |
| 6,224,491 B1 | 5/2001 | Hiromi et al. | |
| 6,225,987 B1 | 5/2001 | Matsuda | |
| 6,226,534 B1 | 5/2001 | Aizawa | |
| 6,227,966 B1 | 5/2001 | Yokoi | |
| 6,227,974 B1 | 5/2001 | Eilat et al. | |
| 6,231,451 B1 | 5/2001 | Briggs | |
| 6,234,803 B1 | 5/2001 | Watkins | |
| 6,238,289 B1 | 5/2001 | Sobota et al. | |
| 6,238,291 B1 | 5/2001 | Fujimoto et al. | |
| 6,239,806 B1 | 5/2001 | Nishiumi et al. | |
| RE37,220 E | 6/2001 | Rapisarda et al. | |
| 6,241,611 B1 | 6/2001 | Takeda et al. | |
| 6,243,491 B1 | 6/2001 | Andersson | |
| 6,243,658 B1 | 6/2001 | Raby | |
| 6,244,987 B1 | 6/2001 | Ohsuga et al. | |
| 6,245,014 B1 | 6/2001 | Brainard et al. | |
| 6,248,019 B1 | 6/2001 | Mudie et al. | |
| 6,254,101 B1 | 7/2001 | Young | |
| 6,254,394 B1 | 7/2001 | Draper et al. | |
| 6,261,180 B1 | 7/2001 | Lebensfeld et al. | |
| 6,264,202 B1 | 7/2001 | Briggs | |
| 6,264,558 B1 | 7/2001 | Nishiumi et al. | |
| 6,265,984 B1 | 7/2001 | Molinaroli | |
| 6,267,673 B1 | 7/2001 | Miyamoto et al. | |
| 6,273,425 B1 | 8/2001 | Westfall et al. | |
| 6,273,819 B1 | 8/2001 | Strauss et al. | |
| 6,275,213 B1 | 8/2001 | Tremblay et al. | |
| 6,276,353 B1 | 8/2001 | Briggs et al. | |
| 6,280,327 B1 | 8/2001 | Leifer et al. | |
| 6,280,328 B1 | 8/2001 | Holch et al. | |
| 6,283,862 B1 | 9/2001 | Richter | |
| 6,283,871 B1 | 9/2001 | Briggs | |
| 6,287,200 B1 * | 9/2001 | Sharma | A63F 13/12 463/39 |
| 6,290,565 B1 | 9/2001 | Galyean, III et al. | |
| 6,290,566 B1 * | 9/2001 | Gabai | G10L 13/00 446/175 |
| 6,293,684 B1 * | 9/2001 | Riblett | F21L 4/02 200/60 |
| 6,297,751 B1 | 10/2001 | Fadavi-Ardekani | |
| 6,301,534 B1 | 10/2001 | McDermott | |
| 6,302,793 B1 | 10/2001 | Fertitta, III et al. | |
| 6,302,796 B1 | 10/2001 | Lebensfeld et al. | |
| 6,304,250 B1 | 10/2001 | Yang | |
| 6,311,982 B1 | 11/2001 | Lebensfeld et al. | |
| 6,312,335 B1 * | 11/2001 | Tosaki | A63F 13/06 273/148 B |
| 6,315,673 B1 | 11/2001 | Kopera | |
| 6,320,495 B1 | 11/2001 | Sporgis | |
| 6,322,365 B1 | 11/2001 | Shechter et al. | |
| 6,322,420 B1 | 11/2001 | Daniellian | |
| 6,323,614 B1 | 11/2001 | Palaxxolo | |
| 6,323,654 B1 | 11/2001 | Needle | |
| 6,325,718 B1 | 12/2001 | Nishiumi et al. | |
| 6,328,648 B1 | 12/2001 | Walker et al. | |
| 6,328,650 B1 | 12/2001 | Fukawa et al. | |

(56) References Cited

U.S. PATENT DOCUMENTS

| | | |
|---|---|---|
| 6,329,648 B1 | 12/2001 | Delatorre |
| 6,330,427 B1 | 12/2001 | Tabachnik |
| 6,331,841 B1 | 12/2001 | Tokuhashi |
| 6,331,856 B1 | 12/2001 | VanHook |
| 6,332,840 B1 | 12/2001 | Nishiumi et al. |
| 6,337,954 B1 | 1/2002 | Soshi |
| 6,338,079 B1 | 1/2002 | Kanamori et al. |
| 6,342,010 B1 | 1/2002 | Slifer |
| 6,346,047 B1 | 2/2002 | Sobota |
| 6,347,993 B1 | 2/2002 | Kondo et al. |
| 6,347,998 B1 | 2/2002 | Yoshitomi et al. |
| 6,350,199 B1 | 2/2002 | Williams et al. |
| 6,352,478 B1 | 3/2002 | Gabai et al. |
| 6,354,945 B1 | 3/2002 | Furuki et al. |
| 6,354,948 B1 | 3/2002 | Nagayama |
| 6,356,867 B1 | 3/2002 | Gabai et al. |
| 6,361,396 B1 | 3/2002 | Snyder |
| 6,361,436 B1 | 3/2002 | Gouji et al. |
| 6,361,507 B1 | 3/2002 | Foxlin |
| D456,410 S | 4/2002 | Ashida |
| 6,364,735 B1 | 4/2002 | Bristow et al. |
| 6,368,177 B1 | 4/2002 | Gabai et al. |
| 6,368,217 B2 | 4/2002 | Kanno |
| 6,369,794 B1 | 4/2002 | Sakurai et al. |
| 6,369,908 B1 | 4/2002 | Frey et al. |
| 6,371,375 B1 | 4/2002 | Ackley et al. |
| 6,371,853 B1 | 4/2002 | Borta |
| 6,374,998 B1 | 4/2002 | Grubbs et al. |
| 6,375,566 B1 | 4/2002 | Yamada |
| 6,375,569 B1 | 4/2002 | Acres |
| 6,375,572 B1 | 4/2002 | Masuyama et al. |
| 6,375,578 B1 | 4/2002 | Briggs |
| 6,377,793 B1 | 4/2002 | Jenkins |
| 6,377,906 B1 | 4/2002 | Rowe |
| D456,854 S | 5/2002 | Ashida |
| 6,383,079 B1 | 5/2002 | Takeda et al. |
| 6,386,538 B1 | 5/2002 | Mejia |
| 6,392,613 B1 | 5/2002 | Goto |
| 6,394,904 B1 | 5/2002 | Stallker |
| 6,400,480 B1 | 6/2002 | Thomas |
| 6,400,996 B1 | 6/2002 | Hoffberg et al. |
| 6,402,617 B2 | 6/2002 | Gouji et al. |
| 6,404,409 B1 * | 6/2002 | Solomon ............... G06F 3/147 340/815.45 |
| 6,409,379 B1 | 6/2002 | Gabathuler et al. |
| 6,409,604 B1 | 6/2002 | Matsuno |
| 6,409,687 B1 | 6/2002 | Foxlin |
| D459,727 S | 7/2002 | Ashida |
| D460,787 S | 7/2002 | Nishikawa |
| 6,414,589 B1 | 7/2002 | Angott et al. |
| 6,415,223 B1 | 7/2002 | Lin |
| 6,421,056 B1 | 7/2002 | Nishiumi |
| 6,424,264 B1 * | 7/2002 | Giraldin ............... G06K 17/00 340/539.1 |
| 6,424,333 B1 | 7/2002 | Tremblay |
| 6,426,719 B1 | 7/2002 | Nagareda |
| 6,426,741 B1 | 7/2002 | Goldsmith et al. |
| 6,438,193 B1 | 8/2002 | Ko et al. |
| D462,683 S | 9/2002 | Ashida |
| 6,445,960 B1 | 9/2002 | Borta |
| 6,452,494 B1 | 9/2002 | Harrison |
| 6,456,276 B1 | 9/2002 | Park |
| D464,052 S | 10/2002 | Fletcher |
| D464,950 S | 10/2002 | Fraquelli et al. |
| 6,462,769 B1 * | 10/2002 | Trowbridge ........... A63G 31/16 348/51 |
| 6,463,257 B1 * | 10/2002 | Wood ............... A63H 3/28 434/308 |
| 6,463,859 B1 * | 10/2002 | Ikezawa ............ A63B 69/0053 104/53 |
| 6,466,198 B1 | 10/2002 | Feinstein |
| 6,466,831 B1 | 10/2002 | Shibata |
| 6,473,070 B2 | 10/2002 | Mishra et al. |
| 6,473,713 B1 | 10/2002 | McCall |
| 6,474,159 B1 | 11/2002 | Foxlin et al. |
| 6,482,067 B1 | 11/2002 | Pickens |
| 6,484,080 B2 | 11/2002 | Breed |
| 6,490,409 B1 | 12/2002 | Walker |
| 6,491,566 B2 | 12/2002 | Peters |
| 6,492,981 B1 | 12/2002 | Stork et al. |
| 6,494,457 B2 | 12/2002 | Conte et al. |
| 6,496,122 B2 | 12/2002 | Sampsell |
| 6,509,217 B1 | 1/2003 | Reddy |
| 6,512,511 B2 | 1/2003 | Willner |
| 6,517,438 B2 * | 2/2003 | Tosaki ............... A63F 13/06 273/148 B |
| 6,517,728 B1 | 2/2003 | Rooney |
| 6,518,952 B1 | 2/2003 | Leiper |
| 6,525,660 B1 | 2/2003 | Surintrspanont |
| 6,526,158 B1 | 2/2003 | Goldberg |
| 6,527,638 B1 | 3/2003 | Walker et al. |
| 6,527,646 B1 | 3/2003 | Briggs |
| 6,529,786 B1 * | 3/2003 | Sim ............... G06Q 10/02 700/90 |
| 6,530,838 B2 | 3/2003 | Ha et al. |
| 6,530,841 B2 | 3/2003 | Bull et al. |
| 6,537,124 B2 | 3/2003 | Todokoro |
| 6,537,154 B1 | 3/2003 | Ohgoshi et al. |
| 6,538,675 B2 | 3/2003 | Aratani |
| D473,942 S | 4/2003 | Motoki et al. |
| 6,540,607 B2 | 4/2003 | Mokris et al. |
| 6,540,611 B1 | 4/2003 | Nagata |
| 6,544,124 B2 | 4/2003 | Ireland |
| 6,544,126 B2 | 4/2003 | Sawano |
| 6,545,611 B2 | 4/2003 | Hayashi et al. |
| 6,545,661 B1 | 4/2003 | Goschy et al. |
| 6,551,165 B2 | 4/2003 | Smirnov |
| 6,551,188 B2 | 4/2003 | Toyama et al. |
| 6,554,707 B1 | 4/2003 | Sinclair et al. |
| 6,554,781 B1 | 4/2003 | Carter et al. |
| D474,763 S | 5/2003 | Tozaki et al. |
| 6,558,225 B1 | 5/2003 | Rehkemper et al. |
| 6,560,511 B1 | 5/2003 | Yokoo et al. |
| 6,561,049 B2 | 5/2003 | Akiyama et al. |
| 6,563,487 B2 | 5/2003 | Martin et al. |
| 6,565,438 B2 | 5/2003 | Ogino |
| 6,565,444 B2 | 5/2003 | Nagata et al. |
| 6,567,536 B2 | 5/2003 | McNitt et al. |
| 6,569,023 B1 | 5/2003 | Briggs |
| 6,572,108 B1 | 6/2003 | Bristow |
| 6,575,753 B2 | 6/2003 | Rosa et al. |
| 6,577,350 B1 | 6/2003 | Proehl |
| 6,579,098 B2 | 6/2003 | Shechter |
| 6,582,299 B1 | 6/2003 | Matsuyama et al. |
| 6,582,380 B2 | 6/2003 | Kazlausky et al. |
| 6,583,783 B1 | 6/2003 | Dietrich |
| 6,585,596 B1 | 7/2003 | Liefer et al. |
| 6,589,117 B1 | 7/2003 | Moritome et al. |
| 6,589,120 B1 | 7/2003 | Takahashi |
| 6,590,536 B1 | 7/2003 | Walton |
| 6,591,677 B2 | 7/2003 | Rothoff |
| 6,592,461 B1 | 7/2003 | Raviv et al. |
| 6,595,863 B2 | 7/2003 | Chamberlain et al. |
| 6,597,342 B1 | 7/2003 | Haruta |
| 6,597,443 B2 | 7/2003 | Boman |
| 6,598,978 B2 | 7/2003 | Hasegawa |
| 6,599,194 B1 | 7/2003 | Smith |
| 6,605,038 B1 | 8/2003 | Teller et al. |
| 6,607,123 B1 | 8/2003 | Jollifee et al. |
| 6,608,563 B2 | 8/2003 | Weston et al. |
| 6,609,969 B1 | 8/2003 | Luciano et al. |
| 6,609,977 B1 | 8/2003 | Shimizu |
| 6,616,452 B2 | 9/2003 | Clark et al. |
| 6,616,535 B1 | 9/2003 | Nishizak |
| 6,616,607 B2 | 9/2003 | Hashimoto |
| 6,626,728 B2 * | 9/2003 | Holt ............... A63H 33/00 446/175 |
| 6,628,257 B1 | 9/2003 | Oka |
| 6,629,019 B2 | 9/2003 | Legge et al. |
| 6,632,142 B2 | 10/2003 | Keith |
| 6,633,155 B1 | 10/2003 | Liang |
| 6,634,949 B1 | 10/2003 | Briggs et al. |
| 6,636,826 B1 | 10/2003 | Abe et al. |

(56) References Cited

U.S. PATENT DOCUMENTS

| | | |
|---|---|---|
| 6,641,482 B2 | 11/2003 | Masuyama et al. |
| 6,642,837 B1 | 11/2003 | Vigoda et al. |
| 6,650,029 B1 | 11/2003 | Johnston |
| 6,650,313 B2 | 11/2003 | Levine |
| 6,650,345 B1 | 11/2003 | Saito |
| 6,651,268 B1 | 11/2003 | Briggs |
| 6,654,000 B2 | 11/2003 | Rosenberg |
| 6,654,001 B1 | 11/2003 | Su |
| 6,672,962 B1 | 1/2004 | Ozaki et al. |
| 6,676,520 B2 | 1/2004 | Nishiumi et al. |
| 6,676,524 B1 | 1/2004 | Botzas |
| 6,677,990 B1 | 1/2004 | Kawahara |
| 6,681,629 B1 | 1/2004 | Foxlin et al. |
| 6,682,074 B2 | 1/2004 | Weston |
| 6,682,351 B1 | 1/2004 | Abraham-Fuchs et al. |
| 6,684,062 B1 | 1/2004 | Gosior et al. |
| D486,145 S | 2/2004 | Kaminski et al. |
| 6,686,954 B1 | 2/2004 | Kitaguchi |
| 6,692,170 B2 | 2/2004 | Abir |
| 6,693,622 B1 | 2/2004 | Shahoian et al. |
| 6,702,672 B1 | 3/2004 | Angell et al. |
| 6,709,336 B2 | 3/2004 | Siegel et al. |
| 6,712,692 B2 | 3/2004 | Basson |
| 6,716,102 B2 | 4/2004 | Whitten et al. |
| 6,717,573 B1 | 4/2004 | Shahoian et al. |
| 6,717,673 B1 | 4/2004 | Janssen |
| 6,718,280 B2 | 4/2004 | Hermann |
| 6,725,107 B2 | 4/2004 | MacPherson |
| 6,725,173 B2 | 4/2004 | An |
| 6,726,099 B2 | 4/2004 | Becker et al. |
| D489,361 S | 5/2004 | Mori et al. |
| 6,729,934 B1 | 5/2004 | Driscoll et al. |
| 6,733,390 B2 | 5/2004 | Walker et al. |
| 6,736,009 B1 | 5/2004 | Schwabe |
| 6,739,874 B2 | 5/2004 | Marcus et al. |
| 6,739,979 B2 | 5/2004 | Tracy |
| D491,924 S | 6/2004 | Kaminski et al. |
| D492,285 S | 6/2004 | Ombao et al. |
| 6,743,104 B1 | 6/2004 | Ota et al. |
| 6,746,334 B1 | 6/2004 | Barney |
| 6,747,562 B2 * | 6/2004 | Giraldin .............. G07C 9/00111 340/573.1 |
| 6,747,632 B2 | 6/2004 | Howard |
| 6,747,690 B2 | 6/2004 | Molgaard |
| 6,749,432 B2 | 6/2004 | French et al. |
| 6,752,719 B2 | 6/2004 | Himoto et al. |
| 6,753,849 B1 | 6/2004 | Curran et al. |
| 6,753,888 B2 | 6/2004 | Kamiwada |
| 6,757,068 B2 | 6/2004 | Foxlin |
| 6,757,446 B1 | 6/2004 | Li |
| 6,761,637 B2 | 7/2004 | Weston et al. |
| 6,765,553 B1 | 7/2004 | Odamura |
| D495,336 S | 8/2004 | Andre et al. |
| 6,770,863 B2 | 8/2004 | Walley |
| 6,773,325 B2 | 8/2004 | Mawle et al. |
| 6,773,344 B1 * | 8/2004 | Gabai ...................... A63H 3/28 463/1 |
| 6,785,539 B2 | 8/2004 | Hale |
| 6,786,877 B2 | 9/2004 | Foxlin |
| 6,796,177 B2 | 9/2004 | Mori |
| 6,796,908 B2 | 9/2004 | Weston |
| 6,797,895 B2 | 9/2004 | Lapstun |
| 6,811,489 B1 | 11/2004 | Shimizu |
| 6,811,491 B1 | 11/2004 | Levenberg et al. |
| 6,812,583 B2 | 11/2004 | Cheung et al. |
| 6,812,881 B1 | 11/2004 | Mullaly et al. |
| 6,813,525 B2 | 11/2004 | Reid |
| 6,813,574 B1 | 11/2004 | Yedur |
| 6,813,584 B2 | 11/2004 | Zhou et al. |
| 6,816,151 B2 | 11/2004 | Dellinger |
| 6,821,204 B2 | 11/2004 | Aonuma et al. |
| 6,821,206 B1 | 11/2004 | Ishida et al. |
| 6,835,135 B1 | 12/2004 | Silverbrook et al. |
| 6,836,705 B2 | 12/2004 | Hellman |
| 6,836,751 B2 | 12/2004 | Paxton |
| 6,836,971 B1 | 1/2005 | Wan |
| 6,842,991 B2 | 1/2005 | Levi |
| 6,846,238 B2 | 1/2005 | Wells |
| 6,850,221 B1 | 2/2005 | Tickle |
| 6,850,844 B1 | 2/2005 | Walters |
| 6,852,032 B2 | 2/2005 | Ishino |
| 6,856,327 B2 | 2/2005 | Choi |
| D502,468 S | 3/2005 | Knight et al. |
| 6,868,738 B2 | 3/2005 | Moscrip |
| 6,872,139 B2 | 3/2005 | Sato et al. |
| 6,873,406 B1 | 3/2005 | Hines |
| D503,750 S | 4/2005 | Kit et al. |
| 6,878,066 B2 | 4/2005 | Leifer |
| 6,882,824 B2 | 4/2005 | Wood |
| D504,677 S | 5/2005 | Kaminski et al. |
| D505,424 S | 5/2005 | Ashida et al. |
| 6,889,098 B1 * | 5/2005 | Laval .................... G06Q 10/02 700/19 |
| 6,890,262 B2 | 5/2005 | Oishi |
| 6,891,469 B2 | 5/2005 | Engellenner et al. |
| 6,891,526 B2 | 5/2005 | Gombert |
| 6,894,686 B2 | 5/2005 | Stamper et al. |
| 6,897,845 B2 | 5/2005 | Ozawa |
| 6,897,854 B2 | 5/2005 | Cho |
| 6,902,483 B2 | 6/2005 | Lin |
| 6,903,725 B2 | 6/2005 | Nacson |
| 6,905,411 B2 | 6/2005 | Nguyen et al. |
| 6,906,700 B1 | 6/2005 | Armstrong |
| 6,908,386 B2 | 6/2005 | Suzuki et al. |
| 6,908,388 B2 | 6/2005 | Shimizu |
| 6,918,833 B2 | 7/2005 | Emmerson et al. |
| 6,921,332 B2 | 7/2005 | Fukunaga |
| 6,922,632 B2 | 7/2005 | Foxlin |
| 6,924,787 B2 | 8/2005 | Kramer et al. |
| 6,925,410 B2 | 8/2005 | Narayanan |
| 6,929,543 B1 * | 8/2005 | Ueshima ................ A63F 13/06 273/148 B |
| 6,929,548 B2 | 8/2005 | Wang |
| 6,932,698 B2 | 8/2005 | Sprogis |
| 6,932,706 B1 | 8/2005 | Kaminkow |
| 6,933,861 B2 | 8/2005 | Wang |
| 6,933,923 B2 | 8/2005 | Feinstein |
| 6,935,864 B2 | 8/2005 | Shechter et al. |
| 6,935,952 B2 | 8/2005 | Walker et al. |
| 6,939,232 B2 | 9/2005 | Tanaka et al. |
| 6,948,999 B2 * | 9/2005 | Chan ...................... A63H 33/22 40/433 |
| 6,954,980 B2 | 10/2005 | Song |
| 6,955,606 B2 | 10/2005 | Taho et al. |
| 6,956,564 B1 | 10/2005 | Williams |
| 6,965,374 B2 | 11/2005 | Villet et al. |
| 6,966,775 B1 | 11/2005 | Kendir et al. |
| 6,967,563 B2 | 11/2005 | Bormaster |
| 6,967,566 B2 | 11/2005 | Weston et al. |
| 6,982,697 B2 | 1/2006 | Wilson et al. |
| 6,983,219 B2 | 1/2006 | Mantyjarvi |
| 6,984,208 B2 | 1/2006 | Zheng |
| 6,990,639 B2 | 1/2006 | Wilson |
| 6,993,451 B2 | 1/2006 | Chang et al. |
| 6,995,748 B2 | 2/2006 | Gordon et al. |
| 6,998,966 B2 | 2/2006 | Pedersen |
| 7,000,469 B2 | 2/2006 | Foxlin et al. |
| 7,002,591 B1 | 2/2006 | Leather |
| 7,004,847 B2 | 2/2006 | Henry |
| 7,005,985 B1 | 2/2006 | Steeves |
| 7,029,400 B2 | 4/2006 | Briggs |
| 7,030,765 B2 * | 4/2006 | Giraldin ................ G06Q 30/02 340/539.13 |
| 7,031,875 B2 | 4/2006 | Ellenby et al. |
| 7,038,661 B2 | 5/2006 | Wilson et al. |
| 7,040,986 B2 | 5/2006 | Koshima |
| 7,040,993 B1 | 5/2006 | Lovitt |
| 7,040,998 B2 | 5/2006 | Jolliffe et al. |
| 7,052,391 B1 | 5/2006 | Luciano, Jr. |
| 7,055,101 B2 | 5/2006 | Abbott et al. |
| 7,056,221 B2 | 6/2006 | Thirkettle et al. |
| 7,059,974 B1 | 6/2006 | Golliffe et al. |
| 7,066,781 B2 | 6/2006 | Weston |
| D524,298 S | 7/2006 | Hedderich et al. |

(56) References Cited

U.S. PATENT DOCUMENTS

| | | |
|---|---|---|
| 7,081,033 B1 | 7/2006 | Mawle |
| 7,081,051 B2 | 7/2006 | Himoto et al. |
| 7,086,645 B2 | 8/2006 | Hardie |
| 7,090,582 B2 | 8/2006 | Danieli et al. |
| 7,094,147 B2 | 8/2006 | Nakata |
| 7,098,891 B1 | 8/2006 | Pryor |
| 7,098,894 B2 | 8/2006 | Yang |
| 7,102,615 B2 | 9/2006 | Marks |
| 7,102,616 B1 * | 9/2006 | Sleator ............... G06F 3/0325 345/156 |
| 7,107,168 B2 | 9/2006 | Oystol |
| D531,228 S | 10/2006 | Ashida et al. |
| 7,115,032 B2 | 10/2006 | Cantu et al. |
| 7,117,009 B2 | 10/2006 | Wong et al. |
| 7,118,482 B2 | 10/2006 | Ishihara et al. |
| 7,126,584 B1 | 10/2006 | Nishiumi et al. |
| 7,127,370 B2 | 10/2006 | Kelly |
| D531,585 S | 11/2006 | Weitgasser et al. |
| 7,133,026 B2 | 11/2006 | Horie et al. |
| 7,136,674 B2 | 11/2006 | Yoshie et al. |
| 7,136,826 B2 | 11/2006 | Alsafadi |
| 7,137,899 B2 | 11/2006 | Hiei |
| 7,139,983 B2 | 11/2006 | Kelts |
| 7,140,962 B2 | 11/2006 | Okuda et al. |
| 7,142,191 B2 | 11/2006 | Idesawa et al. |
| 7,145,551 B1 | 12/2006 | Bathiche |
| 7,149,627 B2 | 12/2006 | Ockerse |
| 7,154,475 B2 | 12/2006 | Crew |
| 7,155,604 B2 | 12/2006 | Kawai |
| 7,158,116 B2 | 1/2007 | Poltorak |
| 7,158,118 B2 | 1/2007 | Liberty |
| 7,160,196 B2 | 1/2007 | Thirkettle et al. |
| 7,168,089 B2 | 1/2007 | Nguyen et al. |
| 7,173,604 B2 | 2/2007 | Marvit |
| 7,176,919 B2 | 2/2007 | Drebin |
| 7,180,414 B2 | 2/2007 | Nyfelt |
| 7,180,503 B2 | 2/2007 | Burr |
| 7,182,691 B1 | 2/2007 | Schena |
| 7,183,480 B2 | 2/2007 | Nishitani et al. |
| 7,184,059 B1 | 2/2007 | Fouladi |
| D543,246 S | 5/2007 | Ashida et al. |
| 7,220,220 B2 | 5/2007 | Stubbs et al. |
| 7,223,173 B2 | 5/2007 | Masuyama et al. |
| 7,225,101 B2 | 5/2007 | Usuda et al. |
| 7,231,063 B2 | 6/2007 | Naimark |
| 7,233,316 B2 | 6/2007 | Smith et al. |
| 7,236,156 B2 | 6/2007 | Liberty et al. |
| 7,239,301 B2 | 7/2007 | Liberty et al. |
| 7,252,572 B2 | 8/2007 | Wright et al. |
| 7,253,800 B2 | 8/2007 | Goldberg et al. |
| 7,261,690 B2 | 8/2007 | Teller et al. |
| 7,262,760 B2 | 8/2007 | Liberty |
| RE39,818 E | 9/2007 | Slifer |
| 7,288,028 B2 | 10/2007 | Rodriguez et al. |
| D556,201 S | 11/2007 | Ashida et al. |
| 7,291,014 B2 | 11/2007 | Chung et al. |
| 7,292,151 B2 | 11/2007 | Ferguson et al. |
| 7,297,059 B2 | 11/2007 | Vancura et al. |
| 7,301,527 B2 | 11/2007 | Marvit |
| 7,301,648 B2 | 11/2007 | Foxlin |
| D556,760 S | 12/2007 | Ashida et al. |
| 7,307,617 B2 | 12/2007 | Wilson et al. |
| D559,847 S | 1/2008 | Ashida et al. |
| D561,178 S | 2/2008 | Azuma |
| 7,331,857 B2 | 2/2008 | MacIver |
| 7,335,134 B1 | 2/2008 | LaVelle |
| D563,948 S | 3/2008 | d'Hoore |
| 7,337,965 B2 | 3/2008 | Thirkettle et al. |
| 7,339,105 B2 | 3/2008 | Eitaki |
| 7,345,670 B2 | 3/2008 | Armstrong |
| D567,243 S | 4/2008 | Ashida et al. |
| 7,359,121 B2 | 4/2008 | French et al. |
| 7,359,451 B2 | 4/2008 | McKnight |
| 7,361,073 B2 | 4/2008 | Martin |
| RE40,324 E | 5/2008 | Crawford |
| 7,371,177 B2 | 5/2008 | Ellis et al. |
| 7,379,566 B2 | 5/2008 | Hildreth |
| 7,387,559 B2 | 6/2008 | Sanchez-Castro et al. |
| 7,394,459 B2 | 7/2008 | Bathiche et al. |
| 7,395,181 B2 | 7/2008 | Foxlin |
| 7,398,151 B1 | 7/2008 | Burrell et al. |
| 7,408,453 B2 | 8/2008 | Breed |
| 7,414,611 B2 | 8/2008 | Liberty |
| 7,419,428 B2 | 9/2008 | Rowe |
| 7,424,388 B2 | 9/2008 | Sato |
| 7,428,499 B1 | 9/2008 | Philyaw |
| 7,435,179 B1 | 10/2008 | Ford |
| 7,441,151 B2 | 10/2008 | Whitten et al. |
| 7,442,108 B2 | 10/2008 | Ganz |
| 7,445,550 B2 | 11/2008 | Barney et al. |
| 7,465,212 B2 | 12/2008 | Ganz |
| 7,488,231 B2 | 2/2009 | Weston |
| 7,488,254 B2 | 2/2009 | Himoto |
| 7,489,299 B2 | 2/2009 | Liberty et al. |
| 7,492,268 B2 | 2/2009 | Ferguson et al. |
| 7,492,367 B2 | 2/2009 | Mahajan et al. |
| 7,500,917 B2 | 3/2009 | Barney et al. |
| 7,502,759 B2 | 3/2009 | Hannigan et al. |
| 7,519,537 B2 | 4/2009 | Rosenberg |
| 7,524,246 B2 | 4/2009 | Briggs et al. |
| 7,535,456 B2 | 5/2009 | Liberty et al. |
| 7,536,156 B2 | 5/2009 | Tischer |
| 7,556,563 B2 | 7/2009 | Ellis et al. |
| 7,564,426 B2 | 7/2009 | Poor |
| 7,568,289 B2 | 8/2009 | Burlingham et al. |
| 7,572,191 B2 | 8/2009 | Weston et al. |
| 7,582,016 B2 | 9/2009 | Suzuki |
| 7,596,466 B2 | 9/2009 | Ohta |
| 7,614,958 B2 | 11/2009 | Weston et al. |
| 7,623,115 B2 | 11/2009 | Marks |
| 7,627,139 B2 | 12/2009 | Marks |
| 7,627,451 B2 | 12/2009 | Vock et al. |
| 7,629,886 B2 * | 12/2009 | Steeves ............... G06K 7/10108 340/10.1 |
| 7,645,178 B1 | 1/2010 | Trotto et al. |
| 7,662,015 B2 | 2/2010 | Hui |
| 7,663,509 B2 | 2/2010 | Shen |
| 7,674,184 B2 | 3/2010 | Briggs et al. |
| 7,704,135 B2 | 4/2010 | Harrison |
| 7,704,146 B2 | 4/2010 | Ellis |
| 7,727,090 B2 | 6/2010 | Gant |
| 7,749,089 B1 | 7/2010 | Briggs et al. |
| 7,774,155 B2 | 8/2010 | Sato et al. |
| 7,775,882 B2 | 8/2010 | Kawamura et al. |
| 7,775,884 B1 | 8/2010 | McCauley |
| 7,789,741 B1 | 9/2010 | Fields |
| 7,796,116 B2 | 9/2010 | Salsman et al. |
| 7,828,295 B2 | 11/2010 | Matsumoto et al. |
| 7,850,527 B2 | 12/2010 | Barney et al. |
| 7,862,428 B2 | 1/2011 | Borge |
| 7,878,905 B2 | 2/2011 | Weston et al. |
| 7,883,420 B2 | 2/2011 | Bradbury |
| 7,896,742 B2 | 3/2011 | Weston et al. |
| 7,927,216 B2 | 4/2011 | Ikeda |
| 7,942,745 B2 | 5/2011 | Ikeda |
| 7,989,971 B2 | 8/2011 | Lemieux |
| 8,021,239 B2 | 9/2011 | Weston et al. |
| 8,025,573 B2 | 9/2011 | Stenton et al. |
| 8,033,901 B2 | 10/2011 | Wood |
| 8,089,458 B2 | 1/2012 | Barney et al. |
| 8,164,567 B1 | 4/2012 | Barney et al. |
| 8,169,406 B2 | 5/2012 | Barney et al. |
| 8,184,097 B1 | 5/2012 | Barney et al. |
| 8,206,223 B2 | 6/2012 | Marans et al. |
| 8,226,493 B2 | 7/2012 | Briggs et al. |
| 8,248,367 B1 | 8/2012 | Barney et al. |
| 8,287,372 B2 | 10/2012 | Hong et al. |
| 8,287,373 B2 | 10/2012 | Marks et al. |
| 8,330,284 B2 | 12/2012 | Weston et al. |
| 8,342,929 B2 | 1/2013 | Briggs et al. |
| 8,368,648 B2 | 2/2013 | Barney et al. |
| 8,373,659 B2 | 2/2013 | Barney et al. |
| 8,384,668 B2 | 2/2013 | Barney et al. |
| 8,439,757 B2 | 5/2013 | Hornsby et al. |

(56) References Cited

U.S. PATENT DOCUMENTS

| | | |
|---|---|---|
| 8,469,766 B2 | 6/2013 | Zheng |
| 8,475,275 B2 | 7/2013 | Weston et al. |
| 8,491,389 B2 | 7/2013 | Weston et al. |
| 8,531,050 B2 | 9/2013 | Barney et al. |
| 8,535,153 B2 | 9/2013 | Bradbury et al. |
| 8,545,335 B2 | 10/2013 | Fiegener et al. |
| 8,550,916 B2 | 10/2013 | Raynal |
| 8,602,857 B2 | 12/2013 | Morichau-Beauchant et al. |
| 8,608,535 B2 | 12/2013 | Weston et al. |
| 8,686,579 B2 | 4/2014 | Barney et al. |
| 8,702,515 B2 | 4/2014 | Weston et al. |
| 8,708,821 B2 | 4/2014 | Barney et al. |
| 8,711,094 B2 | 4/2014 | Barney et al. |
| 8,753,165 B2 | 6/2014 | Weston |
| 8,758,136 B2 | 6/2014 | Briggs et al. |
| 8,790,180 B2 | 7/2014 | Barney et al. |
| 8,795,079 B2 | 8/2014 | Penzias, III |
| 8,814,688 B2 | 8/2014 | Barney et al. |
| 8,827,810 B2 | 9/2014 | Weston et al. |
| 8,834,271 B2 | 9/2014 | Ikeda |
| 8,870,655 B2 | 10/2014 | Ikeda |
| 8,888,576 B2 | 11/2014 | Briggs et al. |
| 8,894,462 B2 | 11/2014 | Leyland et al. |
| 8,913,011 B2 | 12/2014 | Barney et al. |
| 8,915,785 B2 | 12/2014 | Barney et al. |
| 8,961,260 B2 | 2/2015 | Weston |
| 8,961,312 B2 | 2/2015 | Barney et al. |
| 9,039,533 B2 | 5/2015 | Barney et al. |
| 9,138,650 B2 | 9/2015 | Barney et al. |
| 9,149,717 B2 | 10/2015 | Barney et al. |
| 9,162,148 B2 | 10/2015 | Barney et al. |
| 9,162,149 B2 | 10/2015 | Weston et al. |
| 9,180,378 B2 | 11/2015 | Reiche |
| 9,186,585 B2 | 11/2015 | Briggs et al. |
| 9,272,206 B2 | 3/2016 | Weston et al. |
| 9,320,976 B2 | 4/2016 | Weston |
| 9,393,491 B2 | 7/2016 | Barney et al. |
| 9,393,500 B2 | 7/2016 | Barney et al. |
| 9,446,319 B2 | 9/2016 | Barney et al. |
| 9,463,380 B2 | 10/2016 | Weston et al. |
| 9,468,854 B2 | 10/2016 | Briggs et al. |
| 9,474,962 B2 | 10/2016 | Barney et al. |
| 9,480,929 B2 | 11/2016 | Weston |
| 9,579,568 B2 | 2/2017 | Barney et al. |
| 9,616,334 B2 | 4/2017 | Weston et al. |
| 9,675,878 B2 | 6/2017 | Barney et al. |
| 9,707,478 B2 | 7/2017 | Barney et al. |
| 9,713,766 B2 | 7/2017 | Barney et al. |
| 9,731,194 B2 | 8/2017 | Briggs et al. |
| 9,737,797 B2 | 8/2017 | Barney et al. |
| 9,770,652 B2 | 9/2017 | Barney et al. |
| 9,770,653 B2 | 9/2017 | Hansson et al. |
| 9,814,973 B2 | 11/2017 | Barney et al. |
| 9,861,887 B1 | 1/2018 | Briggs et al. |
| 9,931,578 B2 | 4/2018 | Weston |
| 9,993,724 B2 | 6/2018 | Barney et al. |
| 10,010,790 B2 | 7/2018 | Weston et al. |
| 10,022,624 B2 | 7/2018 | Barney et al. |
| 2001/0010514 A1 | 8/2001 | Ishino |
| 2001/0015123 A1 | 8/2001 | Nishitani et al. |
| 2001/0018361 A1 | 8/2001 | Acres |
| 2001/0021950 A1 | 9/2001 | Hawley |
| 2001/0024973 A1* | 9/2001 | Meredith ............ A63F 13/06 463/36 |
| 2001/0031652 A1 | 10/2001 | Gabai et al. |
| 2001/0031662 A1 | 10/2001 | Larian |
| 2001/0039206 A1 | 11/2001 | Peppel |
| 2001/0040591 A1 | 11/2001 | Abbott et al. |
| 2001/0049302 A1 | 12/2001 | Hagiwara et al. |
| 2001/0054082 A1 | 12/2001 | Rudolph et al. |
| 2002/0005787 A1* | 1/2002 | Gabai ................ H04B 1/202 340/12.29 |
| 2002/0024500 A1 | 2/2002 | Howard |
| 2002/0024675 A1 | 2/2002 | Foxlin |
| 2002/0028071 A1 | 3/2002 | Molgaard |
| 2002/0028710 A1 | 3/2002 | Ishihara et al. |
| 2002/0032067 A1* | 3/2002 | Barney ............... A63G 33/00 472/128 |
| 2002/0036617 A1 | 3/2002 | Pryor |
| 2002/0038267 A1 | 3/2002 | Can et al. |
| 2002/0052238 A1 | 5/2002 | Muroi |
| 2002/0058459 A1* | 5/2002 | Holt ................... A63H 33/00 446/484 |
| 2002/0062251 A1 | 5/2002 | Anandan et al. |
| 2002/0068500 A1 | 6/2002 | Gabai et al. |
| 2002/0072418 A1 | 6/2002 | Masuyama |
| 2002/0075335 A1 | 6/2002 | Relimoto |
| 2002/0077180 A1 | 6/2002 | Swanberg et al. |
| 2002/0077182 A1 | 6/2002 | Swanberg et al. |
| 2002/0090985 A1 | 7/2002 | Tochner et al. |
| 2002/0090992 A1 | 7/2002 | Legge et al. |
| 2002/0098887 A1 | 7/2002 | Himoto et al. |
| 2002/0103026 A1 | 8/2002 | Himoto et al. |
| 2002/0107069 A1 | 8/2002 | Ishino |
| 2002/0107591 A1 | 8/2002 | Gabai et al. |
| 2002/0116615 A1 | 8/2002 | Nguyen et al. |
| 2002/0118147 A1 | 8/2002 | Solomon |
| 2002/0123377 A1 | 9/2002 | Shulman |
| 2002/0126026 A1 | 9/2002 | Lee et al. |
| 2002/0128056 A1 | 9/2002 | Kato |
| 2002/0137427 A1 | 9/2002 | Peters |
| 2002/0137567 A1 | 9/2002 | Cheng |
| 2002/0140745 A1 | 10/2002 | Ellenby |
| 2002/0158751 A1 | 10/2002 | Bormaster |
| 2002/0158843 A1 | 10/2002 | Levine |
| 2002/0183961 A1 | 12/2002 | French et al. |
| 2003/0001016 A1 | 1/2003 | Fraier |
| 2003/0013513 A1 | 1/2003 | Rowe |
| 2003/0022736 A1 | 1/2003 | Cass |
| 2003/0027634 A1 | 2/2003 | Matthews, III |
| 2003/0036425 A1 | 2/2003 | Kaminkow et al. |
| 2003/0037075 A1 | 2/2003 | Hannigan |
| 2003/0038778 A1 | 2/2003 | Noguera |
| 2003/0040347 A1 | 2/2003 | Roach et al. |
| 2003/0052860 A1 | 3/2003 | Park et al. |
| 2003/0057808 A1 | 3/2003 | Lee et al. |
| 2003/0060286 A1 | 3/2003 | Walker et al. |
| 2003/0063068 A1 | 4/2003 | Anton |
| 2003/0063139 A1 | 4/2003 | Hohberger |
| 2003/0064812 A1 | 4/2003 | Rappaport et al. |
| 2003/0069077 A1 | 4/2003 | Korienek |
| 2003/0073505 A1 | 4/2003 | Tracy |
| 2003/0095101 A1 | 5/2003 | Jou |
| 2003/0096652 A1 | 5/2003 | Siegel et al. |
| 2003/0107551 A1 | 6/2003 | Dunker |
| 2003/0114233 A1 | 6/2003 | Hiei |
| 2003/0134679 A1 | 7/2003 | Siegel et al. |
| 2003/0144047 A1 | 7/2003 | Sprogis |
| 2003/0144056 A1 | 7/2003 | Leifer et al. |
| 2003/0149803 A1 | 8/2003 | Wilson et al. |
| 2003/0166416 A1 | 9/2003 | Ogata |
| 2003/0171145 A1 | 9/2003 | Rowe |
| 2003/0171190 A1 | 9/2003 | Rice |
| 2003/0190967 A1 | 10/2003 | Henry |
| 2003/0193572 A1 | 10/2003 | Wilson et al. |
| 2003/0195037 A1 | 10/2003 | Vuong et al. |
| 2003/0195041 A1 | 10/2003 | McCauley |
| 2003/0195046 A1 | 10/2003 | Bartsch |
| 2003/0204361 A1 | 10/2003 | Townsend |
| 2003/0214259 A9 | 11/2003 | Dowling et al. |
| 2003/0216176 A1* | 11/2003 | Shimizu ............. A63F 13/10 463/31 |
| 2003/0222851 A1 | 12/2003 | Lai |
| 2003/0234914 A1 | 12/2003 | Solomon |
| 2004/0028258 A1 | 2/2004 | Naimark |
| 2004/0034289 A1 | 2/2004 | Teller et al. |
| 2004/0043806 A1 | 3/2004 | Kirby et al. |
| 2004/0048666 A1 | 3/2004 | Bagley |
| 2004/0054900 A1 | 3/2004 | He |
| 2004/0063480 A1 | 4/2004 | Wang |
| 2004/0070564 A1 | 4/2004 | Dawson |
| 2004/0075650 A1 | 4/2004 | Paul |
| 2004/0081313 A1 | 4/2004 | McKnight et al. |
| 2004/0095317 A1 | 5/2004 | Zhang |

(56) References Cited

U.S. PATENT DOCUMENTS

| | | |
|---|---|---|
| 2004/0102247 A1 | 5/2004 | Smoot et al. |
| 2004/0119693 A1 | 6/2004 | Kaemmler |
| 2004/0121834 A1 | 6/2004 | Libby et al. |
| 2004/0134341 A1 | 7/2004 | Sandoz |
| 2004/0140954 A1 | 7/2004 | Faeth |
| 2004/0143413 A1 | 7/2004 | Oystol |
| 2004/0147317 A1 | 7/2004 | Ito et al. |
| 2004/0152499 A1 | 8/2004 | Lind et al. |
| 2004/0152515 A1 | 8/2004 | Wegmuller et al. |
| 2004/0152520 A1 | 8/2004 | Shinoda |
| 2004/0174287 A1 | 9/2004 | Deak |
| 2004/0193413 A1 | 9/2004 | Wilson |
| 2004/0198158 A1 | 10/2004 | Driscoll et al. |
| 2004/0203638 A1 | 10/2004 | Chan |
| 2004/0207597 A1 | 10/2004 | Marks |
| 2004/0214642 A1 | 10/2004 | Beck |
| 2004/0218104 A1 | 11/2004 | Smith |
| 2004/0222969 A1 | 11/2004 | Buchenrieder |
| 2004/0227725 A1 | 11/2004 | Calarco |
| 2004/0229693 A1 | 11/2004 | Lind |
| 2004/0229696 A1 | 11/2004 | Beck |
| 2004/0236453 A1 | 11/2004 | Szoboszlay |
| 2004/0239626 A1 | 12/2004 | Noguera |
| 2004/0252109 A1 | 12/2004 | Trent et al. |
| 2004/0254020 A1 | 12/2004 | Dragusin |
| 2004/0259465 A1 | 12/2004 | Wright et al. |
| 2004/0259651 A1 | 12/2004 | Storek |
| 2004/0268393 A1 | 12/2004 | Hunleth |
| 2005/0017454 A1 | 1/2005 | Endo et al. |
| 2005/0020369 A1 | 1/2005 | Davis |
| 2005/0032582 A1 | 2/2005 | Mahajan et al. |
| 2005/0047621 A1 | 3/2005 | Cranfill |
| 2005/0054457 A1 | 3/2005 | Eyestone |
| 2005/0059488 A1 | 3/2005 | Larsen et al. |
| 2005/0059503 A1 | 3/2005 | Briggs et al. |
| 2005/0060586 A1 | 3/2005 | Burger et al. |
| 2005/0070359 A1 | 3/2005 | Rodriquez et al. |
| 2005/0076161 A1 | 4/2005 | Albanna |
| 2005/0085298 A1 | 4/2005 | Woolston |
| 2005/0110751 A1 | 5/2005 | Wilson et al. |
| 2005/0116020 A1 | 6/2005 | Smolucha et al. |
| 2005/0125826 A1 | 6/2005 | Hunleth |
| 2005/0127868 A1 | 6/2005 | Calhoon et al. |
| 2005/0130739 A1 | 6/2005 | Argentar |
| 2005/0134555 A1 | 6/2005 | Liao |
| 2005/0138851 A1 | 6/2005 | Ingraselino |
| 2005/0156883 A1 | 7/2005 | Wilson et al. |
| 2005/0162389 A1 | 7/2005 | Obermeyer |
| 2005/0164601 A1 | 7/2005 | McEachen et al. |
| 2005/0170889 A1 | 8/2005 | Lum et al. |
| 2005/0172734 A1 | 8/2005 | Alsio |
| 2005/0174324 A1 | 8/2005 | Liberty |
| 2005/0176485 A1 | 8/2005 | Ueshima |
| 2005/0179644 A1 | 8/2005 | Alsio |
| 2005/0202866 A1 | 9/2005 | Luciano et al. |
| 2005/0210418 A1 | 9/2005 | Marvit |
| 2005/0210419 A1 | 9/2005 | Kela |
| 2005/0212749 A1 | 9/2005 | Marvit et al. |
| 2005/0212750 A1 | 9/2005 | Marvit et al. |
| 2005/0212751 A1 | 9/2005 | Marvit et al. |
| 2005/0212752 A1 | 9/2005 | Marvit et al. |
| 2005/0212753 A1 | 9/2005 | Marvit et al. |
| 2005/0212754 A1 | 9/2005 | Marvit et al. |
| 2005/0212755 A1 | 9/2005 | Marvit |
| 2005/0212756 A1 | 9/2005 | Marvit et al. |
| 2005/0212757 A1 | 9/2005 | Marvit et al. |
| 2005/0212758 A1 | 9/2005 | Marvit et al. |
| 2005/0212759 A1 | 9/2005 | Marvit et al. |
| 2005/0212760 A1 | 9/2005 | Marvit et al. |
| 2005/0212764 A1 | 9/2005 | Toba |
| 2005/0212767 A1 | 9/2005 | Marvit |
| 2005/0215295 A1 | 9/2005 | Arneson |
| 2005/0215322 A1 | 9/2005 | Himoto et al. |
| 2005/0217525 A1 | 10/2005 | McClure |
| 2005/0227579 A1 | 10/2005 | Yamaguchi et al. |
| 2005/0233808 A1 | 10/2005 | Himoto et al. |
| 2005/0239548 A1 | 10/2005 | Ueshima et al. |
| 2005/0243061 A1 | 11/2005 | Liberty et al. |
| 2005/0243062 A1 | 11/2005 | Liberty |
| 2005/0253806 A1 | 11/2005 | Liberty et al. |
| 2005/0256675 A1 | 11/2005 | Kurata |
| 2005/0277465 A1 | 12/2005 | Whitten et al. |
| 2005/0278741 A1 | 12/2005 | Robarts |
| 2006/0003843 A1 | 1/2006 | Kobayashi et al. |
| 2006/0007115 A1 | 1/2006 | Furuhashi |
| 2006/0009270 A1 | 1/2006 | Kobayash et al. |
| 2006/0028446 A1 | 2/2006 | Liberty |
| 2006/0040720 A1 | 2/2006 | Harrison |
| 2006/0046849 A1 | 3/2006 | Kovacs |
| 2006/0092133 A1 | 5/2006 | Touma |
| 2006/0094502 A1 | 5/2006 | Katayama et al. |
| 2006/0122474 A1 | 6/2006 | Teller et al. |
| 2006/0123146 A1 | 6/2006 | Wu et al. |
| 2006/0148563 A1 | 7/2006 | Yang |
| 2006/0152487 A1 | 7/2006 | Grunnet-Jepsen |
| 2006/0152488 A1 | 7/2006 | Salsman |
| 2006/0152489 A1 | 7/2006 | Sweetser |
| 2006/0178212 A1 | 8/2006 | Penzias |
| 2006/0205507 A1 | 9/2006 | Ho |
| 2006/0231794 A1 | 10/2006 | Sakaguchi et al. |
| 2006/0246403 A1 | 11/2006 | Monpouet et al. |
| 2006/0252475 A1 | 11/2006 | Zalewski et al. |
| 2006/0252477 A1 | 11/2006 | Zalewski et al. |
| 2006/0256081 A1 | 11/2006 | Zalewski et al. |
| 2006/0258452 A1 | 11/2006 | Hsu |
| 2006/0264258 A1 | 11/2006 | Zalewski et al. |
| 2006/0264260 A1 | 11/2006 | Zalewski et al. |
| 2006/0267935 A1 | 11/2006 | Corson |
| 2006/0273907 A1 | 12/2006 | Heiman |
| 2006/0282873 A1 | 12/2006 | Zalewski et al. |
| 2006/0284842 A1 | 12/2006 | Poltorak |
| 2006/0287085 A1 | 12/2006 | Mao |
| 2006/0287086 A1 | 12/2006 | Zalewski et al. |
| 2006/0287087 A1 | 12/2006 | Zalewski et al. |
| 2007/0015588 A1 | 1/2007 | Matsumoto et al. |
| 2007/0021208 A1 | 1/2007 | Mao et al. |
| 2007/0049374 A1 | 3/2007 | Ikeda et al. |
| 2007/0050597 A1 | 3/2007 | Ikeda |
| 2007/0052177 A1 | 3/2007 | Ikeda et al. |
| 2007/0060391 A1 | 3/2007 | Ikeda et al. |
| 2007/0066394 A1 | 3/2007 | Ikeda et al. |
| 2007/0072680 A1 | 3/2007 | Ikeda et al. |
| 2007/0082720 A1 | 4/2007 | Bradbury et al. |
| 2007/0087837 A1 | 4/2007 | Bradbury et al. |
| 2007/0087838 A1 | 4/2007 | Bradbury et al. |
| 2007/0087839 A1 | 4/2007 | Bradbury et al. |
| 2007/0091084 A1 | 4/2007 | Ueshima et al. |
| 2007/0093170 A1 | 4/2007 | Zheng |
| 2007/0093291 A1 | 4/2007 | Hulvey |
| 2007/0093293 A1 | 4/2007 | Osnato |
| 2007/0100696 A1 | 5/2007 | Illingworth |
| 2007/0159362 A1 | 7/2007 | Shen |
| 2007/0173705 A1 | 7/2007 | Teller et al. |
| 2007/0252815 A1 | 11/2007 | Kuo |
| 2007/0257884 A1 | 11/2007 | Taira |
| 2007/0265075 A1 | 11/2007 | Zalewski |
| 2007/0265076 A1 | 11/2007 | Lin |
| 2007/0265088 A1 | 11/2007 | Nakada et al. |
| 2008/0015017 A1 | 1/2008 | Ashida et al. |
| 2008/0039202 A1 | 2/2008 | Sawano et al. |
| 2008/0119270 A1 | 5/2008 | Ohta |
| 2008/0121782 A1 | 5/2008 | Hotelling et al. |
| 2008/0174550 A1 | 7/2008 | Laurila |
| 2008/0216765 A1 | 9/2008 | Kates |
| 2008/0273011 A1 | 11/2008 | Lin |
| 2008/0278445 A1 | 11/2008 | Sweester |
| 2009/0009294 A1 | 1/2009 | Kupstas |
| 2009/0033621 A1 | 2/2009 | Quinn |
| 2009/0080524 A1 | 3/2009 | Fujisawa et al. |
| 2009/0137323 A1 | 5/2009 | Fiegener et al. |
| 2009/0203446 A1 | 8/2009 | Bradbury et al. |
| 2009/0215534 A1 | 8/2009 | Wilson et al. |
| 2009/0273560 A1 | 11/2009 | Kalanithi et al. |
| 2009/0326851 A1 | 12/2009 | Tanenhaus |

(56) References Cited

U.S. PATENT DOCUMENTS

| | | | |
|---|---|---|---|
| 2010/0105475 A1 | 4/2010 | Mikhailov | |
| 2010/0144436 A1 | 6/2010 | Marks et al. | |
| 2010/0289744 A1 | 11/2010 | Cohen | |
| 2011/0081969 A1 | 4/2011 | Ikeda | |
| 2011/0177853 A1* | 7/2011 | Ueshima | A63F 13/211 463/3 |
| 2011/0190052 A1 | 8/2011 | Takeda | |
| 2012/0295699 A1 | 11/2012 | Reiche | |
| 2012/0295703 A1 | 11/2012 | Reiche et al. | |
| 2012/0295704 A1 | 11/2012 | Reiche | |
| 2013/0116051 A1 | 5/2013 | Barney et al. | |
| 2014/0100029 A1 | 4/2014 | Reiche et al. | |
| 2014/0323221 A1 | 10/2014 | Ikeda | |
| 2015/0038229 A1 | 2/2015 | Reiche et al. | |
| 2015/0165316 A1 | 6/2015 | Barney et al. | |
| 2015/0174479 A1 | 6/2015 | Reiche et al. | |
| 2015/0360125 A1 | 12/2015 | Barney et al. | |
| 2016/0067600 A1 | 3/2016 | Barney et al. | |
| 2017/0065879 A1 | 3/2017 | Barney et al. | |
| 2017/0113133 A1 | 4/2017 | Weston et al. | |
| 2017/0340961 A1 | 11/2017 | Weston et al. | |
| 2017/0348593 A1 | 12/2017 | Barney et al. | |
| 2017/0361236 A1 | 12/2017 | Barney et al. | |
| 2018/0015364 A1 | 1/2018 | Barney et al. | |
| 2018/0078853 A1 | 3/2018 | Barney et al. | |
| 2018/0318723 A1 | 11/2018 | Weston | |

FOREIGN PATENT DOCUMENTS

| | | |
|---|---|---|
| CN | 1338961 | 3/2002 |
| CN | 1559644 | 1/2005 |
| DE | 3930581 | 3/1991 |
| DE | 19701374 | 7/1997 |
| DE | 19632273 | 2/1998 |
| DE | 19648487 | 6/1998 |
| DE | 19814254 | 10/1998 |
| DE | 19937307 | 2/2000 |
| DE | 10029173 | 1/2002 |
| DE | 10219198 | 11/2003 |
| EP | 0 264 782 A2 | 4/1988 |
| EP | 0 570 999 | 12/1988 |
| EP | 0 322 825 A2 | 7/1989 |
| EP | 0 695 565 A1 | 2/1996 |
| EP | 0 835 676 | 4/1998 |
| EP | 0 848 226 | 6/1998 |
| EP | 0 852 961 | 7/1998 |
| EP | 1 062 994 | 12/2000 |
| EP | 1 279 425 | 1/2003 |
| EP | 1 293 237 | 3/2003 |
| EP | 0 993 845 | 12/2005 |
| FR | 2547093 A1 | 12/1984 |
| GB | 1524334 | 9/1978 |
| GB | 2244546 | 12/1991 |
| GB | 2284478 | 6/1995 |
| GB | 2307133 | 5/1997 |
| GB | 2310481 | 8/1997 |
| GB | 2316482 | 2/1998 |
| GB | 2319374 | 5/1998 |
| GB | 2325558 A | 11/1998 |
| GB | 2388418 | 11/2003 |
| JP | 62-14527 | 1/1987 |
| JP | 63-174681 | 7/1988 |
| JP | 63-186687 | 8/1988 |
| JP | 03-210622 | 9/1991 |
| JP | 06-050758 | 2/1994 |
| JP | 6154422 | 6/1994 |
| JP | 06-198075 | 7/1994 |
| JP | 6190144 | 7/1994 |
| JP | H0677387 | 10/1994 |
| JP | 06-308879 | 11/1994 |
| JP | 07-028591 | 1/1995 |
| JP | 07-044315 | 2/1995 |
| JP | 07-107573 | 4/1995 |
| JP | 07-115690 | 5/1995 |
| JP | 07-146123 | 6/1995 |
| JP | 07-200142 | 8/1995 |
| JP | 07-211196 A | 8/1995 |
| JP | 07-248723 | 9/1995 |
| JP | 07-262797 | 10/1995 |
| JP | 07-302148 | 11/1995 |
| JP | 07-318332 | 12/1995 |
| JP | 871252 | 3/1996 |
| JP | 08-095704 | 4/1996 |
| JP | 08-106352 | 4/1996 |
| JP | 08-111144 | 4/1996 |
| JP | 08-114415 | 5/1996 |
| JP | 08-122070 | 5/1996 |
| JP | 08-152959 | 6/1996 |
| JP | 08-191953 | 7/1996 |
| JP | 08-196742 | 8/1996 |
| JP | 08-211993 | 8/1996 |
| JP | 08-221187 | 8/1996 |
| JP | 08-305355 | 11/1996 |
| JP | 08-335136 | 12/1996 |
| JP | 09-034456 | 2/1997 |
| JP | 09-149915 | 6/1997 |
| JP | 09-164273 | 6/1997 |
| JP | 09-225137 | 9/1997 |
| JP | 09-230997 | 9/1997 |
| JP | 09-237087 | 9/1997 |
| JP | 09-274534 | 10/1997 |
| JP | 09-319510 | 12/1997 |
| JP | 10-021000 | 1/1998 |
| JP | 10-033831 | 2/1998 |
| JP | 10-043349 A | 2/1998 |
| JP | 10-099542 | 4/1998 |
| JP | 10-154038 | 6/1998 |
| JP | 10-235019 | 9/1998 |
| JP | 10-254614 | 9/1998 |
| JP | 11-053994 | 2/1999 |
| JP | 11-099284 | 4/1999 |
| JP | 2000-176150 | 6/2000 |
| JP | 2000-208756 | 7/2000 |
| JP | 2000-225269 | 8/2000 |
| JP | 2000-254346 | 9/2000 |
| JP | 2000-270237 | 9/2000 |
| JP | 2000-300839 | 10/2000 |
| JP | 2000-308756 | 11/2000 |
| JP | 2000-325653 | 11/2000 |
| JP | 3074434 | 1/2001 |
| JP | 2001-038052 | 2/2001 |
| JP | 2001-058484 | 3/2001 |
| JP | 2001-104643 | 4/2001 |
| JP | U20009165 | 4/2001 |
| JP | 2001-175412 | 6/2001 |
| JP | 3078268 | 6/2001 |
| JP | 2001-251324 | 9/2001 |
| JP | 2001-265521 | 9/2001 |
| JP | 2001-306245 | 11/2001 |
| JP | 2002-007057 | 1/2002 |
| JP | 2002-062981 | 2/2002 |
| JP | 2002-78969 | 3/2002 |
| JP | 2002-082751 | 3/2002 |
| JP | 2002-091692 | 3/2002 |
| JP | 2002-126375 | 5/2002 |
| JP | 2002-136694 | 5/2002 |
| JP | 2002-153673 | 5/2002 |
| JP | 2002-202843 | 7/2002 |
| JP | 2002-224444 | 8/2002 |
| JP | 2002-232549 | 8/2002 |
| JP | 2002-233665 | 8/2002 |
| JP | 2002-298145 | 10/2002 |
| JP | 2003-053038 | 2/2003 |
| JP | 2003-140823 | 5/2003 |
| JP | 2003-208263 | 7/2003 |
| JP | 2003 236246 | 8/2003 |
| JP | 2003-325974 | 11/2003 |
| JP | 2004-062774 | 2/2004 |
| JP | 2004-313429 | 11/2004 |
| JP | 2004-313492 | 11/2004 |
| JP | 2005-040493 | 2/2005 |
| JP | 2005-063230 | 3/2005 |
| JP | 2006-113019 | 4/2006 |

(56) References Cited

FOREIGN PATENT DOCUMENTS

| | | |
|---|---|---|
| JP | 2006-136694 | 6/2006 |
| JP | 2006-216569 | 8/2006 |
| JP | 2007-083024 | 4/2007 |
| JP | 4043702 | 2/2008 |
| NL | 9300171 | 8/1994 |
| RU | 2077358 C1 | 4/1997 |
| RU | 2125853 | 2/1999 |
| RU | 2126161 | 2/1999 |
| RU | 2141738 C1 | 11/1999 |
| WO | WO 1990/007961 | 7/1990 |
| WO | WO 1994/002931 | 3/1994 |
| WO | WO 1995/11730 A1 | 5/1995 |
| WO | WO 1996/005766 | 2/1996 |
| WO | WO 1996/013951 | 5/1996 |
| WO | WO 1996/014115 | 5/1996 |
| WO | WO 1996/014121 | 5/1996 |
| WO | WO 1997/009101 | 3/1997 |
| WO | WO 1997/012337 | 4/1997 |
| WO | WO 1997/017598 | 5/1997 |
| WO | WO 1997/020305 | 6/1997 |
| WO | WO 1997/028864 | 8/1997 |
| WO | WO 1997/032641 | 9/1997 |
| WO | WO 1998/011528 | 3/1998 |
| WO | WO 1998/036400 | 8/1998 |
| WO | WO 1999/058214 | 11/1999 |
| WO | WO 2000/033168 | 6/2000 |
| WO | WO 2000/035345 | 6/2000 |
| WO | WO 2000/061251 A1 | 10/2000 |
| WO | WO 2000/063874 | 10/2000 |
| WO | WO 2000/067863 | 11/2000 |
| WO | WO 2001/046916 A2 | 6/2001 |
| WO | WO 2001/087426 | 11/2001 |
| WO | WO 2001/091042 | 11/2001 |
| WO | WO 2002/017054 | 2/2002 |
| WO | WO 2002/034345 | 5/2002 |
| WO | WO 2002/047013 | 6/2002 |
| WO | WO 2003/015005 | 2/2003 |
| WO | WO 2003/043709 | 5/2003 |
| WO | WO 2003/044743 A2 | 5/2003 |
| WO | WO 2003/088147 | 10/2003 |
| WO | WO 2003/107260 | 12/2003 |
| WO | WO 2004/039055 | 5/2004 |
| WO | WO 2004/051391 | 6/2004 |
| WO | WO 2004/087271 | 10/2004 |
| WO | WO 2006/039339 | 4/2006 |
| WO | WO 2006/101880 | 9/2006 |
| WO | WO 2007/058996 | 5/2007 |
| WO | WO 2007/120880 | 10/2007 |

OTHER PUBLICATIONS

U.S. Pat. No. 7,749,089, Non-Final Rejection, dated Feb. 27, 2002, Response after Non-Final Action, dated Sep. 4, 2002, Final Rejection, dated Dec. 2, 2002, Request for Continued Examination, dated Jun. 2, 2003, Non-Final Rejection, dated Aug. 27, 2003, Response after Non-Final Action, dated Mar. 3, 2004, Final Rejection, dated Feb. 5, 2007, Request for Continued Examination, dated May 8, 2007, Non-Final Rejection, dated Jun. 11, 2007, Response after Non-Final Action, dated Jun. 22, 2007, Final Rejection, dated Oct. 11, 2007, Request for Continued Examination, dated Oct. 29, 2007, Supplemental Amendment, dated Mar. 11, 2008, Non-Final Rejection, dated Jul. 9, 2008, Response after Non-Final Action, dated Nov. 10, 2008, Final Rejection, dated Feb. 5, 2009, Request for Continued Examination, dated May 5, 2009, Non-Final Rejection, dated Jul. 22, 2009, Response after Non-Final Action, dated Dec. 18, 2009, Supplemental Amendment, dated Jan. 22, 2010, Notice of Allowance, dated Apr. 2, 2010.

U.S. Appl No. 11/429,913, Non-Final Rejection, dated Mar. 27, 2008, Response after Non-Final Action, dated Aug. 27, 2008, Final Rejection, dated Dec. 16, 2008, Request for Continued Examination, dated Apr. 15, 2009, Supplemental Amendment, dated May 28, 2009, Non-Final Rejection, dated Sep. 2, 2009, Response after Non-Final Action, dated Jan. 22, 2010, Final Rejection, dated May 11, 2010.

U.S. Pat. No. 8,342,929, Non-Final Rejection, dated May 8, 2012, Response after Non-Final Action, dated Aug. 8, 2012, Notice of Allowance, dated Sep. 7, 2012.

U.S. Pat. No. 8,888,576, Non-Final Rejection, dated Nov. 12, 2013, Response after Non-Final Action, dated Jan. 8, 2014, Notice of Allowance, dated Feb. 20, 2014, Request for Continued Examination, dated Apr. 14, 2014, Notice of Allowance, dated Oct. 9, 2014.

U.S. Pat. No. 8,758,136, Notice of Allowance, dated Apr. 1, 2014.

U.S. Pat. No. 9,186,585, Preliminary Amendment, dated Oct. 30, 2014, Notice of Allowance, dated Apr. 3, 2015.

U.S. Pat. No. 9,468,854, Preliminary Amendment, dated Mar. 2, 2016, Notice of Allowance, dated Jun. 8, 2016.

U.S. Pat. No. 9,731,194, Preliminary Amendment, dated Feb. 6, 2017, Notice of Allowance, dated Apr. 10, 2017.

U.S. Pat. No. 9,864,887, Preliminary Amendment, dated Sep. 8, 2017, Notice of Allowance, dated Oct. 19, 2017.

U.S. Pat. No. 6,967,566, Non-Final Rejection, dated Jul. 28, 2004, Response after Non-Final Action, dated Nov. 1, 2004, Final Rejection, dated Jan. 26, 2005, Amendment after Final Rejection, dated Mar. 28, 2005, Notice of Allowance, dated Apr. 22, 2005.

U.S. Pat. No. 8,608,535, Non-Final Rejection, dated Mar. 5, 2007, Response after Non-Final Action, dated Jun. 27, 2007, Non-Final Rejection, dated Apr. 2, 2009, Response after Non-Final Action, dated Aug. 31, 2009, Non-Final Rejection, dated Oct. 21, 2009, Response after Non-Final Action, dated Jan. 21, 2010, Final Rejection, dated Feb. 24, 2010, Request for Continued Examination, dated Jun. 23, 2010, Non-Final Rejection, dated Sep. 21, 2010, Response after Non-Final Action, dated Jan. 19, 2011, Final Rejection, dated Feb. 11, 2011, Request for Continued Examination, dated Jun. 10, 2011, Non-Final Rejection, dated Sep. 9, 2011, Response after Non-Final Action, dated Jan. 6, 2012, Final Rejection, dated Jan. 26, 2012, Request for Continued Examination, dated May 25, 2012, Non-Final Rejection, dated Nov. 14, 2012, Response after Non-Final Action, dated Apr. 12, 2013, Notice of Allowance, dated May 3, 2013.

U.S. Appl. No. 11/507,934, Non-Final Rejection, dated Aug. 5, 2010, Response after Non-Final Action, dated Feb. 3, 2011, Final Rejection, dated Apr. 14, 2011.

U.S. Pat. No. 8,827,810, Non-Final Rejection, dated Nov. 14, 2011, Response after Non-final Action, dated Feb. 14, 2012, Final Rejection, dated Jun. 13, 2012, Continued Examination, dated Dec. 11, 2012, Non-Final Rejection, dated Nov. 7, 2013, Response after Non-final Action, dated Feb. 3, 2014, Notice of Allowance, dated May 21, 2014.

U.S. Pat. No. 9,162,149, Preliminary Amendment, dated Sep. 18, 2014, Non-Final Rejection, dated Nov. 4, 2014, Response after Non-Final Action, dated Feb. 4, 2015, Notice of Allowance, dated Jun. 8, 2015.

U.S. Pat. No. 8,702,515, Non-Final Rejection, dated Jun. 14, 2012, Response after Non-Final Action, dated Dec. 11, 2012, Final Rejection, dated Apr. 11, 2013, Request for Continued Examination, dated Sep. 4, 2013, Notice of Allowance, dated Nov. 14, 2013, Suppl Notice of Allowance, dated Mar. 18, 2014.

U.S. Pat. No. 9,616,334, Preliminary Amendment, dated Jul. 30, 2014, Supp. Preliminary Amendment, dated Mar. 31, 2016, Non-Final Rejection, dated Aug. 10, 2016, Response to Non-Final Rejection, dated Oct. 14, 2016, Notice of Allowance, dated Feb. 14, 2017.

U.S. Appl. No. 15/480,886, Preliminary Amendment, dated Aug. 17, 2017, Preliminary Amendment, dated Aug. 25, 2017.

U.S. Pat. No. 9,272,206, Preliminary Amendment, dated Jul. 19, 2013, Non-Final Rejection, dated May 14, 2015, Notice of Allowance, dated Jan. 12, 2016.

U.S. Pat. No. 9,463,380, Preliminary Amendment, dated Jan. 29, 2016, Preliminary Amendment, dated Mar. 9, 2016, Notice of Allowance, dated Aug. 18, 2016.

U.S. Appl. No. 15/255,691, Preliminary Amendment, dated Jan. 16, 2017, Office Action, dated Oct. 17, 2017, Response after Non-Final Action, dated Jan. 9, 2018, Notice of Allowance, dated Mar. 13, 2018.

(56) References Cited

OTHER PUBLICATIONS

U.S. Pat. No. 6,761,637, Non-Final Rejection, dated Jun. 11, 2003, Response after Non-Final Action, dated Nov. 3, 2003, Notice of Allowance, dated Dec. 1, 2003.
U.S. Pat. No. 7,500,917, Non-Final Rejection, dated Oct. 20, 2004, Response after Non-Final Action, dated Jan. 25, 2005, Final Rejection, dated Apr. 1, 2005, Request for Continued Examination, dated Jun. 30, 2005, Non-Final Rejection, dated Sep. 28, 2005, Response after Non-Final Action, dated Dec. 20, 2005, Final Rejection, dated May 18, 2006, Appeal Brief, dated Oct. 27, 2006, Examiner's Answer, dated Mar. 15, 2007, BPAI Decision—Examiner Reversed, dated Aug. 19, 2008, Notice of Allowance, dated Oct. 3, 2008.
U.S. Pat. No. 7,850,527, Non-Final Rejection, dated Aug. 20, 2008, Response after Non-Final Action, dated Dec. 17, 2008, Non-Final Rejection, dated Oct. 28, 2009, Response after Non-Final Action, dated Apr. 26, 2010, Supplemental Amendment, dated Jul. 1, 2010, Notice of Allowance, dated Oct. 15, 2010.
U.S. Pat. No. 8,708,821, Non-Final Rejection, dated May 21, 2013, Response to Non-Final Action, dated Jul. 30, 2013, Supplemental Amendment, dated Sep. 5, 2013, Notice of Allowance, dated Nov. 5, 2013.
U.S. Pat. No. 9,149,717, Preliminary Amendment, dated Mar. 24, 2014, Non-Final Office Action, dated Feb. 25, 2015, Response to Non-Final Action, dated May 15, 2015, Notice of Allowance, dated Jun. 29, 2015.
U.S. Pat. No. 9,579,568, Preliminary Amendment, dated Feb. 17, 2016, Non-final Response, dated May 31, 2016, Notice of Allowance, dated Aug. 18, 2016.
U.S. Pat. No. 9,713,766, Notice of Allowance, dated Jun. 23, 2017.
U.S. Appl. No. 15/621,858, Preliminary Amendment, dated Sep. 7, 2017.
U.S. Pat. No. 7,445,550, Non-Final Rejection, dated Oct. 29, 2007, Response to Non-Final Action, dated Feb. 13, 2008, Supplemental Amendment, dated Mar. 12, 2008, Notice of Allowance, dated Jul. 2, 2008.
U.S. Pat. No. 8,089,458, Preliminary Amendment, dated Mar. 14, 2011, Notice of Allowance, dated Jul. 25, 2011, Request for Continued Examination, dated Aug. 19, 2011, Notice of Allowance, dated Sep. 20, 2011.
U.S. Pat. No. 7,878,905, Non-Final Rejection, dated Mar. 31, 2008, Response to Non-Final Rejection, dated Jun. 25, 2008, Non-Final Rejection, dated Dec. 2, 2008, Response to Non-Final Rejection, dated Mar. 2, 2009, Final Rejection, dated Jul. 2, 2009, Request for Continued Examination, dated Nov. 2, 2009, Non-Final Rejection, dated Nov. 23, 2009, Response to Non-Final Rejection, dated Mar. 22, 2010, Final Rejection, dated Jun. 21, 2010, Amendment After Final, dated Oct. 7, 2010, Request for Continued Examination, dated Oct. 27, 2010, Notice of Allowance, dated Nov. 15, 2010.
U.S. Pat. No. 7,896,742, Preliminary Amendment, dated Feb. 20, 2008, Non-Final Rejection, dated Jun. 3, 2010, Response to Non-Final Rejection, dated Jul. 1, 2010, Notice of Allowance, Nov. 9, 2010.
U.S. Pat. No. 8,330,284, Preliminary Amendment, dated Jul. 5, 2011, Suppl. Preliminary Amendment, dated Feb. 27, 2012, Notice of Allowance, dated Aug. 3, 2012.
U.S. Pat. No. 8,531,050, Notice of Allowance, dated Feb. 8, 2013, Request for Continued Examination, dated May 7, 2013, Notice of Allowance, dated Jun. 7, 2013.
U.S. Pat. No. 8,491,389, Preliminary Amendment, dated Aug. 19, 2011, Suppl. Preliminary Amendment, dated Feb. 27, 2012, Notice of Allowance, dated Oct. 9, 2012.
U.S. Pat. No. 8,169,406, Notice of Allowance, dated Nov. 16, 2011.
U.S. Pat. No. 8,164,097, Preliminary Amendment, dated Dec. 6, 2011, Suppl. Preliminary Amendment, dated Mar. 1, 2012, Notice of Allowance, dated Mar. 8, 2012.
U.S. Pat. No. 8,164,567, Preliminary Amendment, dated Dec. 8, 2011, Suppl. Preliminary Amendment, dated Feb. 27, 2012, Notice of Allowance, dated Mar. 7, 2012.
U.S. Pat. No. 8,248,367, Notice of Allowance, dated May 21, 2012, Amendment after Allowance, dated May 30, 2012.
U.S. Pat. No. 8,475,275, Notice of Allowance, dated Dec. 26, 2012, Request for Continued Examination, dated Jan. 9, 2013, Notice of Allowance, dated Apr. 8, 2013.
U.S. Pat. No. 8,373,659, Preliminary Amendment, dated Jul. 11, 2012, Supp. Preliminary Amendment, dated Jul. 30, 2012, Notice of Allowance, dated Dec. 5, 2012.
U.S. Pat. No. 8,368,648, Notice of Allowance, dated Nov. 2, 2012.
U.S. Pat. No. 8,684,668, Notice of Allowance, dated Nov. 30, 2012.
U.S. Pat. No. 9,707,478, Suppl. Preliminary Amendment, dated Dec. 26, 2013, Non-Final Rejection, dated Jul. 27, 2016, Response to Non-Final Rejection, dated Jul. 28, 2016, Non-Final Rejection, dated Sep. 28, 2016, Response to Non-Final Rejection, dated Jan. 27, 2017, Notice of Allowance, dated Mar. 20, 2017.
U.S. Appl. No. 13/725,775, Suppl. Preliminary Amendment, dated Dec. 26, 2013, Response to Non-Final Rejection, dated Aug. 11, 2016, Abandoned, dated Feb. 17, 2017.
U.S. Pat. No. 8,790,180, Suppl. Preliminary Amendment, dated Dec. 26, 2013, Notice of Allowance, dated Apr. 1, 2013.
U.S. Pat. No. 8,711,094, Suppl. Preliminary Amendment, dated Sep. 25, 2013, Notice of Allowance, dated Nov. 22, 2013.
U.S. Pat. No. 8,814,688, Non-Final Rejection, dated Jan. 22, 2014, Response to Non-Final Rejection, dated Apr. 3, 2014, Notice of Allowance, dated Jun. 4, 2014.
U.S. Pat. No. 9,675,878, Suppl. Preliminary Amendment, dated Dec. 26, 2013, Restriction Requirement, dated May 18, 2016, Restriction Requirement Response, dated Jul. 15, 2016, Non-Final Rejection, dated Sep. 16, 2016, Response to Non-Final Office Action, dated Jan. 17, 2017, Notice of Allowance, dated Feb. 15, 2017.
U.S. Appl. 8686,579, Notice of Allowance, dated Nov. 5, 2013, Corrected Notice of Allowance, dated Dec. 10, 2013, Corrected Notice of Allowance, dated Jan. 31, 2014.
U.S. Pat. No. 9,138,650, Preliminary Amendment, dated Jun. 2, 2014, Notice of Allowance, dated May 14, 2015.
U.S. Pat. No. 8,913,011, Preliminary Amendment, dated Jun. 30, 2014, Notice of Allowance, dated Sep. 25, 2014.
U.S. Pat. No. 8,961,312, Non-Final Rejection, dated Jul. 11, 2014, Response to Non-Final Rejection, dated Oct. 8, 2014, Suppl. Response, dated Nov. 7, 2014, Notice of Allowance, dated Nov. 21, 2014.
U.S. Pat. No. 8,915,785, Preliminary Amendment, dated Jul. 22, 2014, Notice of Allowance, dated Sep. 4, 2014.
U.S. Pat. No. 9,039,533, Preliminary Amendment, dated Aug. 28, 2014, Non-Final Office Action, dated Oct. 21, 2014, Notice of Allowance, dated Dec. 17, 2014.
U.S. Pat. No. 9,162,148, Preliminary Amendment, dated Dec. 17, 2014, Non-Final Office Action, dated Feb. 25, 2015, Response after Non-Final Action, dated May 15, 2015, Notice of Allowance, dated Jun. 9, 2015.
U.S. Pat. No. 9,474,962, Preliminary Amendment, dated Dec. 23, 2014, Non-Final Office Action, dated Jul. 30, 2015, Response after Non-Final Action, dated Nov. 30, 2015, Final Office Action, dated Feb. 12, 2016, Response to Final Office Action, dated Apr. 29, 2016, Notice of Allowance, dated Jun. 14, 2016.
U.S. Appl. No. 14,628,531, Preliminary Amendment, dated Feb. 24, 2015, Supp. Preliminary Amendment, dated Apr. 8, 2015, Restriction Requirement, dated Apr. 29, 2015, Response to Restriction Requirement, dated Jun. 29, 2015.
U.S. Appl. No. 14/850,808, Preliminary Amendment, dated Nov. 25, 2015.
U.S. Pat. No. 9,393,491, Preliminary Amendment, dated Oct. 21, 2015, Non-Final Rejection, dated Feb. 16, 2016, Non-Final Rejection Response, dated Mar. 15, 2016, Notice of Allowance, dated May 26, 2016.
U.S. Pat. No. 9,770,652, Preliminary Amendment, dated Oct. 3, 2016, Non-Final Rejection, dated Mar. 10, 2017, Non-Final Rejection Response, dated May 2, 2017, Notice of Allowance, dated Aug. 3, 2017.
U.S. Pat. No. 9,737,797, Preliminary Amendment, dated Oct. 27, 2016, Non-Final Rejection, dated Apr. 27, 2017, Non-Final Rejection Response, dated May 2, 2017, Notice of Allowance, dated Jun. 14, 2017, Non-Final Rejection, dated Feb. 22, 2016, Response to

(56) References Cited

OTHER PUBLICATIONS

Non-Final Rejection, dated Jul. 22, 2016, Final Rejection, dated Nov. 2, 2016, Abandoned, dated May 17, 2017.
U.S. Appl. No. 14/832,912, Preliminary Amendment, dated Aug. 28, 2015, Non-Final Rejection, dated Oct. 29, 2015, Response after Non-Final Action, dated Jan. 27, 2016, Non-Final Rejection, dated Sep. 6, 2016, Response to Non-Final Action, dated Jan. 6, 2017, Final Rejection, dated Apr. 7, 2017.
U.S. Appl. No. 9,393,500, Preliminary Amendment, dated May 26, 2015, Non-Final Rejection, dated Mar. 2, 2016, Notice of Allowance, dated Jun. 8, 2016.
U.S. Pat. No. 9,814,973, Preliminary Amendment, dated Jan. 16, 2017, Notice of Allowance, dated Sep. 25, 2017.
U.S. Appl. No. 15/669,684, Preliminary Amendment, dated Oct. 10, 2017, Non-Final Rejection, dated Jan. 3, 2018, Non-Final Rejection Response, dated Mar. 19, 2018.
U.S. Appl. No. 15/629,238, Preliminary Amendment, dated Aug. 29, 2017.
U.S. Appl. No. 15/730,674, Preliminary Amendment, dated Dec. 12, 2017, Non-Final Rejection, dated Apr. 6, 2018.
U.S. Pat. No. 9,446,319, Non-Final Rejection, dated Mar. 4, 2016, Non-Final Rejection Response, dated Apr. 29, 2016, Notice of Allowance, dated Jun. 17, 2016.
U.S. Appl. No. 15/268,331, Preliminary Amendment, dated Nov. 22, 2016, Office Action, dated Dec. 29, 2017, Response to Office Action, dated Jan. 4, 2018, Office Action, dated Mar. 14, 2018, Response to Office Action, dated Mar. 19, 2018.
U.S. Pat. No. 7,066,781, Non-Final Rejection, dated Mar. 17, 2008, Response to Non-Final Rejection, dated Jun. 16, 2008, Notice of Allowance, dated Oct. 3, 2008.
U.S. Pat. No. 7,488,231, Non-Final Rejection, dated Mar. 17, 2008, Response to Non-Final Rejection, dated Jun. 16, 2008, Notice of Allowance, dated Oct. 3, 2008.
U.S. Pat. No. 8,753,165, Non-Final Rejection, dated Sep. 22, 2010, Response to Non-Final Rejection, dated Jan. 21, 2011, Final Rejection, dated Mar. 30, 2011, Response to Final Rejection, dated May 31, 2011, Supplemental Amendment, dated Jun. 12, 2012, $2^{nd}$ Supplemental Amendment, dated Mar. 20, 2013, Non-Final Rejection, dated Jul. 3, 2013, Response to Non-Final Rejection, dated Sep. 26, 2013, Supplemental Amendment, dated Oct. 21, 2013, Notice of Allowance, dated Dec. 18, 2013, Rule 312 Amendment, dated Jan. 9, 2014.
U.S. Pat. No. 8,961,260, Non-Final Rejection, dated Jul. 29, 2014, Response to Non-Final Rejection, dated Oct. 22, 2014, Notice of Allowance, dated Nov. 24, 2014.
U.S. Pat. No. 9,320,976, Preliminary Amendment, dated Aug. 3, 2015, Non-Final Rejection, dated Oct. 28, 2015, Response to Non-Final Rejection, dated Jan. 13, 2016, Notice of Allowance, dated Mar. 2, 2016.
U.S. Pat. No. 9,480,929, Preliminary Amendment, dated Mar. 25, 2016, Non-Final Rejection, dated Jul. 13, 2016, Response to Non-Final Rejection, dated Jul. 19, 2016, Notice of Allowance, dated Aug. 22, 2016.
U.S. Pat. No. 9,931,578, Preliminary Amendment, dated Nov. 22, 2016, Non-Final Rejection, dated Jun. 15, 2017, Non-Final Rejection Response, dated Sep. 8, 2017, Notice of Allowance, dated Dec. 1, 2017.
U.S. Appl. No. 15/907,734, filed Feb. 28, 2018.
"Kirby Tilt 'n' Tumble 2" http://www.unseen64.net/2008/04/08/koro-koro-kirby-2-kirby-tilt-n-tumble-2-gc-unreleased/, Apr. 8, 2008 (accessed on Jul. 29, 2011).
"Emerald Forest Toys" [online] [retrieved on Sep. 14, 2005], retrieved from Internet <URL:http://www.pathworks.net/print_eft.html>.
Boulanger et al., "The 1997 Mathews Radio Baton and Improvisation Modes," Music Synthesis Department, Berklee College of Music (1997).
Complainants' Petition for Review, dated Sep. 17, 2012.
Complainants' Response to Commission's Request for Statements on the Public Interest, dated Oct. 10, 2012.
Complainants' Response to Respondents' Petition for Review, dated Sep. 25, 2012.
*Creative Kingdoms LLC* v. *ITC*, The United States Court of Appeals for the Federal Circuit, No. 2014-1072, dated Dec. 19, 2014.
Exintaris, et al., "Ollivander's Magic Wands : HCI Development," available at http://www.cim.mcgill.ca/~jer/courses/hci/project/2002/www.ece.mcgill.ca/%257Eurydice/hci/notebook/final/MagicWand.pdf (2002).
Expert Report of Branimir R. Vojcic, Ph.D. On Behalf of Complainants Creative Kingdoms, LLC and New Kingdoms, LLC, dated Nov. 17, 2011.
Expert Report of Kenneth Holt on Behalf of Respondents Nintendo of America, Inc. and Nintendo Co., Ltd., dated Nov. 3, 2011.
Expert Report of Nathaniel Polish, Ph.D. On Behalf of Respondents Nintendo of America, Inc. and Nintendo Co., Ltd., dated Nov. 3, 2011.
IGN Article—Mad Catz Rumble Rod Controller, Aug. 20, 1999.
Initial Determination on Violation of Section 337 and Recommended Determination on Remedy and Bond, dated Aug. 31, 2012.
Marrin, Teresa, "Toward an Understanding of Musical Gesture: Mapping Expressive Intention with the Digital Baton," Masters Thesis, Massachusetts Institute of Technology, Program in Media Arts and Sciences (Jun. 1996).
Nintendo N64 Controller Pak Instruction Booklet, 1997.
Paradiso, et al., "Musical Applications of Electric Field Sensing", available at http://pubs.media.mit.edu/pubs/papers/96_04_cmj.pdf (Apr. 1996).
Paradiso, Joseph A., "The Brain Opera Technology: New Instruments and Gestural Sensors for Musical Interaction and Performance" (Nov. 1998) (electronic copy available at http://pubs.media.mitedu/pubs/papers/98_3_JNMR_Brain_Opera.pdf).
Petition of the Office of Unfair Import Investigations for Review-In-Part of the Final Initial Determination, dated Sep. 17, 2012.
Pre-Hearing Statement of Complainants Creative Kingdoms, LLC and New Kingdoms, LLC, dated Jan. 13, 2012.
Public Version of Commission Opinion from United States International Trade Commission, dated Oct. 28, 2013.
Respondents Nintendo Co., Ltd. and Nintendo of America Inc.'s Contingent Petition for Review of Initial Determination, dated Sep. 17, 2012.
Respondents Nintendo Co., Ltd. and Nintendo of America Inc.'s Objections and Supplemental Responses to Complainants Creative Kingdoms, LLC and New Kingdoms, LLC's Interrogatory Nos. 35, 44, 47, 53, and 78, dated Oct. 13, 2011.
Respondents Nintendo Co., Ltd. and Nintendo of America Inc.'s Response to Complainants' and Staff's Petitions for Review, dated Sep. 25, 2012.
Response of the Office of Unfair Import Investigations to the Petitions for Review, dated Sep. 25, 2012.
Response to Office Action dated Sep. 18, 2009 for U.S. Appl. No. 11/404,844.
Specification of the Bluetooth System—Core v1.0b, Dec. 1, 1999.
Verplaetse, "Inertial Proprioceptive Devices: Self-Motion Sensing Toys and Tools," IBM Systems Journal, vol. 35, Nos. 3&4 (Sep. 1996).
"HyperScan", release date Oct., 2006. Source http://www.giantbomb.com/hyperscan/3045-1 041.
"Smart Card News Online", published Oct. 25, 2006, source www.smartcard.co.uklNOLARCH/2006/October/251006.html.
"Gatemaster Features", "Gatemaster Main Screen", "Gatemaster: So You're a Computer Geek eh?", and "Gatemaster Pricing" by Gate Master Management System, internet article, Jul. 9, 1997; http://web.archive.org/web/19970709135000/www.gatemaster.com/gmfeat.htm (accessed on Dec. 11, 2008).
"Ollivanders: Makers of Fine Wands." Dec. 2, 2002. [online] [retrieved on Mar. 30, 2005], Retrieved from Internet (URL:http//www.cim.mcgill.edu/!jer/courses/hci/assignments/2002/www.ece.mcgill.ca/%7Euryd).
23-mm Glass Encapsulated Transponder, Reference Guide, Texas Instruments, Jul. 1996, 22 pages.
International Preliminary Examination Report, International App. No. PCT/US00/09482; dated Apr. 24, 2001; 4 pages.

(56) References Cited

OTHER PUBLICATIONS

International Search Report and Written Opinion, International App. No. PCT/US04/08912; dated Aug. 26, 2004.
International Search Report and Written Opinion, International App. No. PCT/US05/34831; dated Jul. 2, 2008; 11 pages.
International Search Report and Written Opinion; International Appl. No. PCT/US2006/043915; dated Mar. 9, 2007; 8 pages.
Laser Tag: General info: History of Laser Tag, http://lasertag.org/general/history.html (accessed on Mar. 13, 2008; historical dates start on Mar. 1984).
Laser Tag: Laser Tag Branded Gear; last update Sep. 26, 2006, http://home.comcast.net/~ferret1963/Laser_Tag_Brand.HTML (accessed on Mar. 13, 2008; historical dates start in 1986).
Mattern, "State of the Art and Future Trends in Distributed Systems and Ubiquitous Computing", published on or before Aug. 31, 2000 and printed from URL < http://www.vs.inf.ethz.ch/publ/papers/DisSysUbiComp Report.pdf >, 14 pages.
Owl Magic Wand & Owl Magic Orb Raving Toy Maniac, Nov. 19, 2001. [online] [retrieved on Mar. 30, 2005], Retrieved from the Internet (URL:http://www.toymania.com/news/messages/1358.shtm1).
Tag-it™ Inlays by Texas Instruments, Product Bulletin, Copyright 2000 Texas Instruments Incorporated, Data Sheet 05/00 2 pages.
"At-home fishing", http://www.virtualpet.com/vp/media/fishing/homef.jpg (accessed on Jan. 14, 2010).
"Coleco Vision: Super Action™ Controller Set," www.vintagecomputing.com/wp-content/images/retroscan/coleco_sac_1_large.jpg. (downloaded from Internet on Sep. 2, 2011; available at http://www.vintagecomputing.com on Sep. 4, 2006).
"Controllers-Atari Space Age Joystick," AtariAge: Have You Played Atari Today? www.atariage.com/controller_page.html?SystemID=2600& ControllerID-12., Sep. 1, 2006.
"Controllers-BoosterGrip," AtariAge: Have You Played Atari Today? www.atariage.com/controller_page.html?SystemID=2600& ControllerID=18., (accessed on Jul. 29, 2011; allegedly available as early as Sep. 1, 2006).
"Electronic Plastic: BANDAI—Power Fishing" "Power Fishing Company: BANDAI," 1 page, http://www.handhelden.com/Bandai/PowerFishing.html., 1984 (accessed on Jul. 29, 2011).
"Game Controller" Wikipedia, Jan. 5, 2005.
"Get Bass," Videogame by Sega, The International Arcade Museum and the KLOV (accessed at http://www.arcade-museum.com/game_detail.php?game_id=7933 on Jul. 29, 2011).
"Glove-based input interfaces" Cyberglove/Cyberforce, http://www.angelfire.com/ca7/mellott124/glovel.htm (accessed on Jul. 29, 2011).
"Harry Potter Magic Spell Challenge," Tiger Electronics, 2001.
"Imp Coexists With Your Mouse," Byte, p. 255, Jan. 1994.
Kirby Tilt 'n' Tumble (GCN-GBA Spaceworld 2001, You Tube Video, uploaded by adonfjv on Sep. 5, 2006 (accessed at http://www.youtube.com/watch?v=5rLhlwp2iGk on Sep. 7, 2011; digital video available upon request).
"MEMS enable smart golf clubs," Small Times, Jan. 6, 2005, accessed at http://dpwsa.electroiq.com/index/display/semiconductors-article-display/269788/articles/small-times/consumer/2005/01/mems-enable-smart-golf-clubs.html on Jul. 29, 2011.
"Miacomet and Interact Announce Agreement to Launch Line of Real Feel™ Sport Controllers", PR Newswire (May 13, 1999), accessed at http://www.thefreelibrary.com/_print/PrintArticle.aspx?id=54621351 on Sep. 7, 2011.
"The N.I.C.E. Project," YouTube video uploaded by evltube on Nov. 20, 2007 (accessed at http://www.youtube.com/watch?v=ihGXa21qLms on Sep. 8, 2011; digital video available upon request).
"212 Series Encoders" HT12A/HT12E by HOLTEK—Product Specification, Apr. 2000.
"212 Series of Decoders" HT12D/HT12F by HOLTEK—Product Specification, Nov. 2002.
"ASCII Entertainment releases the Grip," ASCII Entertainment Software—Press News—Coming Soon Magazine, May 1997 (electronic version accessed at http://www.csoon.com/issue25/p_ascii4.htm on Sep. 6, 2011).
"Enchanted Spell-Casting Sorcerers Wand" by Ken Holt as featured on www.inventionconnection.com online advertisement, Dec. 2002.
"Interview with Pat Goschy, the "Real" Nintendo Wii Inventor," YouTube video uploaded by agbulls on Jan. 14, 2008 (accessed at http://www.youtube.com/watch?v=oKtZysYGDLE on Feb. 11, 2011; digital video available upon request).
"Micro Tilt Switch" D6B by Omron® Product Specification, Jan. 2007.
"Nintendo Wii Controller Invented by Americans: Midway Velocity Controller Technology Brief," You Tube Video presentation dated Jun. 28, 2000; uploaded by drjohniefever on Sep. 8, 2007 (accessed at http://www.youtube.com/watch?v=wjLhSrSxFNw on Jun. 30, 2010; digital video available upon request).
"Raise High the 3D Roof Beam: Kids shape these PC games as they go along." By Anne Field, article as featured in Business Week 2001. (Nov. 26, 2001).
"Serial-in Parallel-out Shift Register" SN54/74LS164 by Motorola-Product Specification, Fifth Edition, 1992.
"Sony PS2 Motion Controller 5 years ago (2004)," YouTube Video uploaded by r1oot on Jul. 8, 2009 (accessed at http://www.youtube.com/watch?v=JbSzmRt7HhQ&feature=related on Sep. 6, 2011; digital video available upon request).
"The Big Ideas Behind Nintendo's Wii," Business Week, Nov. 16, 2006 (accessed at http://www.businessweek.com/technology/content/nov2006/tc20061116_750580.htm on Aug. 31, 2011).
"The Magic Labs Conjure Wands" as featured on www.magic-lab.com Product Specification, Dec. 2002.
"Tilt Switch" by Fuji & Co. as featured on www.fuji-piezo.com online advertisement, May 2001.
"Toy Wand Manufacturer Selects MEMSIC Sensor: Magic Labs cuts costs with MEMSIC sensor" Press Release by MEMSIC, Inc. as featured on www.memsic.com, May 2002.
"Wii Mailbag," IGN.com, Jan. 26, 2006 (accessed at http://uk.wii.ign.com/mail/2006-01-26.html on Aug. 31, 2011).
Acar, et al., "Experimental evaluation and comparative analysis of commercial variable-capacitance MEMS accelerometers," Journal of Micromechanics and Microengineering, vol. 13 (1), pp. 634-645, May 2003.
Achenbach, "Golfs New Measuring Stick," Golfweek, 1 page., Jun. 11, 2005.
ACT Labs, Miacomet Background, Jan. 27, 2001, http://web.archive.org/web/200101271753/http://www.act-labs.com/ realfeel_background.htm, (accessed on Sep. 7, 2011).
Agard, "Advances in Strapdown Inertial Systems," Agard Lecture Series No. 133, Advisory Group for Aerospace Research and Development, Neuilly-Sur-Seine (France) May 1984.
AirPad Controller Manual, (AirPad Corp. 2000).
Airpad Motion Reflex Controller for Sony Playstation—Physical Product, (AirPad Corp. 2000).
Algrain, "Estimation of 3-D Angular Motion Using Gyroscopes and Linear Accelerometers," IEEE Transactions on Aerospace and Electronic Systems, vol. 27, No. 6, pp. 910-920, Nov. 1991.
Algrain, et al., "Accelerometer Based Line-of-Sight Stabilization Approach for Pointing and Tracking System," Second IEEE Conference on Control Applications, Sep. 13-16, 1993 Vancouver, B.C., pp. 159-163 Sep. 13-16, 1993.
Algrain, et al., "Interlaced Kalman Filtering of 3-D Angular Motion Based on Euler's Nonlinear Equations," IEEE Transactions on Aerospace and Electronic Systems, vol. 30, No. 1, Jan. 1994.
Allen, et al., "A General Method for Comparing the Expected Performance of Tracing and Motion Capture Systems," {VRST} '05: Proceedings of the ACM Symposium on Virtual Reality Software and Technology, Nov. 7-9, 2005 Monterey, California Nov. 7-9, 2005.
Allen, et al., "Tracking: Beyond 15 Minutes of Thought," SIGGRAPH 2001 Course 11, Aug. 2001.
Analog Devices "ADXL202E Low-Cost .+-.2 g Dual-Axis Accelerometer with Duty Cycle Output" Data Sheet, Rev. A, Oct. 2000.
Analog Devices "ADXL330 Small, Low Power, 3-Axis ±2 g MEMS Accelerometer" Data Sheet, Rev. PrA Oct. 2005.
Analog Devices "ADXL50 Monolithic Accelerometer with Signal Conditioning" Data Sheet Mar. 1996.

(56) References Cited

OTHER PUBLICATIONS

Analog Devices "ADXRS150±150° C. /s Single Chip Yaw Rate Gyro with Signal Conditioning" Data Sheet, Rev. B, Mar. 2004.
Analog Devices "ADXRS401 ±75° C./s Single Chip Yaw Rate Gyro with Signal Conditioning" Data Sheet, Rev. O, Jul. 2004.
Analog Devices "MicroConverter®, Multichannel 12-Bit ADC with Embedded Flash MCU, ADuC812" Data Sheet (Feb. 2003), available at http://www.analog.com/static/imported-files/data_sheets/ADUC812.pdf.
Analog Devices, "ADXL150/ADXL250, ±5g to ±50g, Low Noise, Low Power, Single/Dual Axis MEMS® Accelerometers," Data Sheet, Rev. 0 (Apr. 1998).
Ang, et al., "Design and Implementation of Active Error Canceling in Hand-held Microsurgical Instrument," Paper presented at 2001 IEEE/RSJ International Conference on Intelligent Robots and Systems (Oct./Nov. 2001).
Ang, et al., "Design of All-Accelerometer Inertial Measurement Unit for Tremor Sensing in Hand-held Microsurgical Instrument," Proceedings of the 2003 IEEE International Conference on Robotics & Automation, Sep. 14-19, 2003, Taipei, Taiwan, pp. 1781-1786, Sep. 14-19, 2003.
Apostolyuk, Vladislav, "Theory and Design of Micromechanical Vibratory Gyroscopes," MEMS/NEMS Handbook, Springer, vol. 1, pp. 173-195 (May 2006).
Ascension Technology, 6D Bird Class B Installation and Operation Guide, Apr. 30, 2003.
ASCII, picture of one-handed controller, 2 pages, Feb. 6, 2006.
Ator, "Image-Velocity Sensing with Parallel-Slit Reticles," Journal of the Optical Society of America, vol. 53, No. 12, pp. 1416-1422, Dec. 1963.
Azarbayejani, et al, "Real-Time 3-D Tracking of the Human Body," M.I.T. Media Laboratory Perceptual Computing Section Technical Report No. 374, Appears in Proceedings of Image'Com 96, Bordeaux, France, May 1996.
Azarbayejani, et al., "Visually Controlled Graphics," M.I.T. Media Laboratory Perceptual Computing Section Technical Report No. 374, Appears in IEEE Transactions on Pattern Analysis and Machine Intelligence, vol. 15, No. 6, pp. 602-605, Jun. 1993.
Azuma et al., "Improving Static and Dynamic Registration in an Optical See-Through HMD," Paper Presented at SIGGRAPH '94 Annual Conference in Orlando, FL, Mar. 1994.
Azuma, "Predictive Tracking for Augmented Reality," Ph.D. Dissertation, University of North Carolina at Chapel Hill, Department of Computer Science, Feb. 1995.
Azuma, et al., "A Frequency-Domain Analysis of Head-Motion Prediction," Paper Presented at SIGGRAPH '95 Annual Conference in Los Angeles, CA, Feb. 1995.
Azuma, et al., "A motion-stabilized outdoor augmented reality system," Proceedings of IEEE Virtual Reality '99, Houston, TX, Mar. 13-17, 1999, pp. 252-259.
Azuma, et al., "Making Augmented Reality Work Outdoors Requires Hybrid Tracking, "Proceedings of the International Workshop on Augmented Reality, San Francisco, CA, Nov. 1, 1998.
Bachmann et al., "Inertial and Magnetic Posture Tracking for Inserting Humans into Networked Virtual Environments," Virtual Reality Software and Technology archive, Paper Presented at ACM Symposium on Virtual Reality Software and Technology in Banff, Alberta, Canada, Dec. 2000.
Bachmann et al., "Orientation Tracking for Humans and Robots Using Inertial Sensors" Paper Presented at 199 International Symposium on Computational Intelligence in Robotics & Automation (CIRA '99), Mar. 1999.
Bachmann, "Inertial and Magnetic Angle Tracking of Limb Segments for Inserting Humans into Synthetic Environments," Dissertation, Naval Postgraduate School, Monterey, CA (Dec. 2000).
Badler, et al., "Multi-Dimensional Input Techniques and Articulated Figure Positioning by Multiple Constraints," Interactive 3D Graphics, Oct. 1986; pp. 151-169.
Baker et al., "Active Multimodal Control of a 'Floppy' Telescope Structure," Proc. SPIE, vol. 4825, pp. 74-81 (2002).

Balakrishnan, "The Rockin' Mouse: Integral 3D Manipulation on a Plane," Published in Proceedings of 1997 ACM Conference on Human Factors in Computing Systems (CHI'97), pp. 311-318, Jun. 1997.
Ballagas, et al., "iStuff: A Physical User Interface Toolkit for Ubiquitous Computer Environments," Paper presented at SIGCHI Conference on Human Factors in Computing Systems, Apr. 2003.
Baraff, "An Introduction to Physically Based Modeling: Rigid Body Simulation I—Unconstrained Rigid Body Dynamics," SIGGRAPH 97 Course Notes, Robotics Institute, Carnegie Mellon University (Aug. 1997).
Baudisch, et al., "Soap: a Pointing Device that Works in Mid-air," Proc. UIST'06, Oct. 15-18, 2006, Montreux, Switzerland (Oct. 2006).
BBN Report No. 7661, "Virtual Environment Technology for Training (VETT)," The Virtual Environment and Teleoperator Research Consortium (VETREC), pp. III-A-27 to III-A-40 (Mar. 1992).
Behringer, "Improving the Registration Precision by Visual Horizon Silhouette Matching," Paper presented at First IEEE Workshop on Augmented Reality (Feb. 1998).
Behringer, "Registration for Outdoor Augmented Reality Applications Using Computer Vision Techniques and Hybrid Sensors," Paper presented at IEEE Virtual Reality (VR '99) Conference in Houston, TX (Mar. 1999).
BEI GyrochipTM Model QRS11 Data Sheet, BEI Systron Donner Inertial Division, BEI Technologies, Inc., (Sep. 1998).
Benbasat, "An Inertial Measurement Unit for User Interfaces," Massachusetts Institute of Technology Masters Thesis, (Sep. 2000).
Benbasat, et al., "An Inertial Measurement Framework for Gesture Recognition and Applications," Paper Presented at International Gesture Workshop on Gesture and Sign Languages in Human-Computer Interaction (GW '01), London, UK (Sep. 2001).
Bhatnagar, "Position trackers for Head Mounted Display systems: A survey" (Technical Report), University of North Carolina at Chapel Hill (Mar. 1993).
Bianchi, "A Tailless Mouse, New cordless Computer Mouse Invented by ArcanaTech," Inc.com, Jun. 1, 1992 (accessed at http://www.inc.com/magazine/19920601/4115.html on Jun. 17, 2010).
Bishop, "The Self-Tracker: A Smart Optical Sensor on Silicon," Ph.D. Dissertation, Univ. of North Carolina at Chapel Hill (1984), 65 pages.
Bjork, Staffan et al., "Pirates! Using the Physical World as a Game Board," Reportedly presented as part of Interact 2001: 8th TC.13 IFIP International Conference on Human-Computer Interaction, Tokyo Japan (Jul. 9-13, 2001).
Bluffing Your Way in Pokemon, Oct. 14, 2002, 7 pages.
Bona, et al., "Optimum Reset of Ship's Inertial Navigation System," IEEE Transactions on Aerospace and Electronic Systems, Abstract only (1965) (accessed at http://oai.dtic.mil/oai/oai?verb=getRecord&metadataPrefix=html&identifier=AD0908193 on Jun. 17, 2010).
Borenstein, et al., "Where am I? Sensors and Methods for Mobile Robot Positioning" (Apr. 1996).
Borovoy, R. , et al., "Things that Blink: Computationally Augmented Name Tags," IBM Systems Journal, vol. 35, Nos. 3 & 4, 1996; pp. 488-495 (May 1996).
Borovoy, Richard et al., "Groupware: Nametags That Tell About Relationships," Chi 98, Apr. 1998, pp. 329-330.
Boser, "3-Axis Accelerometer with Differential Sense Electronics," Berkeley Sensor & Actuator Center, available at http://www.eecs.berkeley.edu/.about.boser/pdf/3axis.pdf (Feb. 1997).
Boser, "Accelerometer Design Example: Analog Devices XL-05/5," Berkeley Sensor & Actuator Center, available at http://www.eecs.berkeley.edu/.about.boser/pdf/xl05.pdf (1996).
Bowman, et al., "An Introduction to 3-D User Interface Design," MIT Presence, vol. 10, No. 1, pp. 96-108 (Feb. 2001).
Briefs, (New & Improved), (Brief Article), PC Magazine, Oct. 26, 1993.
Britton et al., "Making Nested Rotations Convenient for the User," SIGGRAPH '78 Proceedings of the 5th Annual Conference on Computer Graphics and Interactive Techniques, vol. 12, Issue 3, pp. 222-227 (Aug. 1978).
Britton, "A Methodology for the Ergonomic Design of Interactive Computer Graphic Systems, and its Application to Crystallography"

(56) References Cited

OTHER PUBLICATIONS

Ph.D. Dissertation, University of North Carolina at Chapel Hill, Dept. of Computer Science (1977).
Brownell, Richard, Review: Peripheral-GameCube-G3 Wireless Controller, gamesarefun.com, Jul. 13, 2003 (accessed at http://www.gamesarefun.com/gamesdb/perireview.php?perireviewid=1 on Jul. 29, 2011).
Buchanan, Levi: "Happy Birthday, Rumble Pak," IGN.com, Apr. 3, 2008 (accessed at http://retro.ign.com/articles/864/864231p1.html on Jul. 29, 2011).
Business Wire, "Feature/Virtual reality glasses that interface to Sega channel,Time Warner, TCI; project announced concurrent with COMDEX," Nov. 14, 1994 (accessed at http://findarticles.com/p/articles/mi_m0EIN/is_1994_Nov_14/ai_15923497/?tag=content;col1 on Jul. 7, 2010).
Business Wire, "Free-space 'Tilt' Game Controller for Sony Playstation Uses Scenix Chip; SX Series IC Processes Spatial Data in Real Time for On-Screen," Dec. 6, 1999 (accessed at http://findarticles.com/p/articles/mi_m0EIN/is_1999_Dec_6/ai_58042965/?tag=content;col1 on Jul. 7, 2010)).
Business Wire, "Logitech MAGELLAN 3D Controller," Apr. 14, 1997 (accessed at http://www.thefreelibrary.com/_/print/PrintArticle.aspx?id=19306114 on Feb. 10, 2011).
Business Wire, "Mind Path Introduces GYROPOINT RF Wireless Remote," Jan. 27, 2000 (accessed at http://www.allbusiness.com/company-activities-management/operations-office/6381880-1.html on Jun. 17, 2010).
Business Wire, "Pegasus' Wireless PenCell Writes on Thin Air with ART's Handwriting Recognition Solutions," Business Editors/High Tech Writers Telecom Israel 2000 Hall 29, Booth 19-20, Nov. 7, 2000 (accessed at http://www.highbeam.com/doc/1G1-66658008.html on Jun. 17, 2010).
Business Wire, "RPI ships low-cost pro HMD Plus 3D Mouse and VR PC graphics card system for CES," Jan. 9, 1995 (accessed at http://www.highbeam.com/doc/1G1-16009561.html on Jun. 17, 2010).
Business Wire, "InterSense Inc. Launches InertiaCube2—The World's Smallest Precision Orientation Sensor with Serial Interface," Aug. 14, 2001 (accessed at http://www.highbeam.com/doc/1G1-77183067.html/print on Sep. 7, 2011.).
Buxton et al., "A Study in Two-Handed Input," Proceedings of CHI '86, pp. 321-326 (1986) (accessed at http://www.billbuxton.com/2hands.html on Jul. 29, 2011).
Buxton, Bill, "A Directory of Sources for Input Technologies" (last updated Apr. 19, 2001), http://web.archive.org/web/20010604004849/http://www.billbuxton.com/InputSources.html (accessed on Sep. 8, 2011).
Buxton, Bill, "Human input/output devices," In M. Katz (ed.), Technology Forecast: 1995, Menlo Park, CA: Price Waterhouse World Firm Technology Center, pp. 49-65 (Sep. 1994).
Canaday, "R67-26 The Lincoln Wand," IEEE Transactions on Electronic Computers, vol. EC-16, No. 2, p. 240 (Apr. 1967) (downloaded from IEEE Xplore on Jul. 7, 2010).
Caruso, "Application of Magnetoresistive Sensors in Navigation Systems," Sensors and Actuators, SAE SP-1220, pp. 15-21 (Feb. 1997); text of article accessed at http://www.ssec.honeywell.com/position-sensors/datasheets/sae.pdf.
Caruso, "Applications of Magnetic Sensors for Low Cost Compass Systems," Honeywell, SSEC, Paper presented at IEEE 2000 Position Location and Navigation Symposium (Mar. 2000), accessed at http://www.ssec.honeywell.com/magnetic/datasheets/lowcost.pdf.
Caruso, et al., "A New Perspective on Magnetic Field Sensing," Sensors Magazine, Dec. 1, 1998 (accessed at http://www.sensorsmag.com/sensors/electric-magnetic/a-new-perspective-magnetic-field-sensing-855 on Jun. 17, 2010).
Caruso, et al., "Vehicle Detection and Compass Applications using AMR Magnetic Sensors", Paper presented at 1999 Sensors Expo in Baltimore, Maryland (May 1999), available at http://masters.donntu.edu.ua/2007/kita/gerus/library/amr.pdf.
Chatfield, "Fundamentals of High Accuracy Inertial Navigation," vol. 174 Progress in Astronautics and Aeronautics, American Institute of Aeronautics and Astronautics, Inc. (1997).
Cheng, "Direct interaction with Large-Scale Display Systems using Infrared Laser Tracking Devices," Paper presented at Australasian Symposium on Information Visualisation, Adelaide, Australia (Jan. 2003).
Cheok, et al., "Micro-Accelerometer Based Hardware Interfaces for Wearable Computer Mixed Reality Applications," 6th International Symposium on Wearable Computers (ISWC'02), 8 pages.
Cho, et al., "Magic Wand: A Hand-Drawn Gesture Input Device in 3-D Space with Inertial Sensors," Proceedings of the 9th Intl Workshop on Frontiers in Handwriting Recognition (IWFHR-9 2004), IEEE (Aug. 2004).
Clark, James H., "Designing Surfaces in 3-D," Graphics and Image Processing-Communications of the ACM, Aug. 1976; vol. 19; No. 8; pp. 454-460.
Clark, James H., "Three Dimensional Man Machine Interaction," Siggraph '76, Jul. 14-16 Philadelphia, Pennsylvania, 1 page.
CNET News.com, "Nintendo Wii Swings Into Action," May 25, 2006 (accessed at http://news.cnet.com/2300-1043_3-6070295-4.html on Aug. 5, 2011).
Cooke, et al., "NPSNET: Flight simulation dynamic modeling using quaternions," Presence, vol. 1, No. 4, pp. 404-420, (Jan. 25, 1994).
Crecente, Brian, "Motion Gaming Gains Momentum," kotaku.com, Sep. 17, 2010 (accessed at http://kotaku.com/5640867/motion-gaming-gains-momentum on Aug. 31, 2011).
Cruz-Neira, et al., "Scientists in Wonderland: A Report on Visualization Applications in the Cave Virtual Reality Environment," 1993 IEEE.
CSIDC Winners—"Tablet-PC Classroom System Wins Design Competition," IEEE Computer Society Press, vol. 36, Issue 8, pp. 15-18, IEEE Computer Society, Aug. 2003.
Cutrone, "Hot products: Gyration GyroPoint Desk, GyroPoint Pro gyroscope-controlled wired and wireless mice," Results from the Comdex Show Floor, Computer Reseller News, Dec. 4, 1995 (accessed from LexisNexis research database on Feb. 17, 2011; see pp. 8 and 9 of reference submitted herewith).
Deering, Michael F. , "HoloSketch a Virtual Reality Sketching Animation Tool," ACM Transactions on Computer-Human Interaction, Sep. 1995; vol. 2, No. 3; pp. 220-238.
Deruyck, et al., "An Electromagnetic Position Sensor," Polhemus Navigation Sciences, Inc., Burlington, VT (Nov. 1973) (Abstract from DTIC Online).
Dichtburn, "Camera in Direct3D" Toymaker (Feb. 6, 2005), http://web.archive.org/web/20050206032104/http:/toymaker.info/games/html/camera.html (accessed on Jul. 29, 2011).
Digital ID Cards the next generation of 'smart' cards will have more than a one-track mind. Wall Street Journal, Jun. 25, 2001.
Donelson, et al., "Spatial Management of Information", Proceedings of 1978 ACM SIGGRAPH Conference in Atlanta, Georgia, pp. 203-209 (Aug. 1977).
Druin et al., Robots: Exploring New Technologies for Learning for Kids; 2000; Chapter One: To Mindstorms and Beyond; 27 pages (Jun. 2000).
Drzymala, Robert E., et al., "A Feasibility Study Using a Stereo-Optical Camera System to Verify Gamma Knife Treatment Specification," Proceedings of 22nd Annual EMBS International Conference, Jul. 2000; pp. 1486-1489.
Durlach, et al., "Virtual Reality: Scientific and Technological Challenges," National Academy Press (1995).
Emura, et al., "Sensor Fusion based Measurement of Human Head Motion," 3rd IEEE International Workshop on Robot and Human Communication (Jul. 1994).
Ewalt, David M., "Nintendo's Wii is a Revolution," Review, Forbes.com, Nov. 13, 2006 (accessed at http://www.forbes.com/2006/11/13/wii-review-ps3-tech-media-cx_de_1113wii.html on Jul. 29, 2011).
Ferrin, "Survey of Helmet Tracking Technologies," Proc. SPIE vol. 1456, p. 86-94 (Apr. 1991).
Fielder, Lauren "E3 2001: Nintendo unleashes GameCube software, a new Miyamoto game, and more," GameSpot, May 16, 2001 (accessed at http://www.gamespot.com/news/2761390/e3-2001-

(56) References Cited

OTHER PUBLICATIONS nintendo-unleashes-gamecube-software-a-new-miyamoto-game-and-more?tag-gallery_summary%3Bstory on Jul. 29, 2011).

U.S. Appl. No. 09/520,148, filed Mar. 7, 2000 by Miriam Mawle.

Foremski, T., "Remote Control Mouse Aims at Interactive TV" Electronics Weekly, Mar. 9, 1994.

Foxlin, "Head-tracking Relative to a Moving Vehicle or Simulator Platform Using Differential Inertial Sensors," Proceedings of Helmet and Head-Mounted Displays V, SPIE vol. 4021, AeroSense Symposium, Orlando, FL, Apr. 24-25, 2000 (2000).

Foxlin, "Inertial Head Tracker Sensor Fusion by a Complementary Separate-bias Kalman Filter," Proceedings of the IEEE 1996 Virtual Reality Annual International Symposium, pp. 185-194, 267 (Mar./Apr. 3, 1996).

Foxlin, "Generalized architecture for simultaneous localization, auto-calibration, and map-building," IEEE/RSJ Conf. on Intelligent Robots and Systems (IROS 2002), Oct. 2-4, 2002, Lausanne, Switzerland (Oct. 2002).

Foxlin, "Motion Tracking Requirements and Technologies," Chapter 8, from Handbook of Virtual Environment Technology, Kay Stanney, Ed., Lawrence Erlbaum Associates (Jan. 2002) (extended draft version available for download at http://www.intersense.com/pages/44/119/).

Foxlin, "Pedestrian Tracking with Shoe-Mounted Inertial Sensors," IEEE Computer Graphics and Applications, vol. 25, No. 6, pp. 38-46, (Nov./Dec. 2005).

Foxlin, et al., "An Inertial Head-Orientation Tracker with Automatic Drift Compensation for Use with HMD's," Proceedings of the 1994 Virtual Reality Software and Technology Conference, Aug. 23-26, 1994, Singapore, pp. 159-173 (1994).

Foxlin, et al., "Constellation™: A Wide-Range Wireless Motion-Tracking System for Augmented Reality and Virtual Set Applications," ACM SIGGRAPH 98, Orlando, Florida, Jul. 19-24, 1998 (1998).

Foxlin, et al., "Miniature 6-DOF Inertial System for Tracking HMDs," SPIE vol. 3362, Helmet and Head-Mounted Displays III, AeroSense 98, Orlando, FL, Apr. 13-14, 1998 (1998).

Foxlin, et al., "WearTrack: A Self-Referenced Head and Hand Tracker for Wearable Computers and Portable VR," Proceedings of International Symposium on Wearable Computers (ISWC 2000), Oct. 16-18, 2000, Atlanta, GA (2000).

Foxlin, et al., "FlightTracker: A Novel Optical/Inertial Tracker for Cockpit Enhanced Vision, Symposium on Mixed and Augmented Reality," Proceedings of the 3rd IEEE/ACM International Symposium on Mixed and Augmented Reality (ISMAR 2004), Nov. 2-5, 2004, Washington, D.C. (2004).

Foxlin, et al., "Miniaturization, Calibration & Accuracy Evaluation of a Hybrid Self-Tracker," IEEE/ACM International Symposium on Mixed and Augmented Reality (ISMAR 2003), Oct. 7-10, 2003, Tokyo, Japan (2003).

Foxlin, et al., "VIS-Tracker: A Wearable Vision-Inertial Self-Tracker," IEEE VR2003, Mar. 22-26, 2003, Los Angeles, CA (2003).

Frankle, "E3 2002: Roll O Rama," Roll-o-Rama GameCube Preview at IGN, May 23, 2002 (accessed at http://cube.ign.com/articles/360/360662p1.html on Sep. 7, 2011).

Friedmann, et al., "Device Synchronization Using an Optimal Linear Filter," S13D'92: Proceedings of the 1992 symposium on Interactive 3D graphics, pp. 57-62 (Mar./Apr. 1992).

Friedmann, et al., "Synchronization in virtual realities," M.I.T. Media Lab Vision and Modeling Group Technical Report No. 157, Jan. 1991 to appear in Presence, vol. 1, No. 1, MIT Press, Cambridge, MA (1991).

FrontSide Field Test, "Get This!" Golf Magazine, Jun. 2005, p. 36.

Fuchs, Eric, "Inertial Head-Tracking," MS Thesis, Massachusetts Institute of Technology, Dept. of Electrical Engineering and Computer Science (Sep. 1993).

Furniss, Maureen, "Motion Capture," posted at http://web.mit.edu/m-i-t/articles/index_furniss.html on Dec. 19, 1999; paper presented at the Media in Transition Conference at MIT on Oct. 8, 1999 (accessed on Sep. 8, 2011).

gamecubicle.com News Article, Nintendo WaveBird Controller, http://www.gamecubicle.com/news-Nintendo_gamecube_wavebird_controller.htm, May 14, 2002 (accessed on Aug. 5, 2011).

Geen, et al., "New MEMS® Angular-Rate-Sensing Gyroscope," Analog Dialogue 37-03, pp. 1-3 (2003).

Gelmis, J., "Ready to Play, The Future Way," Buffalo News, Jul. 23, 1996 (accessed from LexisNexis research database on Sep. 6, 2011).

Grimm, et al., "Real-Time Hybrid Pose Estimation from Vision and Inertial Data," Proceedings of the First Canadian Conference on Computer and Robot Vision (CRV'04), IEEE Computer Society (Apr. 2004).

Gyration Ultra Cordless Optical Mouse, Setting Up Ultra Mouse, Gyration Quick Start Card part No. DL-00071-0001 Rev. A. Gyration, Inc., Jun. 2003.

Gyration Ultra Cordless Optical Mouse, User Manual, Gyration, Inc., Saratoga, CA (2003).

Gyration, "Gyration MicroGyro 100 Developer Kit Data Sheet," http://web.archive.org/web/19980708122611/www.gyration.com/html/devkit.html (Jul. 1998).

Gyration, Inc., GyroRemote GP240-01 Professional Series (Sep. 2003).

Harada, et al., "Portable Absolute Orientation Estimation Device with Wireless Network Under Accelerated Situation" Proceedings of the 2004 IEEE International Conference on Robotics & Automation, New Orleans, LA, Apr. 2004, pp. 1412-1417(Apr. 2004).

Harada, et al., "Portable orientation estimation device based on accelerometers, magnetometers and gyroscope sensors for sensor network," Proceedings of IEEE International Conference on Multisensor Fusion and Integration for Intelligent Systems (MFI 2003), pp. 191-196, (Aug. 2003).

Haykin, et al., "Adaptive Tracking of Linear Time-Variant Systems by Extended RLS Algorithms, IEEE Transactions on Signal Processing," vol. 45, No. 5, pp. 1118-1128 (May 1997).

Heath, "Virtual Reality Resource Guide Al Expert," v9 n5 p32(14) (May 1994) (accessed at http://ftp.hitl.washington.edu/scivw-ftp/commercial/VR-Resource-Guide.txt on Jun. 17, 2010).

HiBall-3100—"Wide-Area, High-Precision Tracker and 3D Digitizer," www.3rdtech.com/HiBall.htm (accessed on Jul. 29, 2011).

Hinckley, "Synchronous Gestures for Multiple Persons and Computers," Paper presented at ACM UIST 2003 Symposium on User Interface Software & Technology in Vancouver, BC, Canada (Nov. 2003).

Hinckley, et al., "A Survey of Design Issues in Spatial Input," Paper presented at 7th Annual ACM Symposium on User Interface Software and Technology (Nov. 1994).

Hinckley, et al., "Sensing Techniques for Mobile Interaction," Proceedings of the 13th Annual ACM Symposium on User Interface Software and Technology (ACM UIST), San Diego, CA, (Nov. 2000).

Hinckley, et al., "The VideoMouse: A Camera-Based Multi-Degree-of-Freedom Input Device" ACM UIST'99 Symposium on User Interface Software & Technology, CHI Letters vol. 1 No. 1, pp. 103-112 (Sep. 1999).

Hinckley, Ken, "Haptic Issues for Virtual Manipulation," Ph.D. Dissertation University of Virginia, Dept. of Computer Science (Jan. 1997).

Hind, Nicholas, "Cosmos: A composition for Live Electronic Instruments Controlled by the Radio Baton and Computer Keyboard (Radio Baton and Magic Glove)," A Final Project Submitted to the Department of Music of Stanford University in Partial Fulfillment of the Requirements for the Degree of Doctor Musical Arts/UMI Microform 9837187, Jan. 1998.

Hoffman, Hunter G., "Physically Touching Virtual Objects Using Tactile Augmentation Enhances the Realism of Virtual Environments," IEEE Virtual Reality Annual International Symposium '98, Atlanta, Georgia, Mar. 14-18, 1998, 5 pages (Mar. 1998).

(56) References Cited

OTHER PUBLICATIONS

Hogue, Andrew, "MARVIN: A Mobile Automatic Realtime visual and Inertial tracking system," Master's Thesis, York University (May 2003), available at http://www.cse.yorku.ca/~hogue/marvin.pdf.

Holden, Maureen K. et al., "Use of Virtual Environments in Motor Learning and Rehabilitation," Department of Brain and Cognitive Sciences, Handbook of Virtual Environments: Design, Implementation, and Applications, Chap. 49, pp. 999-1026, Stanney (ed), Lawrence Erlbaum Associates (Jan. 2002).

Holloway, Richard Lee, "Registration Errors in Augmented Reality Systems," Ph.D. Dissertation, University of North Carolina at Chapel Hill, Dept. of Computer Science (1995).

Immersion CyberGlove product, Immersion Corporation, http://www.cyberglovesystems.com (Jul. 2001).

Immersion, "Immersion Ships New Wireless CyberGlove(R) II Hand Motion-Capture Glove; Animators, Designers, and Researchers Gain Enhanced Efficiency and Realism for Animation, Digital Prototyping and Virtual Reality Projects," Business Wire, Dec. 7, 2005 (available at http://ir.immersion.com/releasedetail.cfm?releaseid=181278).

Interfax Press Release, "Tsinghua Tongfang Releases Unique Peripheral Hardware for 3D Gaming," Apr. 2002, 1 page. (Apr. 2002).

Intersense, "InterSense InertiaCube2 Devices," (Specification) (image) (2001).

Intersense, "InterSense InertiaCube2 Manual for Serial Port Model" (2001).

Intersense, "IS-900 Product Technology Brief," http://www.intersense.com/uploadedFiles/Products/White.sub.--Papers/IS900-.sub.--Tech.sub.--Overview.sub.--Enhanced.pdf (1999).

Intersense, "InterSense Inc., The New Standard in Motion Tracking," Mar. 27, 2004, http://web.archive.org!web12004040500550Z/http://intersense.com (accessed on May 19, 2009).

Intersense, "InterSense Mobile Mixed Reality Demonstration," YouTube Video dated Oct. 2006 on opening screen; uploaded by InterSenseInc. on Mar. 14, 2008 (accessed at http://www.youtube.com/watch?v=daVdzGKOnUE&feature=channel_page on Sep. 8, 2011; digital video available upon request).

Intersense, "IS-900 Precision Motion Trackers," Jun. 14, 2002, http://web.archive.org/web/20020614110352/http://www.isense.com/products/prec/is900/ (accessed on Sep. 8, 2011).

Intersense, Inc., "Comparison of Intersense IS-900 System and Optical Systems," Whitepaper, Jul. 12, 2004., available at http://www.jazdtech.com/techdirect/research/InterSense-Inc.htm?contentSetId=60032939&supplierId=60018705.

Jacob, "Human-Computer Interaction—Input Devices," ACM Computing Surveys, vol. 28, No. 1, pp. 177-179 (Mar. 1996); link to text of article provided at http://www.cs.tufts.edu/~jacob/papers/.

Jakubowski, et al., "Increasing Effectiveness of Human Hand Tremor Separation Process by Using Higher-Order Statistics," Measurement Science Review, vol. 1, No. 1 (2001).

Ji, H. "Study on the Infrared Remote-Control Lamp-Gesture Device," Yingyong Jiguang/Applied Laser Technology, v. 17, n. 5, p. 225-227, Language: Chinese—Abstract only, Oct. 1997.

Jiang, "Capacitive position-sensing interface for micromachined inertial sensors," Dissertation at Univ. of Cal. Berkeley, 2003.

Ju, et al., "The Challenges of Designing a User Interface for Consumer Interactive Television Consumer Electronics Digest of Technical Papers.," IEEE 1994 International Conference on Volume, Issue , Jun. 21-23, 1994 pp. 114-115 (Jun. 1994) (downloaded from IEEE Xplore on Jul. 13, 2010).

Keir, et al., "Gesture-recognition with Nonreferenced Tracking," IEEE Symposium on 3D User Interfaces, pp. 151-158, Mar. 25-26, 2006.

Kennedy, P.J. "Hand-held Data Input Device," IBM Technical Disclosure Bulletin, vol. 26, No. 11, pp. 5826-5827, Apr. 1984.

Kessler, et al., "The Simple Virtual Environment Library: an Extensible Framework for Building VE Applications," Presence, MIT Press vol. 9, No. 2. pp. 187-208 (Apr. 2000).

Kindratenko, "A Comparison of the Accuracy of an Electromagnetic and a Hybrid Ultrasound-Inertia Position Tracking System," MIT Presence, vol. 10, No. 6, pp. 657-663, Dec. 2001.

Klein et al., "Tightly Integrated Sensor Fusion for Robust Visual Tracking," British Machine Vision Computing, vol. 22, No. 10, pp. 769-776, Feb. 2004.

Kohlhase, "NASA Report, The Voyager Neptune travel guide," Jet Propulsion Laboratory Publication 89-24, (Jun. 1989).

Kormos, D.W., et al., "Intraoperative, Real-Time 3-D Digitizer for Neurosurgical Treatment and Planning," IEEE (Feb. 1993) (Abstract only).

Kosak, Dave, "Mind-Numbing New Interface Technologies," Gamespy.com, Feb. 1, 2005 (accessed at http://www.gamespy.com/articles/584/584744p1.html on Aug. 31, 2011).

Krumm et al., "How a Smart Environment can Use Perception," Paper presented at UBICOMP 2001 Workshop on Perception for Ubiquitous Computing (2001).

Kuipers, Jack B., "SPASYN—An Electromagnetic Relative Position and Orientation Tracking System," IEEE Transactions on Instrumentation and Measurement, vol. 29, No. 4, pp. 462-466 (Dec. 1980).

Kunz, Andreas M. et al., "Design and Construction of a New Haptic Interface," Proceedings of DETC '00, ASME 2000 Design Engineering Technical Conferences and Computers and Information in Engineering Conference, Baltimore, Maryland, Sep. 10-13, 2000.

La Scala, et al., "Design of an Extended Kalman Filter Frequency Tracker," IEEE Transactions on Signal Processing, vol. 44, No. 3 (Mar. 1996).

Larimer et al., "VEWL: A Framework for building a Windowing Interface in a Virtual Environment," in Proc. of IFIP TC13 Int. Conf. on Human-Computer Interaction.Interact'2003 (Zürich, http://people.os.vtedu/~bowman/papers/VEWL_final.pdf, 2003.

Laughlin, et al., "Inertial Angular Rate Sensors: Theory and Applications," SENSORS Magazine Oct. 1992.

Lee, et al., "Innovative Estimation Method with Measurement Likelihood for all-Accelerometer Type Inertial Navigation System," IEEE Transactions on Aerospace and Electronic Systems, vol. 38, No. 1, Jan. 2002.

Lee, et al., "Tilta-Pointer: the Free-Space Pointing Device," Princeton COS 436 Project (Fall 2004); retrieved from Google's cache of http://www.milyehuang.com/cos436/project/specs.html on May 27, 2011.

Lee, et al., "Two-Dimensional Position Detection System with MEMS Accelerometer for Mouse Applications," Design Automation Conference, 2001, Proceedings, 2001 pp. 852-857, Jun. 2001.

Leganchuk, et al., "Manual and Cognitive Benefits of Two-Handed Input: An Experimental Study," ACM Transactions on Computer-Human Interaction, vol. 5, No. 4, pp. 326-259, Dec. 1998.

Leonard, "Computer Pointer Controls 3D Images in Free Space," Electronic Design, pp. 160, 162, 165, Nov. 1991.

Liang, et al., "On Temporal-Spatial Realism in the Virtual Reality Environment," ACM 1991 Symposium on User Interface Software and Technology (Nov. 1991).

Link, "Field-Qualified Silicon Accelerometers from 1 Milli g to 200,000 g," Sensors, Mar. 1993.

Liu, et al., "Enhanced Fisher Linear Discriminant Models for Face Recognition," Paper presented at 14th International Conference on Pattern Recognition (ICPR'98), Queensland, Australia (Aug. 1998).

Lobo, et al., "Vision and Inertial Sensor Cooperation Using Gravity as a Vertical Reference," IEEE Trans. on Pattern Analysis and Machine Intelligence, vol. 25, No. 12, pp. 1597-1608, Dec. 2003.

Logitech, "Logitech Tracker—Virtual Reality Motion Tracker," downloaded from http://www.vrealities.com/logitech.html on Jun. 18, 2010.

Logitech, Inc. "3D Mouse & Head Tracker Technical Reference Manual," Nov. 1992.

Logitech's WingMan Cordless RumblePad Sets PC Gamers Free, Press Release, Sep. 2, 2001 (accessed at http://www.logitech.com/en-us/172/1373 on Aug. 5, 2011).

Louderback, J. "Nintendo Wii", Reviews by PC Magazine, Nov. 13, 2006 (accessed at http://www.pcmag.com/article/print/193909 on Sep. 8, 2011).

(56) References Cited

OTHER PUBLICATIONS

Luethi, P. et al., "Low Cost Inertial Navigation System" (2000); downloaded from http://www.electronic-engineering.ch/study/ins/ins.html on Jun. 18, 2010.

Luinge, "Inertial sensing of human movement," Thesis, University of Twente, Twente University Press, (Oct. 2002).

Luinge, et al., "Estimation of orientation with gyroscopes and accelerometers," Proceedings of the First Joint BMES/EMBS Conference, 1999, vol. 2, p. 844 (Oct. 1999).

MacKenzie, et al., "A two-ball mouse affords three degrees of freedom," Extended Abstracts of the CHI '97 Conference on Human Factors in Computing Systems, pp. 303-304. New York: ACM (Oct. 1997).

MacKinlay, "Rapid Controlled Movement Through a Virtual 3D Workspace," ACM SIGGRAPH Computer Graphics archive, vol. 24, No. 4, pp. 171-176 (Aug. 1990).

MacLean, "Designing with Haptic Feedback", Paper presented at IEEE Robotics and Automation (ICRA '2000) Conference in San Francisco, CA, Apr. 22-28, 2000.

Maggioni, C., "A novel gestural input device for virtual reality," IEEE Virtual Reality Annual International Symposium (Cat. No. 93CH3336-5), 118-24, Jan. 1993.

Marks, Richard (Jan. 21, 2004) (Windows Media v7). EyeToy: A New Interface for Interactive Entertainment, Stanford University (accessed at http://lang.stanford.edu/courses/ee380/2003-2004/040121-ee380-100.wmv on Sep. 7, 2011; digital video available upon request).

Marrin, "Possibilities for the Digital Baton as a General Purpose Gestural Interface," Late-Breaking/Short Talks, Paper presented at CHI 97 Conference in Atlanta Georgia, Mar. 22-27, 1997 (accessed at http://www.sigchi.org/chi97/proceedings/short-talk/tm.htm on Aug. 5, 2011).

Marrin, Teresa et al., "The Digital Baton: A Versatile Performance Instrument," Paper presented at International Computer Music Conference, Thessaloniki, Greece (Sep. 1997) (text of paper available at http://quod.lib.umich.edu/cgi/p/pod/dod-idx?c=icmc;idno-bbp2372.1997.083).

Marti, et al., "Biopsy navigator: a smart haptic interface for interventional radiological gestures" Proceedings of the Computer Assisted Radiology and Surgery (CARS 2003) Conference, International Congress Series, vol. 1256, pp. 788-793 (Jun. 2003) (e-copy of text of paper available at http://infoscience.epfl.ch/record/29966/files/CARS03-GM.pdf).

Masliah, "Measuring the Allocation of Control in 6 Degree of Freedom Docking Experiment," Paper presented at SIGCHI Conference on Human Factors in Computing Systems, The Hague, Netherlands (Apr. 2000).

Maybeck, "Stochastic Models, Estimation and Control," vol. 1, Chapter 1, Introduction (1979).

Merians, et al., "Virtual Reality-Augmented Rehabilitation for Patients Following Stroke," Physical Therapy, vol. 82, No. 9, Sep. 2002.

Merrill, "FlexiGesture: A sensor-rich real-time adaptive gesture and affordance learning platform for electronic music control," Thesis, Massachusetts Institute of Technology, Jun. 2004.

Meyer, et al., "A Survey of Position Tracker," MIT Presence, vol. 1, No. 2, pp. 173-200, (Nov. 1992).

Miller, Paul, "Exclusive shots of Goschy's prototype 'Wiimote' controllers," Engadget, Jan. 15, 2008 (accessed at http://www.engadget.com/2008/01/15/exclusive-shots-of-goschys-prototype-wiimote-controllers/ on Aug. 31, 2011).

Miller, Ross, "Joystiq interview: Patrick Goschy talks about Midway, tells us he 'made the Wii'," Joystiq.com, Jan. 16, 2008 (accessed at http://www.joystiq.com/2008/01/16/joystiq-interview-patrick-goschy-talks-about-midway-tells-us-h/ on Aug. 31, 2011).

Mizell, "Using Gravity to Estimate Accelerometer Orientation," Proceedings of the Seventh IEEE International Symposium on Wearable Computers (ISWC '03), IEEE Computer Society (Oct. 2003).

Morgan, C., "Still chained to the overhead projector instead of the podium," (TV Interactive Corp's LaserMouse Remote Pro infrared mouse) (clipboard) (brief article) (product announcement) Government Computer News, Jun. 13, 1994.

Morris, "Accelerometry—a technique for the measurement of human body movements," J Biomechanics vol. 6, pp. 729-736 (Nov. 1973).

Moser, "Low Budget Inertial Navigation Platform (2000)," www.tmoser.ch/typo3/11.0.html (accessed on Jul. 29, 2011).

Mulder, "Human movement tracking technology," Technical Report, NSERC Hand Centered Studies of Human Movement project, available through anonymous ftp in fas.sfu.ca:/pub/cs/graphics/vmi/HMTT.pub.ps.Z., Burnaby, B.C, Canada: Simon Fraser University (Jul. 1994).

Myers, et al., "Interacting at a Distance: Measuring the Performance of Laser Pointers and Other Devices," CHI 2002, Apr. 2002.

Naimark, et al., "Encoded LED System for Optical Trackers," Paper presented at Fourth IEEE and ACM International Symposium on Mixed and Augmented Reality (ISMAR 2005), Oct. 5-8, 2005, Vienna Austria (2005) (electronic version of text of paper available for download at http://www.intersense.com/pp./44/129/).

Naimark, et al., "Circular Data Matrix Fiducial System and Robust Image Processing for a Wearable Vision-Inertial Self-Tracker," IEEE International Symposium on Mixed and Augmented Reality (ISMAR 2002), Darmstadt, Germany (Sep./Oct. 2002).

Navarrette, et al., "Eigenspace-based Recognition of Faces: Comparisons and a new Approach," Paper Presented at 11th International Conference on Image Analysis and Processing (Sep. 2001).

New Strait Times Press Release, "Microsoft's New Titles," Mar. 1998, 1 page.

News Article, "New Game Controllers Using Analog Devices' G-Force Tilt to be Featured at E3", Norwood, MA (May 10, 1999) (accessed at http://www.thefreelibrary.com/_/print/PrintArticle.aspx?id=54592268 on Jun. 17, 2010).

Nintendo Tilt Controller Ad, Electronic Gaming Monthly, 1994, 1 page.

Nintendo, Game Boy Advance SP System Instruction Booklet (2003).

Nintendo, Nintendo Game Boy Advance System Instruction Booklet (2001-2003).

Nintendo, Nintendo Game Boy Advance Wireless Adapter, Sep. 26, 2003.

Nintendo Feature: History of Pokémon Part 2 1998-1999; Crossing the Pacific, Pokemon style, Posted by Tom East—Official Nintendo Magazine, May 17, 2009.

Nishiyama, "A Nonlinear Filter for Estimating a Sinusoidal Signal and its Parameters in White Noise: On the Case of a Single Sinusoid," IEEE Transactions on Signal Processing, vol. 45, No, 4, pp. 970-981 (Apr. 1997).

Nishiyama, "Robust Estimation of a Single Complex Sinusoid in White Noise-H∞ Filtering Approach," IEEE Transactions on Signal Processing, vol. 47, No. 10, pp. 2853-2856 (Oct. 1999).

Odell, "An Optical Pointer for Infrared Remote Controllers," (1995) (downloaded from IEEE Xplore on Jul. 7, 2010).

Ojeda, et al., "No GPS? No Problem!" University of Michigan Develops Award-Winning Personal Dead-Reckoning (PDR) System for Walking Users, available at http://www.engin.umich.edu/research/mrl/urpr/In_Press/P135.pdf, (2004 or later).

Omelyan, "On the numerical integration of motion for rigid polyatomics: The modified quaternion approach" Computers in Physics, vol. 12 No. 1, pp. 97-103 (Jan./Feb. 1998).

Ovaska, "Angular Acceleration Measurement: A Review," Paper presented at IEEE Instrumentation and Measurement Technology Conference, St. Paul, MN, May 18-21, 1998 (1998).

Pai, et al., "The Tango: A Tangible Tangoreceptive Whole-Hand Interface," Paper presented at Joint Eurohaptics and IEEE Symposium on Haptic Interfaces for Virtual Environment and Teleoperator Systems, Pisa, Italy, Mar. 18-20, 2005 (2005).

Pajama Sam: No Need to Hide When It's Dark Outside Infogames, Sep. 6, 2002.

Paley, W. Bradford, "Interaction in 3D Graphics," SIGGRAPH Computer Graphics Newsletter, Col. 32, No. 4 (Nov. 1998) (accessed at http://www.siggraph.org/publications/newsletter/v32n4/contributions/paley.html on Aug. 2, 2011).

Paradiso, et al., "Interactive Therapy with Instrumented Footwear," CHI 2004, Apr. 24-29, 2004, Vienna, Austria.

(56) References Cited

OTHER PUBLICATIONS

Park, Adaptive control strategies for MEMS gyroscopes (Dissertation), Univ. Cal. Berkley (Dec. 2000).
PC World, "The 20 Most Innovative Products of the Year," Dec. 27, 2006 (accessed at http://www.pcworld.com/printable/article/id,128176/printable.html on Aug. 2, 2011).
PCTracker, Technical Overview, available at http://www.est-kl.com/fileadmin/media/pdf/InterSense/PCTracker_Tech_Overview.pdf (date unknown).
Perry, Simon, "Nintendo to Launch Wireless Game Boy Adaptor," Digital Lifestyles, http://digital-lifestyles.info/2003/09/26/Nintendo-to-launch-wireless-game-boy-adaptod, Sep. 26, 2003 (accessed on Jul. 29, 2011).
Phillips, "Forward/Up Directional Incompatibilities During Cursor Placement Within Graphical User Interfaces," Ergonomics, vol. 48, No. 6, May 15, 2005.
Phillips, "LPC2104/2105/2106, Single-chip 32-bit microcontrollers; 128 kB ISP/IAP Flash with 64 kB/32 kB/16 kB RAM," 32 pages, Dec. 22, 2004.
Phillips, "TECHWATCH: On the Right Track: A unique optical tracking system gives users greater freedom to explore virtual worlds," Computer Graphics World, vol. 23, Issue 4 (Apr. 2000).
Pierce, et al., "Image Plane Interaction Techniques in 3D Immersive Environments," Paper presented at 1997 symposium on Interactive 3D graphics, Providence, RI (Apr. 1997).
Pilcher, "AirMouse Remote Controls," IEEE Conference on Consumer Electronics (Jun. 1992).
Pique, "Semantics of Interactive Rotations," Interactive 3D Graphics, Proceedings of the 1986 workshop on Interactive 3D graphics, pp. 259-269 (Oct. 1986).
Piyabongkarn, "The Development of a MEMS Gyroscope for Absolute Angle Measurement," Dissertation, Univ. Minnesota, Nov. 2004 (Abstract only).
Polhemus, "Polhemus 3Space Fastrak devices" (image) (2001).
Polson Enterprises Research Services, http://www.virtualpet.com/vp/media/fishing/fishing.htm, "Fishing Games: The Evolution of Virtual Fishing Games and related Video Games/Computer Games," 15 pages, 2003.
PowerGlove product Program Guide, Mattel, 1989 (Text of Program Guide provided from http://hiwaay.nethlkseitz/cvtg/power_glove.shtml; the text was typed in by Lee K. Sietz; document created Aug. 25, 1988; accessed on Aug. 2, 2011).
PR Newswire, "Five New Retailers to Carry Gyration's Gyropoint Point and Gyropoint Pro," Jul. 8, 1996 (accessed at http://www.thefreelibrary.com/_/print/PrintArticle.aspx?id=54592268 on Jun. 18, 2010).
PR Newswire, "Three-Axis MEMS-based Accelerometer From STMicroelectronics Targets Handheld Terminals," Feb. 18, 2003 (accessed at http://www.thefreelibrary.com/_/print/PrintArticle.aspx?id=54592268 on Aug. 3, 2011).
Pryor, et al., "A Reusable Software Architecture for Manual Controller Integration," IEEE Conf. on Robotics and Automation, Univ of Texas, pp. 3583-3588 (Apr. 1997).
Raab, et al., "Magnetic Position and Orientation Tracking System," IEEE Transactions on Aerospace and Electronic Systems, vol. AES-15, No. 5, pp. 709-718 (Sep. 1979).
Radica Legends of the Lake™ Instruction Manual (2003).
Rebo, et al., "Helmet-Mounted Virtual Environment Display System," Proc. SPIE vol. 1116, pp. 80-84, Sep. 1989.
Regan, "Smart Golf Clubs," baltimoresun.com, Jun. 17, 2005.
Rekimoto, "Tilting Operations for Small Screen Interfaces," Tech Note presented at 9th Annual ACM Symposium on User Interface Software and Technology (UIST'96) (Nov. 1996) (electronic copy available for download at http://www.sonycsl.co.jp/person/rekimoto/papers/uist96.pdf.
Resnick, et al., "Digital Manipulatives: New Toys to Think With," Chi 98; Apr. 1998; pp. 281-287.
Response filed May 3, 2010 to Office Action dated Feb. 5, 2010 for U.S. Appl. No. 12/222,787, filed Aug. 15, 2008, now U.S. Pat. No. 7,774,155 (including Rule 1.132 Declaration by Steve Mayer).

Reunert, "Fiber-Optic Gyroscopes: Principles and Applications," SENSORS, Aug. 1993, pp. 37-38.
Ribo, et al., "Hybrid Tracking for Outdoor Augmented Reality Applications," IEEE Computer Graphics and Applications, vol. 22, No. 6, pp. 54-63, Nov./Dec. 2002.
Riviere, et al., "Adaptive Canceling of Physiological Tremor for Improved Precision in Microsurgery," IEEE Transactions on Biomedical Engineering, vol. 45, No. 7, pp. 839-846 (Jul. 1998).
Roberts, "The Lincoln Wand," 1966 Proceedings of the Fall Joint Computer Conference (1966), available for electronic download at http://www.computer.org/portal/web/csdl/doi/10.1109/AFIPS, Apr. 1966,105.
Robinette, et al., "Implementation of Flying, Scaling, and Grabbing in Virtual Worlds," ACM Symposium (Jun. 1992).
Robinette, et al., "The Visual Display Transformation for Virtual Reality," University of North Carolina at Chapel Hill (Sep. 1994).
Roetenberg, "Inertial and magnetic sensing of human motion," Thesis, University of Twente (May 2006).
Roetenberg, et al., "Inertial and Magnetic Sensing of Human Movement Near Ferromagnetic Materials," Paper presented at Second IEEE and ACM International Symposium on Mixed and Augmented Reality, Mar. 2003 (electronic copy available at http://www.xsens.com/images/stories/PDF/Inertial%20and%20magnetic%20sensing%20of%20human%20movement%20near%20ferromagnetic%20materials.pdf.
Rolland, et al., "A Survey of Tracking Technology for Virtual Environments," University of Central Florida, Center for Research and Education in Optics Lasers (CREOL) (Jan. 2001).
Romer, Kay et al., Smart Playing Cards: A Ubiquitous Computing Game, Personal and Ubiquitous Computing, Dec. 2002, vol. 6, Issue 5-6, pp. 371-377, London, England.
Rothman, Wilson, "Unearthed: Nintendo's Pre-Wiimote Prototype," gizmodo.com, Aug. 29, 2007 (accessed at http://gizmodo.com/gadgets/exclusive/unearthed-nintendo-2001-prototype-motion+sensing-one+handed-controller-by-gyration-294642.php on Aug. 31, 2011).
Rothman, Wilson, "Wii-mote Prototype Designer Speaks Out, Shares Sketchbook," Gizmodo.com, Aug. 30, 2007 (accessed at http://gizmodo.com/gadgets/exclusive/wii+mote-prototype-designer-speaks-out-shares-sketchbook-295276.php on Aug. 31, 2011).
RPI Entertainment Pods Improve Virtual Experience, Computer Business Review, Jan. 17, 1995.
Sakai, et al., "Optical Spatial Filter Sensor for Ground Speed," Optical Review, vol. 2, No. 1, pp. 65-67 (Jan. 1995).
Santiago, Alves, "Extended Kalman filtering applied to a full accelerometer strapdown inertial measurement unit," M.S. Thesis, Massachusetts Institute of Technology, Dept. of Aeronautics and Astronautics, Santiago (Sep. 1992).
Satterfield, Shane, "E3 2002: Nintendo announces new GameCube games," GameSpot, http://www.gamespot.com/gamecube/action/rollorama/news/2866974/e3-2002-nintendo-announces-new-gamecube-games, May 21, 2002 (accessed on Aug. 11, 2011).
Sawada, et al., "A Wearable Attitude-Measurement System Using a Fiberoptic Gyroscope," MIT Presence, vol. 11, No. 2, pp. 109-118, Apr. 2002.
Saxena, et al., "In Use Parameter Estimation of Inertial Sensors by Detecting Multilevel Quasi-Static States," Berlin: Springer-Verlag, pp. 595-601 (2005).
Sayed, "A Framework for State-Space Estimation with Uncertain Models," IEEE Transactions on Automatic Control, vol. 46, No. 7, Jul. 2001.
Schofield, Jack, et al., Games reviews, "Coming up for airpad," The Guardian (Feb. 3, 2000) (accessed at http://www.guardian.co.uk/technology/2000/feb/03/online supplement5/print on Jun. 18, 2010).
Sega/Sports Sciences, Inc., "Batter Up, It's a Hit," Instruction Manual, Optional Equipment Manual (1994).
Sega/Sports Sciences, Inc., "Batter Up, It's a Hit," Photos of baseball bat (1994).
Selecttech Airmouse, "Mighty Mouse", Electronics Today International, p. 11 (Sep. 1990).
Shoemake, Ken, "Quaternions," available online at http://campar.in.turn.de/twiki/pub/Chair/DwarfTutorial/quatut.pdf (date unknown).

(56) References Cited

OTHER PUBLICATIONS

Skiens, Mike, "Nintendo Announces Wireless GBA Link", Bloomberg, Sep. 25, 2003 (accessed at http://www.nintendoworldreport.com/news/9011).
Smartswing, "SmartSwing: Intelligent Golf Clubs that Build a Better Swing," http://web.archive.org/web/20040728221951/http://www.smartswinggolf.com/ (accessed on Sep. 8, 2011).
Smartswing, "The SmartSwing Learning System Overview," Apr. 26, 2004, http://web.archive.org/web/2004426215355/http://www.smartswinggolf.com/tls/index.html (accessed on Jul. 29, 2011).
Smartswing, "The SmartSwing Learning System: How it Works," 3 pages, Apr. 26, 2004, http://web.archive.org/web/20040426213631/http://www.smartswinggolf.com/tls/how_it_works.html (accessed on Jul. 29, 2011).
Smartswing, "The SmartSwing Product Technical Product: Technical Information," Apr. 26, 2004, http://web.archive.org/web/20040426174854/http://www.smartswinggolf.com/products/technical_info.html (accessed on Jul. 29, 2011).
Smartswing, Training Aid, Austin, Texas, Apr. 2005.
Sorenson, et al., "The Minnesota Scanner: A Prototype Sensor for Three-Dimensional Tracking of Moving Body Segments," IEEE Transactions on Robotics and Animation, vol. 5, No. 4 (Aug. 1989).
Star Wars Action Figure with CommTech Chip by Hasbro (1999).
Stars Wars Episode 1 CommTech Reader Instruction Manual (1998).
Stovall, "Basic Inertial Navigation," NAWCWPNS TM 8128, Navigation and Data Link Section, Systems Integration Branch (Sep. 1997).
Sulic, "Logitech Wingman Cordless Rumblepad Review," Gear Review at IGN, Jan. 14, 2002 (accessed at http://gear.ign.com/articles/317/317472p1.html on Aug. 1, 2011).
Sutherland, "A Head-Mounted Three Dimensional Display," Paper presented at AFIPS '68 Fall Joint Computer Conference, Dec. 9-11, 1968, (1968); electronic paper available at www.cise.ufl.edu/~lok/teaching/dcvef05/papers/sutherland-headmount.pdf.
Sutherland, Ivan E., "Sketchpad: A Man-Machine Graphical Communication System," Proceedings of the AFIPS Spring Joint Computer Conference, Detroit, Michigan, May 21-23, 1963, pp. 329-346 (source provided is reprinting of text accessed at http://www.guidebookgallery.org/articles/sketchpadamanmachinegraphicalcommunicationsystem on Sep. 8, 2011).
Tech Designers Rethink Toys: Make Them Fun Wall Street Journal, Dec. 17, 2001.
Templeman, James N., "Virtual Locomotion: Walking in Place through Virtual Environments," Presence, vol. 8, No. 6, pp. 598-617, Dec. 1999.
Timmer, "Modeling Noisy Time Series: Physiological Tremor," International Journal of Bifurcation and Chaos, vol. 8, No. 7 (1998).
Timmer, et al., "Characteristics of Hand Tremor Time Series," Biological Cybernetics, vol. 70, No. 1, pp. 75-80 (May 1993).
Timmer, et al., "Cross-Spectral Analysis of Tremor Time Series," International Journal of Bifurcation and Chaos, vol. 10, No. 11 pp. 2595-2610 (Nov. 2000); electronic text available at http://www.fdmold.uni-freiburg.de/groups/timeseries/tremodpubs/cs_review.pdf.
Timmer, et al., "Pathological Tremors: Deterministic Chaos or Nonlinear Stochastic Oscillators?" Chaos, vol. 10, No. 1 pp. 278-288 (Mar. 2000).
Timmer, et al., Cross-Spectral Analysis of Physiological Tremor and Muscle Activity: II Application to Synchronized Electromyogram, Biological Cybernetics, vol. 78 (Jun. 1998) (copy provided obtained from http://arxiv.org/abs/chao-dyn/9805012).
Titterton, et al., "Strapdown Inertial Navigation Technology," Peter Peregrinus Ltd., pp. 1-56 and pp. 292-321 (May 1997).
Toy Designers Use Technology in New Ways as Sector Matures, WSJ.com, Dec. 17, 2001.
Traq 3D, "Healthcare," http://www.traq3d.com/Healthcare/Healthcare.aspx (accessed on Jan. 21, 2010).
Ulanoff, Lance, "Nintendo's Wii is the Best Product Ever," PC Magazine, Jun. 21, 2007 (accessed at http://www.pcmag.com/print_article2/0,1217,a=210070,00.asp?hidPrint-true on Aug. 1, 2011).

UNC Computer Science Department, "News & Notes from Sitterson Hall," UNC Computer Science, Department Newsletter, Issue 24, Spring 1999 (Apr. 1999) (accessed at http://www.cs.unc.edu/NewsAndNotes/Issue24/ on Jun. 18, 2010).
Urban, "BAA 96-37 Proposer Information," DARPA/ETO (1996) (accessed at http://www.fbodaily.com/cbd/archive/1996/08(August)/19-Aug-1996/Aso1001.htm on Jul. 27, 2010).
US Dynamics Corp, "Spinning Mass Mechanical Gyroscopes," Aug. 2006.
US Dynamics Corp, "The Concept of 'Rate', (more particularly, angular rate pertaining to rate gyroscopes) (rate gyro explanation)," Aug. 2006.
US Dynamics Corp, "US Dynamics Model 475 Series Rate Gyroscope Technical Brief," Dec. 2005.
US Dynamics Corp, "US Dynamics Rate Gyroscope Interface Brief (rate gyro IO)" Aug. 2006.
Van Den Bogaard, Thesis, "Using linear filters for real-time smoothing of rotational data in virtual reality application," dated Aug. 2, 2004, available at http://www.science.uva.nl/research/ias/alumni/m.sc.theses/theses/RobvandenBogaard.pdf.
Van Laerhoven et al., "Using an Autonomous Cube for Basic Navigation and Input," Proceedings of the 5th International Conference on Multimodal interfaces, Vancouver, British Columbia, Canada, pp. 203-210, Nov. 5-7, 2003.
Van Rheeden, et al., "Noise Effects on Centroid Tracker Aim Point Estimation," IEEE Trans. on Aerospace and Electronic Systems, vol. 24, No. 2, pp. 177-185 (Mar. 1988).
Vaz, et al., "An Adaptive Estimation of Periodic Signals Using a Fourier Linear Combiner," IEEE Transactions on Signal Processing, vol. 42, No. 1, pp. 1-10 (Jan. 1994).
Verplaetse, "Inertial-Optical Motion-Estimating Camera for Electronic Cinematography," Master's Thesis, MIT, Media Arts and Sciences (Jun. 1997).
Villoria, Gerald, "Hands on Roll-O-Rama Game Cube," Game Spot, http://www.gamespot.com/gamecube/action/rollorama/news.html?sid=2868421&com_act=convert&om_clk=newsfeatures&tag=newsfeatures;title;1&m, May 29, 2002 (accessed on Jul. 29, 2011).
Virtual Fishing, Operational Manual, 2 pages, Tiger Electronics, Inc. (1998).
Vorozcovs, et al., "The Hedgehog: A Novel Optical Tracking Method for Spatially Immersive Displays," MIT Presence, vol. 15, No. 1, pp. 108-121, Feb. 2006.
VTI, Mindflux-Vti CyberTouch, http://www.mindflux.com/au/products/vti/cybertouch.html (1996).
Wang, et al., "Tracking a Head-Mounted Display in a Room-Sized Environment with Head-Mounted Cameras," Paper presented at SPIE 1990 Technical Symposium on Optical Engineering and Photonics in Aerospace Sensing (Apr. 1990).
Ward, et al., "A Demonstrated Optical Tracker With Scalable Work Area for Head-Mounted Display Systems," Paper presented at 1992 Symposium on Interactive 3D Graphics (Mar. 1992).
Watt, Alan, 3D Computer Graphics, Chapter 1: "Mathematical fundamentals of computer graphics," 3rd ed. Addison-Wesley, pp. 1-26 (Dec. 2000).
Welch, "Hawkeye Zooms in on Mac Screens with Wireless Infrared Penlight Pointer," MacWeek, May 3, 1993 (excerpt of article accessed at http://www.accessmylibrary.com/article/print/1G1-13785387 on Jun. 18, 2010).
Welch, et al., "High-Performance Wide-Area Optical Tracking: The HiBall Tracking System," MIT Presence: Teleoperators & Virtual Environments (Feb. 2001).
Welch, et al., "SCAAT: Incremental Tracking with Incomplete Information," Paper presented at SIGGRAPH 97 Conference on Computer Graphics and Interactive Techniques (Aug. 1997), available at http://www.cs.unc.edu/~welch/media/pdf/scaat.pdf.
Welch, et al., "The HiBall Tracker: High-Performance Wide-Area Tracking for Virtual and Augmented Environments," Paper presented at 1999 Symposium on Virtual Reality Software and Technology in London, Dec. 20-22, 1999, available at http://www.cs.unc.edu/~welch/media/pdf/VRST99_HiBall.pdf.
Welch, et al., "Complementary Tracking and Two-Handed Interaction for Remote 3D Medical Consultation with a PDA," Paper presented at Trends and Issues in Tracking for Virtual Environments

(56) References Cited

OTHER PUBLICATIONS

Workshop at IEEE Virtual Reality 2007 Conference (Mar. 2007), available at http://www.cs.unc.edu/~welch/media/pdf/Welch2007_TwoHanded.pdf.
Welch, et al., "Motion Tracking: No Silver Bullet, but a Respectable Arsenal," IEEE Computer Graphics and Applications, vol. 22, No. 6, pp. 24-38 (Nov./Dec. 2002), available at http://www.cs.unc.edu/~tracker/media/pdf/cga02_welch_tracking.pdf.
Welch, Hybrid Self-Tracker: An Inertial/Optical Hybrid Three-Dimensional Tracking System, University of North Carolina Chapel Hill Department of Computer Science, TR 95-048 (1995).
Widrow, et al., "Fundamental Relations Between the LMS Algorithm and the DFT," IEEE Transactions on Circuits and Systems, vol. CAS-34, No. 7 (Jul. 1987).
Wiley, M., "Nintendo Wavebird Review," Jun. 11, 2002, http://gear.ign.com/articles/361/361933p1.html (accessed on Aug. 1, 2011).
Williams, et al., "Physical Presence: Palettes in Virtual Spaces," Society of Photo-Optical Instrumentation Engineers (SPIE) Conference Series, vol. 3639, No. 374-384 (May 1999), available at http://www.fakespacelabs.com/papers/3639_46_LOCAL.pdf.
Williams, et al., "Implementation and Evaluation of a Haptic Playback System," vol. 3, No. 3, Haptics-e, May 2004.
Williams, et al., "The Virtual Haptic Back Project," presented at the IMAGE 2003 Conference, Scottsdale, Arizona, Jul. 14-18, 2003.
Wilson, "Wireless User Interface Devices for Connected Intelligent Environments," http://research.microsoft.com/en-us/um/people/awilson/publications/old/ubicomp%202003.pdf (Oct. 2003).
Wilson, "WorldCursor: Pointing in Intelligent Environments with the World Cursor," http://www.acm.org/uist/archive/adjunct/2003/pdf/demos/d4-wilson.pdf (2003).
Wilson, "XWand: UI for Intelligent Environments," http://research.microsoft.com/en-us/um/people/awilson/wand/default.htm, Apr. 2004.
Wilson, et al., "Demonstration of the Xwand Interface for Intelligent Spaces," UIST '02 Companion, pp. 37-38 (Oct. 2002).
Wilson, et al., "Gesture Recognition Using the Xwand," http://www.ri.cmu.edu/pub_files/pub4/wilson_daniel_h_2004_1/wilson_daniel_h_2004_1.pdf (Apr. 2004).
Wilson, et al., "Xwand: UI for Intelligent Spaces," Paper presented at CHI 2003 Conference, Ft. Lauderdale, FL, Apr. 5-10, 2003, available at http://research.microsoft.com/en-us/um/people/awilson/publications/WilsonCHI2003/CHI%202003%20XWand.pdf (2003).
Wired Glove, Wikipedia article, 4 pages, http://en.wikipedia.org/wiki/Wired_glove, Nov. 18, 2010.
Wormell, "Unified Camera, Content and Talent Tracking in Digital Television and Movie Production," Presented at NAB 2000, Las Vegas, NV, Apr. 8-13, 2000 (available for download at http://www.intersense.com/pages/44/116/) (2003).
Wormell, et al., "Advancements in 3D Interactive Devices for Virtual Environments," Presented at the Joint International Immersive Projection Technologies (IPT)/Eurographics Workshop on Virtual Environments (EGVE) 2003 Workshop, Zurich, Switzerland, May 22-23, 2003 (available for download at http://www.intersense.com/pages/44/123/) (2003).
Worringham, et al., "Directional Stimulus-Response Compatibility: A Test of Three Alternative Principles," Ergonomics, vol. 41, Issue 6, pp. 864-880 (Jun. 1998).
Yang, et al., "Implementation and Evaluation of 'Just Follow Me': An Immersive, VR-Based, Motion-Training System," MIT Presence: Teleoperators and Virtual Environments, vol. 11, No. 3, at 304-23 (MIT Press), Jun. 2002.
You et al., "Hybrid Inertial and Vision Tracking for Augmented Reality Registration,", http://graphics.usc.edu/cgit/pdf/papers/Vr1999.PDF (Mar. 1999).
You, et al., "Orientation Tracking for Outdoor Augmented Reality Registration," IEEE Computer Graphics and Applications, IEEE, vol. 19, No. 6, pp. 36-42 (Nov. 1999).
Youngblut, et al., "Review of Virtual Environment Interface Technology," Institute for Defense Analyses (Mar. 1996).
Yun, et al., "Recent Developments in Silicon Microaccelerometers," SENSORS, 9(10) University of California at Berkeley, Oct. 1992.
Zhai, "Human Performance in Six Degree of Freedom Input Control," Ph.D. Thesis, University of Toronto (1995).
Zhai, "User Performance in Relation to 3D Input Device Design," Computer Graphics 32(4), pp. 50-54, Nov. 1998; text downloaded from http://www.almaden.ibm.com/u/zhai/papers/siggraph/final.html on Aug. 1, 2011.
Zh°1-i' et al., "A survey—Human Movement Tracking and Stroke Rehabilitation," Technical Report: CSM-420, ISSN 1744-8050, Dept. of Computer Sciences, University of Essex, UK, Dec. 8, 2004.
Zhu et al., "A Real-Time Articulated Human Motion Tracking Using Tri-Axis Inertial/Magnetic Sensors Package," IEEE Transactions on Neural Systems and Rehabilitation Engineering, vol. 12, No. 2, Jun. 2004.
Zowie Playsets, http://www.piernot.com/proj/zowie/ (accessed on Jul. 29, 2011).

\* cited by examiner

MULTI-PLATFORM GAMING SYSTEMS AND METHODS

This application is a continuation of U.S. patent application Ser. No. 15/647,652, filed Jul. 12, 2017, now U.S. Pat. No. 9,861,887, which is a continuation of U.S. patent application Ser. No. 15/280,793, filed Sep. 29, 2016, now U.S. Pat. No. 9,731,194, which is a continuation of U.S. patent application Ser. No. 14/874,306, filed Oct. 2, 2015, now U.S. Pat. No. 9,468,854, which is a continuation of U.S. patent application Ser. No. 14/310,522, filed Jun. 20, 2014, now U.S. Pat. No. 9,186,585, which is a continuation of U.S. patent application Ser. No. 13/846,762, filed Mar. 18, 2013, now U.S. Pat. No. 8,758,136, which is a continuation of U.S. paent. application Ser. No. 13/723,717, filed Dec. 21, 2012, now U.S. Pat. No. 8,888,576, which is a continuation of U.S. patent application Ser. No. 12/829,905, filed Jul. 2, 2010, now U.S. Pat. No. 8,342,929, which is a continuation of U.S. patent application Ser. No. 09/545,658, filed Apr. 10, 2000, now U.S. Pat. No. 7,749,089, which claims priority benefit under 35 U.S.C. § 119(e) from U.S. Provisional Application No. 60/128,318, filed Apr. 8, 1999 and which is a continuation-in-part of U.S. patent application Ser. No. 09/514,480, filed Feb. 28, 2000, now U.S. Pat. No. 6,634,949, which claims priority benefit under 35 U.S.C. § 119(e) from U.S. Provisional Application No. 60/122,137, filed Feb. 26, 1999, the entire contents of each of which are hereby incorporated herein by reference.

BACKGROUND

Field of the Invention

The present invention relates to play systems, and specifically to a framework for interactive games involving a broad range of game activities and play media.

Description of the Related Art

Family entertainment centers, play structures and other similar facilities are well known for providing play and interaction among play participants playing in, or around the entertainment facilities and/or play structure. See, for example, U.S. Pat. No. 5,853,332 to Briggs, incorporated herein by reference. A wide variety of commercially available play toys and games are also known for providing valuable learning and entertainment opportunities for children, such as role playing, reading, memory stimulation, tactile coordination and the like.

However, there is always demand for more exciting and entertaining play structures and play toys that increase the learning and entertainment opportunities for children.

SUMMARY

In accordance with one preferred embodiment a multi-media interactive play system comprises a number of play elements such as a maze that the participant must navigate, a set of trivia questions that the participant must answer, or number of targets that the participant must shoot with a water blaster or laser gun. The play elements are situated in a variety of play environments, and a central scoring system interfaces with the play elements. The scoring system electronically exchanges data with the play elements. For example, the exchanged data may comprise a participant's identity, game progress and performance. The exchanged data may also comprise play element parameters that correspond to the participant's progress, performance, and ability level, and the set of play elements to which the participant may proceed. The play elements are interlinked by the electronic system to define a sequence or path network along which a participant proceeds in the course of completing the play elements or reaching a stated performance standard.

In accordance with another preferred embodiment a method of interactive play comprises the steps of providing a number of play elements situated in a variety of play environments, recording a participant's performance in the play elements, and selecting a set of additional play elements or play environments to which the participant may proceed based on the recorded participant performance. The method may also comprise the step of setting various play parameters in a play element based on the recorded participant performance.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the general nature of the invention and its essential features and advantages, certain preferred embodiments and modifications thereof will become apparent to those skilled in the art from the detailed description herein having reference to the figures that follow, of which:

FIG. 2, which is divided into

DETAILED DESCRIPTION OF THE PREFERRED EMBODIMENTS

Overview

Figure 1:
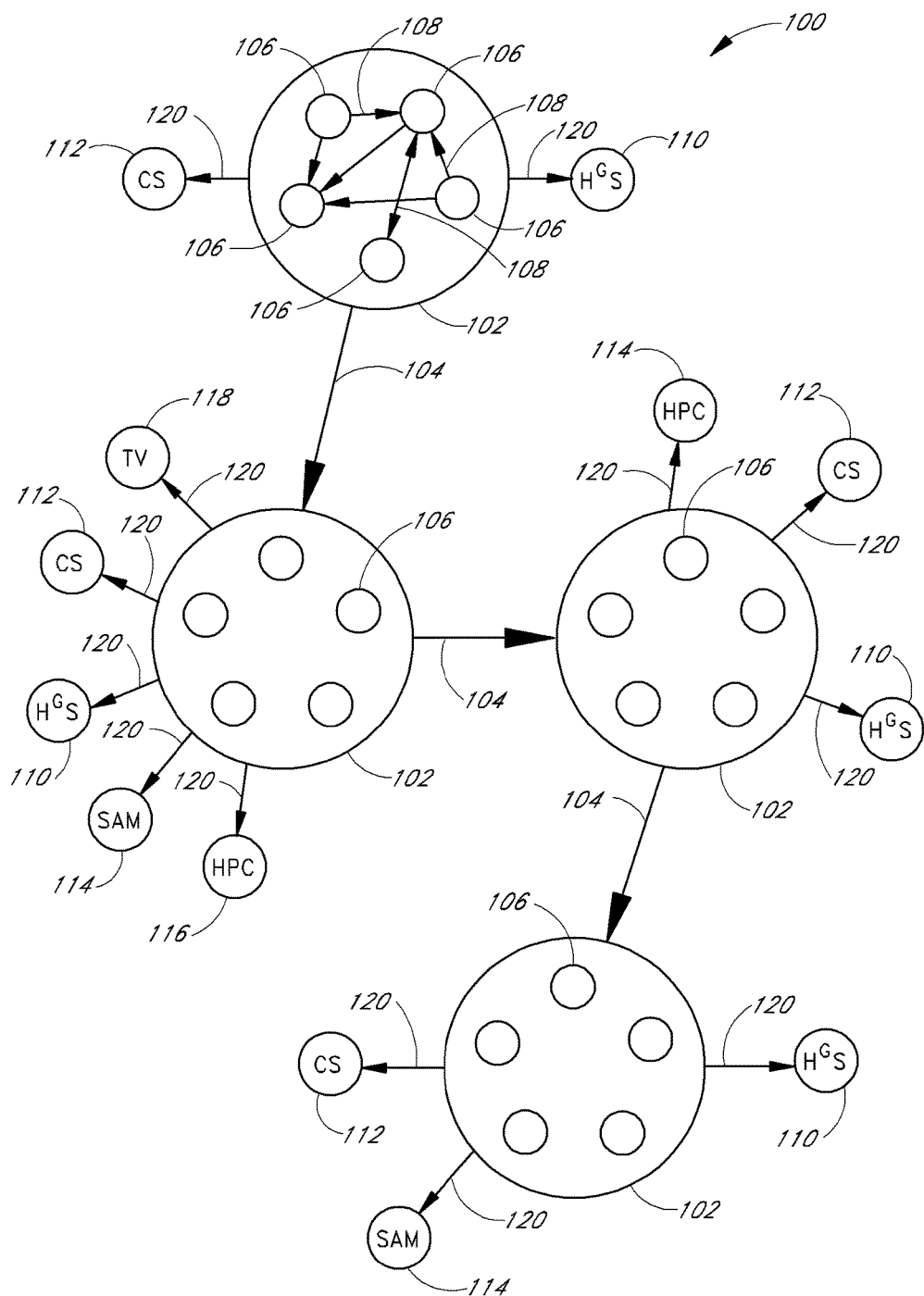
FIG. 1 is a schematic diagram of a play world for use in a multi-media interactive play system.

Conceptually, the multi-media interactive play system (hereinafter "Links") is a framework for various interactive games in which a participant must complete a number of challenges or play elements which are conceptually, qualitatively, sensually, geographically, or otherwise distinct but are nonetheless related to an overall quest, mission, or set of quests or missions. The play elements may, alternatively or additionally, be related to an overall record of the participant's identity associated with his or her game status, character attributes, progress, points, credits, or the like.

A central Links system, such as a computer system or systems or a number of memory devices assigned to or possessed by each participant, are desirably employed to maintain the participant records. As used herein, "central Links system" refers to any device or collection of devices which maintains one or more participant records, and/or determines game parameters, results, or capabilities that affect a participant or participants, corresponding to information in a participant record or records, or otherwise provided to the system.

Preferably, the successful completion of a given play element earns the participant a reward, which may include permission to proceed to the "next" play element or elements, while the participant's game status, progress, etc. is updated to reflect such completion. The reward may also include enhanced capabilities or knowledge that affects the participant's performance or experiences in the next play element or elements. The play elements are thus interlinked under the Links system. The Links system may further define a path network, course, quest, etc. along which the participant progresses while playing the associated game. Another preferred feature of Links is an overall story, plot, theme, etc. that unifies the play elements and attaches a significance to the successful completion of a given element, in terms of advancing the participant in his or her quest, or discovery of further aspects of the plot, theme or play world.

Definitions

As used herein, "play element" refers to an individual game or challenge that a Links participant is to complete. Play elements are the most basic components used in Links to define a course or path along which the participant proceeds. A number of examples of play elements are detailed below.

"Play module" refers to a group of 3-6 or more play elements that are physically or otherwise interlinked. The play module may link the play elements together under a common or aggregate scoring or record system. Generally, a participant must complete all (or a predetermined number) of the play elements, or acquire a requisite number of points within a play module, to proceed to the next play module.

"Play arena" refers to a group of 3-5 or more play modules that are generally (but not always) contained in a single large room or series of rooms, as may be convenient for purposes of scoring, theming, facility design, etc. As with a play module, a play arena may have a common or aggregate scoring or record system for the play elements and modules contained therein, and a required point total or number of completed elements/modules for advancement. A single Links facility may contain one or more play arenas.

"Play medium" or "play environment" refers to a format through which an individual play element is presented or communicated to a participant, and through which the participant interacts with the play element. Preferably, the Links system includes a number of play environments or media, each of which preferably supports a variety of play elements. Examples of play media/environments include Links facilities or play centers, home video game consoles, a home PC or other information appliance, the Internet, a Links website or chat room, a Links television show, etc.

"Central Links system" refers to any device or collection of devices that maintains one or more participant records, and/or determines game parameters, results, or capabilities that affect a participant or participants, corresponding to information in a participant record or records, or otherwise provided to the system.

Participant Identification and Record

Advantageously, each Links participant has associated with him/her some indicium of his/her progress in the game. Suitable indicia include a magnetic-storage card, RF card, floppy disk, CD-ROM, DVD or any other type of relatively small, inexpensive device that electronically (or otherwise) interfaces with a read or read/write device associated with a given play element to identify the participant and update the participant's record as necessary with his or her performance in the play element, and any resulting effect on the participant's progress or status in the game. Preferably, a toy such as a sword, ring, hat, key, magic wand, etc. incorporates interface equipment to provide a functional indicium which itself forms an enjoyable aspect of the game. Alternatively, a participant can carry a stylized photo identification card or Links passport which incorporates the proper interface. As yet another alternative, the indicium can comprise a password, username, or a combination of the two assigned to or chosen by a participant. Suitable input devices associated with the play elements can permit the participant to log in with the password/username so that the participant's performance at the element may be added to and/or influenced by information in the record maintained for the participant.

For each participant the Links system preferably maintains a record as necessary to reflect the participant's game status, progress, etc. The type of information contained in the record, as well as the location of the record may depend largely on the type of game played. For example, the record may contain data relating to which play elements the participant has successfully completed, the participant's performance in each element and the number of points or credits accumulated. In addition, the record may show a type of character the participant has selected for the game (e.g., a wizard, scientist, alien, dragon, astronaut, warrior, etc.) and a set of capabilities or aptitudes (such as magic, speed, intelligence, leadership, creativity) associated with the character or subsequently "developed" as a reflection of, or reward for, attaining a given performance level in a play element or elements, or successfully completing a defined task. Similarly, the record might show an inventory of items (e.g., a key, map, charm, weapon, book, vehicle, etc.) which the participant has "collected" or "purchased" in the course of playing the game, which collection or purchase may also be enabled by attaining given performance levels or completing tasks, or by the accumulation of points, credits, etc.

If desired, the indicium and record system may be further used to group participants into teams, with a record maintained for the team. The team record may represent a total of the points, credits, etc. of the team members or a composite team character with certain attributes and powers. Teams may be composed of a group of friends or family playing together at one Links play center, or participants at multiple centers who interact to achieve their goals, or compete against one another or other teams. Alternatively, Links teams may be assembled partly or wholly from home participants via the Internet or other electronic networks. As still another alternative, Links teams may be formed from a group of participants who are guests at a Links-themed party, for which special rooms may be provided at Links facilities.

Play Media/Environments

The Links system may encompass various play elements set in or carried out by wide variety of play media or play environments. For example, Links play elements can be located in Links facilities or "play centers" which preferably comprise multi- or single-story structures with a fairly large floor area (thousands or tens of thousands of square feet or more). However, smaller play centers are possible as well. A play center preferably houses a number of play elements arranged in a manner that is descriptive of their interrelation in the overall game, e.g. sequentially or grouped according to levels or type of challenge. The play elements housed in a play center may be individually linked to the central Links system, or interlinked with other play elements in the center in addition to the central Links system. Each center may serve as a stand-alone attraction, or can be linked with other centers or other Links play environments. The preferred center houses perhaps three or more game arenas, each of which may have five or more distinct play modules. Each play module comprises a number of a wide variety of play elements, which are discussed in more detail below.

Within a play center a participant can pass or "link" from one arena to another by the completion of some or all of the play modules in the arena, or the accumulation of enough points or credits in the arena. Similarly, a participant can link from one play module to another within an arena by the completion of some or all of the play elements in the module, or the accumulation of enough points or credits in the module. In a given module one or more play elements may require a participant to interact with another participant at a corresponding element in another play module, to help each other solve special problems or achieve a common goal to complete the element.

Each link between arenas or play elements may comprise a challenge connection such as a slide, rope bridge, trolley tracks, swinging bridges, net climbs and bridges, V-net bridges, web climbs and bridges, web slides and push/pull tracks. These challenge connections provide dexterity and physical play challenges.

A Links play center may employ one or more Links Gamemasters who may occupy a control room or rooms in the play center. The control room provides Gamemasters with access to some or all the computer, audio and visual systems in the play center. A Gamemaster can assume different roles in the interactive play, such as antagonist, joker, or mentor to the participants. The Gamemaster may monitor individual participants and assist, aggravate or tease them, give hints for play elements or cause a participant to get lost in a maze. In addition, the Gamemaster may organize special quests or games within the play center, for either an individual participant or teams of participants. Thus the Gamemaster can become the "personality" of the play center and make occasional live appearances, or become invisible to most or all participants.

Preferably, a given city or region has a number of Links play centers in different locations, and a Links game requires participants to visit many or all of the centers to complete a game by filling out certain aspects of their characters or completing all levels of the game. A collection of play centers, combined with other links play media and environments, comprises a "Links World." It is contemplated that each separate play center in a World will permit the participant to complete aspects of the game which are unique to that particular center. To facilitate this variety, each center may have a different theme, such as a medieval, western, or space theme. Within each center each game arena can have a sub-theme that fits into the overall theme. For example, in a medieval play center one arena may be themed as a castle, another arena as a city and a third as a dungeon. Alternatively, each arena within a center can have a different theme.

Another preferred play medium for the Links system is a stand-alone arcade-type game (possibly coin operated) which may be located in a game business or other public area which does not have an overall affiliation with Links. That is, a stand-alone game or a group thereof may be situated in an arcade, convenience store, shopping mall, etc. which has no overall affiliation with Links, and provided with a connection to the main Links system for participant and game data transfer. In addition, a Links stand-alone game may give a participant clues, hints, tips, etc. which may be useful when the participant plays in another Links environment, such as a Links play center.

It is also contemplated that Links may include play via home console or hand-held game systems such as the familiar PLAYSTATION, NINTENDO 64, DREAMCAST, GAMEBOY, and other similar products. Alternatively, dedicated or purpose-built home gaming systems could be employed. One option for employing this type of play medium is through Links-specific game CD-ROMs, DVDs, cartridges, or other software that the participant can purchase and play on the home game system as a Links play element or play module, with his or her score/result/etc. communicated to the central Links system. Where properly equipped, any of these home game systems may accomplish data transfer with the central system via a direct modem or network connection, or via the Internet. A home game system may also support a connection to Links through a read/write device that connects to the home game system and interfaces with the indicium described above, so as to transfer data to and from the indicium to influence the participant's performance in the game, adjust game parameters, update the indicia with the player's performance or result in the game, etc. As with a Links stand-alone game, home console play may give a participant clues, hints, tips, etc. which may be useful when the participant plays in another Links environment, such as a Links play center.

Another preferred Links play medium is a home PC or other information appliance that interfaces with Links through the Internet or other network or modem connections. As with the home game system described above, the participant may purchase play element software to run on the PC or other appliance to participate in the play element. Alternatively, the participant could use the PC or other appliance to play Links games which are resident partly or wholly on a Links Internet server or website, Links mainframe or other machines connected to the participant's PC. By playing on a PC or other information appliance, a participant may find clues, hints, tips, etc., which may be useful when the participant plays in another Links environment. Preferably, the Internet or network connection is used to transfer game parameters, results, participant performance, etc. to update the participant's record. As with the home game systems described above, a read/write device can also provide an interface between the PC or other appliance and the indicium to update the participant's record as necessary.

Yet another preferred Links play environment is an interactive television show presented on broadcast or cable television, or available via home video or pay-per-view. Preferably, the Links television show is a combination game show and participatory TV program based on a Links game theme. The participants on the Links television show may face challenges or play elements similar to those found at Links play centers. Participants viewing the program can learn special tips and clues for completing their challenges or quests the next time they visit a Links play center. In addition, some or all of the Links play centers can hold competitions, the winners of which can then compete on the Links television show.

A Links feature film or series, presented in theatres, on broadcast television or on home video, is a further potential source of Links secrets, codes, tips, tricks, etc.

Yet another preferred Links play environment is a Creation Station which is a crafts area where participants may complete various play elements which involve construction of simple items. A Creation Station may be located in a Links play center or may comprise a stand-alone play environment.

Preferably, a Links website provides a center for the Links participant community to interact via chat or message forums, and look up player records, statistics and the like. The website may also contain Links news, secrets, tips, tricks, and other information. In addition, accessing the website may itself be a source of points for a Links participant; that is, a participant may gain a certain number of Links points, credits, character attributes, etc. for logging onto the website and engaging in various activities on the site.

It is also contemplated that Links players can accumulate Links points, credits, secrets, tricks, tips, etc. through the purchase of Links merchandise at stores which may be stand-alone or integrated into Links play centers as gift shops. Such stores may also be dedicated Links stores or existing retailers that sell Links items. Links merchandise may include T-shirts, computer games, video games, board games, and interactive toys. Similarly, participants may patronize integrated or stand-alone Links-themed restaurants, or existing family or fast-food restaurants promoting Links to receive Links points, etc.

Links preferably includes education in its play media environments, through play elements incorporating educational themes and otherwise. Some Links play elements, discussed in detail below, teach scientific principles, involve engineering or mechanics, include arts and crafts, or have a historic emphasis. Furthermore, Links may work in conjunction with programs such as ODYSSEY OF THE MIND to teach children creativity and problem solving. Preferably, an organized Links educational system includes teams of children from different parts of the country that compete against each other in educational activities simultaneously at different Links facilities.

FIG. 1 is a schematic depiction of a preferred arrangement of a Links World 100 contained in one Links play center. However, as mentioned above a Links World may comprise multiple play centers and/or multiple associated Links play environments. In addition, one must note that a wide variety of combinations, configurations, link patterns, etc. may be utilized in constructing a Links World 100, and that FIG. 1 represents just one possible World. The Links World 100 has a number of arenas 102 that are connected by arena links 104 which may comprise challenge connections as detailed above, or other types of connection. The arenas 102 are shown as being linked in a sequential or linear fashion; however other linking patterns are possible in which a given arena 102 may have links to multiple arenas depending on participant performance or choice. Within each arena 102 are a series of play modules 106 which comprise a number of play elements (not shown). The play modules 106 are themselves connected by module links 108 that define a path for the participant among the modules. Like the arena links 104 the module links 108 may comprise challenge connections, etc. As outlined above, it is preferred (but not necessary) that satisfactory completion of some or all of the play modules 106 in an arena 102 permit the participant to use the associated arena link 104 to proceed to the next arena.

FIG. 1 also shows a number of additional Links play environments in the form of home game systems 110, creation stations 112, stand-alone Links machines 114, home PCs 116 and television shows 118, which are associated with the Links play center in the Links World 100. Each of these is connected to one or more of the arenas 102 via supplementary links 120. Here the additional Links environments are depicted as play modules associated with individual arenas 102; however these environments may also be arenas or Worlds unto themselves, or play elements within or associated with a play module 106.

Play Elements

The Links system preferably supports a wide variety of play elements which can be combined in various ways to provide a very diverse play experience. The following is a description of various examples of Links play elements, which merely representative and not an exhaustive list of all possibilities. One of skill in the art can readily envision additional games and challenges that are suitable for inclusion as Links play elements, as well as the broad scope of play that can be made a part of Links. It is also to be appreciated that most or all of these play elements can be presented in a physical or "live" manner, or can be conducted through computer simulations with which the participant interacts.

Navigate the Maze

This play element involves two participants, one on an upper level platform overlooking a lower level where the other participant is positioned. A number of cards, preferably five, with arrow symbols are located in a pouch or other receptacle on the upper level. The participant on the lower level must travel a course or maze in a particular sequence and push a number, preferably ten, of buttons that are located throughout the course in the proper order. The correct order is shown on a graphic that is visible only to the upper-level participant. The upper-level participant displays the cards to the participant below to indicate which direction he or she is to go and which button to push. Once completed, the participant below and the participant above may insert their cards or otherwise present their indicia at the same time for points.

Station Buttons

This play element involves two participants, one upper and one lower, not within visible range of each other. One participant faces a panel of (preferably) six buttons, each a different color. The other faces a color monitor. An intercom or other simple communication device connects the two stations. The participants insert their cards or otherwise present their indicia to start the play element and have thirty seconds to push the buttons in a proper sequence as shown on the monitor. The sequence may change each time and preferably has more colors for older participants. A similar play element or elements can be operated in another location in a play center, etc. and based on shapes, letters, numbers, textures, object names, etc. instead of colors. This play element may also be run at multiple locations with three or more people attempting to coordinate their actions.

Twenty Questions

This play element involves two participants at two different stations, one with a monitor, and the other with a keyboard or other buttons corresponding to the alphabet, both connected to an intercom. When both insert their cards or otherwise present their indicia, the monitor begins listing clues every few seconds, preferably every five seconds or so. The participants relate the clues to each other and discuss them until one participant keys in the correct name of the object at the station with the keyboard. Preferably, this element uses simple objects and clues for young people, and more difficult ones for older people.

Other Sites

In this play element interlinked video and/or computer stations connect two or more Links facilities via the Internet. Guests can simply chat with each other or solve common problems and puzzles. Some puzzles may require a participant to contact another participant at another site to get assistance, wherein the solution is only available at the remote participant's site.

Build a Wall

A participant must build a wall, preferably between two posts approximately six feet apart, using blocks that are preferably rectangular and approximately the same size as cinder blocks but much lighter in weight. Each age group may be required to complete the wall to a different height. For example, a three year old may build an eighteen inch wall, whereas an adult might build one six feet tall. Horizontal light sensors may be provided at various heights to sense when the job is complete. The size and shape of the blocks may be changed every few weeks so that the task varies and different skills will be required to master the building technique.

Build a Structure

The participant is provided with several pieces of balsa wood, tape, and paper clips. The participant must build a structure out of the materials that is preferably at least two feet high and will hold a fifty pound weight.

Build a Bridge

The participant is provided with several pieces of balsa wood, tape, and paper clips. The participant must build a bridge that preferably spans two concrete blocks three feet apart and will hold a twenty-five pound weight in the middle.

Simultaneous Cooperation

This play element involves several participants at different locations. Each must push a button simultaneously. Signage instructs them that one way to accomplish this is to start counting all together and to keep the count while the participants run to change locations.

Whack-a-Mole

The participant stands at a machine that has a number of openings in a substantially horizontal surface. The machine has a corresponding number of simulated moles that the machine causes to "pop up" out of the openings in a random manner. The participant must "whack" each mole with a mallet or other device as quickly as possible after the mole pops up. After the mole is whacked it lowers back beneath the horizontal surface, until the machine causes it to re-emerge from its opening, at which point the participant must whack it again. Points are awarded based on how quickly the participant can respond to and strike each mole.

Throwing Skills

The participant must throw bean bags or foam balls through different sized holes. Preferably, older participants are required to hit more, smaller holes from a longer distance.

Shooting Skills

Participants shoot blaster or laser guns at moving and stationary targets. Points are awarded for the number of targets hit in a given time period.

Targets

As a multiplayer version of Shooting Skills, a participant moves targets which other participants are attempting to shoot, making the targets harder to hit.

Ball Drop

This play element involves two participants, one on an upper level and one on a lower level. Foam balls are dropped from above, which must be caught in a net or passed through a hoop. The balls drop in to a fenced-off pit and are delivered back to the upper level via a manual conveyor.

Hide and Seek

A map is displayed to a number of participants, preferably five, and indicates where each must go. Each participant is thus sent to a different location. When a participant reaches his or her assigned location, he or she may insert a card in a reader or otherwise present an indicium, and then tries to be the first one back to the starting point.

Board Games

In a game parlor, Pictionary and various similar games may be provided for play, hosted by a Gamemaster. Points are awarded to winning teams accordingly. Preferably, games may be provided for various ages at various times.

Trivia

A monitor is provided with a set of buttons beside it. The participant selects a time period or other topic and is asked a number of questions, preferably six, from the chosen time period or topic. Preferably, difficulty is related to the participant's age. The participant earns points by getting a required number of questions correct.

Re-Creation

A participant dresses up as a figure from the past and helps to re-create a short play depicting a special moment in time. Parents are encouraged to participate as well, and photos of the dressed-up participant(s) may be made available for viewing, printout and purchase.

Rube Goldberg

The participant builds a "Rube Goldberg" contraption out of various parts which are provided, in order to accomplish a particular task. For example, the participant may need to cause a small steel ball to travel to a predetermined location across the room. As another example, the participant may have to raise a weight to a given height with a water jet as a source of power.

Gears

The participant must put a set of gears together in the proper sequence to turn a lever to open a door, passage or chamber leading to another play element or module.

Numbers

The participant must remember and repeat a specific sequence of numbers.

Colors

The participant must remember and repeat a specific sequence of colors.

Shapes

The participant must remember and repeat a specific sequence of shapes.

Musical Notes

An audio or audiovisual system plays a number of notes, preferably six, and the participant must play them back in sequence on a set of colored buttons in a given time, preferably thirty seconds or less.

Good and Bad

A monitor or Gamemaster asks a participant to respond to several ethical problems and scores the participant on his or her response.

Logic

A monitor or Gamemaster asks a participant to make logical assumptions and to draw conclusions from various statements. Points are awarded for drawing conclusions that are the most sound or the least obvious.

Odyssey of the Mind™

Hundreds of standard Odyssey of the Mind™ type problems are made available and materials supplied for completing the problems. Points are awarded for the skill, creativity, and completeness of the solutions made by the participants.

Computerized

A computer station may have many simple problems and games available for play. For example, some may be based on "Rube Goldberg" devices to show the effects of moving or altering various elements of the device. Other problems might be common sense, real-life based.

Piece Puzzles

A participant must fit pieces together in either an actual or computer-simulated puzzle. Preferably, older participants are assigned puzzles with more parts.

Logic Puzzles

A participant must determine how to connect point A to point B/C/D/E/etc. in the shortest possible distance.

Common-Thread Puzzles

The participant must determine what a number of things, preferably three or more, have in common, based on a picture, description or the like.

Keys Quest

A participant must find a number, preferably five, of golden keys, or tools or provisions needed to advance to the next level, module, or arena. The keys, etc. are hidden in many different locations. Some of them may be easy to find along familiar play routes, and the remaining ones may be well-hidden in nooks and crannies. Preferably, points are assigned for each key found. The key locations may be changed every week or so to provide variety.

Skill Quest

A participant must complete at least three of each of the following skills: Strength, Dexterity, Communications, Puzzles, and Memory.

Sequential Quest

A participant goes from one station to another, solving problems in a specific order to get clues for the next problem. Preferably, the participant solves a big problem at the end to win. Some problems might be geared towards boys, such as shoot-em-up's, and others would be for girls.

Scavenger Hunt

A participant must find people and articles. For example: one red-headed boy, one gold VISA card, one pair of penny loafers, etc. A participant must convince the owners to come with him or her, or allow him or her to borrow their belongings. Alternatively, the participant must find out the names of a certain number of the other participants in the area.

Gamemaster Quest

A participant must solve specific quests that the Gamemaster creates for a given day.

Multi-Quest

A participant must accumulate a certain number of points and/or keys to proceed, e.g. 250 points and two keys in Arenas 1 and 2 to enter Arena 3. Or a participant must accumulate 500 points and four keys to enter Arena 5 for a Grand Quest.

Pull Rope

A number, preferably four or five, of participants must pull a rope against a weight and hold the rope for a given time period, preferably thirty seconds or more. Older participants may be required to hold heavier weights.

Sledge Hammer

The standard carnival attraction is themed for Links. Preferably, participants of different ages must hit different levels to collect points.

Pulley Bridge

A wooden "raft" is provided that slides between an upper station and a lower station. Participants on either side must pull the raft back and forth while another participant rides on it. The participant riding the raft cannot move it himself and must work with participants on either side to get the raft across.

Race Cars

A participant must build a race car from materials provided and race against others on a downhill track. The winner of each heat wins points and a chance to race in a final heat.

Boats and Barges

A participant must build a boat from materials provided, that will hold the most people or cargo without sinking. A water tank, preferably a round tank with a diameter of eight feet or more, may be provided with interactive pumps and items for other water experiments.

Break-In

A participant uses an intercom at a special station to break into communications between two other participants who are trying to accomplish a mission.

Fake-Out

A participant controls a monitor at a phony station to play tricks on other participants who believe they are using it for a quest or a mission.

Surveillance

A video camera is located in an area that has an air blaster mounted under a grate. A participant sits in a remote location, waits for someone to walk over the grate and hits a button to activate the blaster and create a blast of air.

Video Gags

Remote cameras are located behind mirrors to catch participants making funny faces. Another participant sits at a console where he or she can select images and project them onto a large screen where everyone can see them.

I Spy

A participant uses glass prisms, periscopes, and telescopes to track and spy on people. Some of the people under observation are given a specific code which they try to keep secret while entering it into a terminal. The participant must try to learn the code for points.

Arena Quest

A participant must complete a new, more difficult quest in each arena. The participant learns of the new quests only after getting to the last arena.

Get the Bad Guy

A participant must shoot the "bad guy" at the end of a quest with laser guns, ball blasters, etc. The participant must have a certain number of strength and dexterity points and receives more shots with increasing points. The "bad guy" may be a character played by another participant or the Gamemaster or a target.

Skills

A participant must increase all of his skills to a predetermined level to receive a reward.

Arena Configuration

Figure 2A:
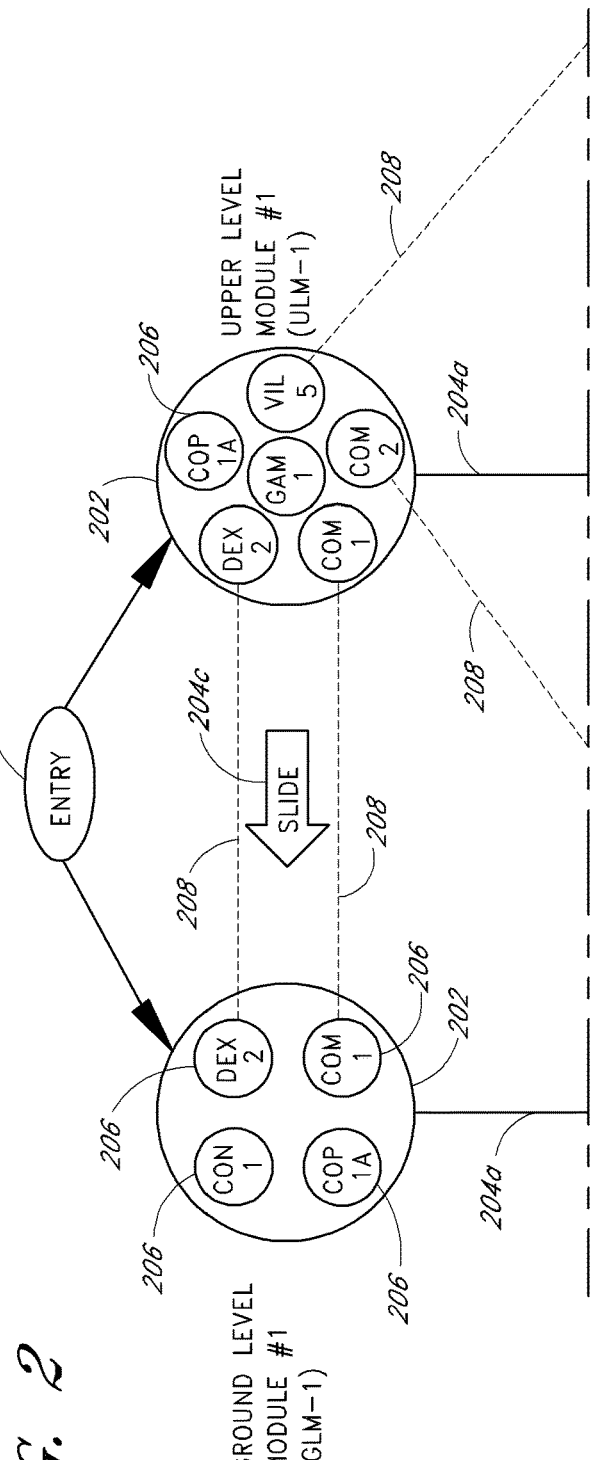
FIGS. 2A-2C, is a schematic diagram of a play arena for use in a multi-media interactive play system.
Figure 2B:
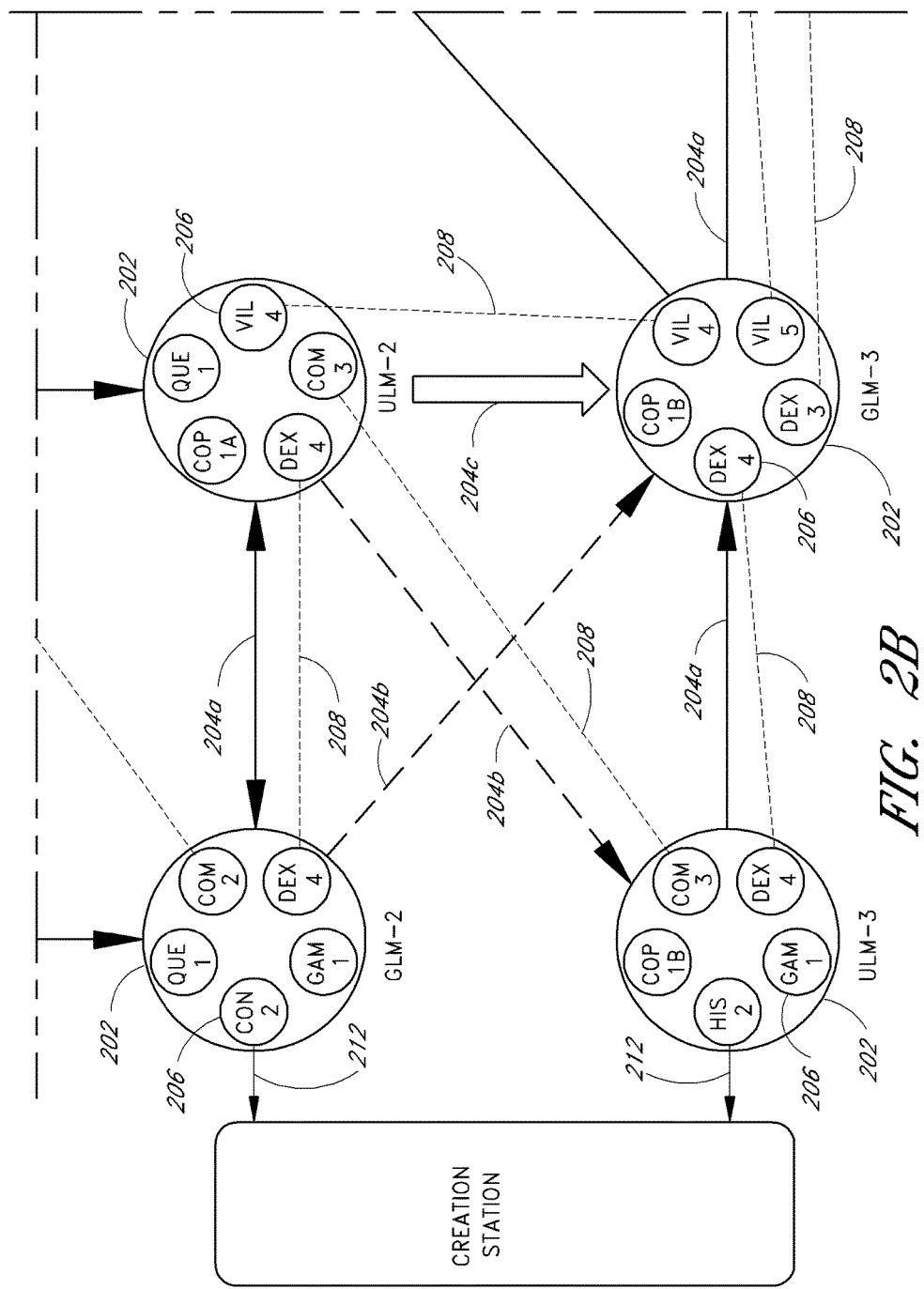
Figure 2C:
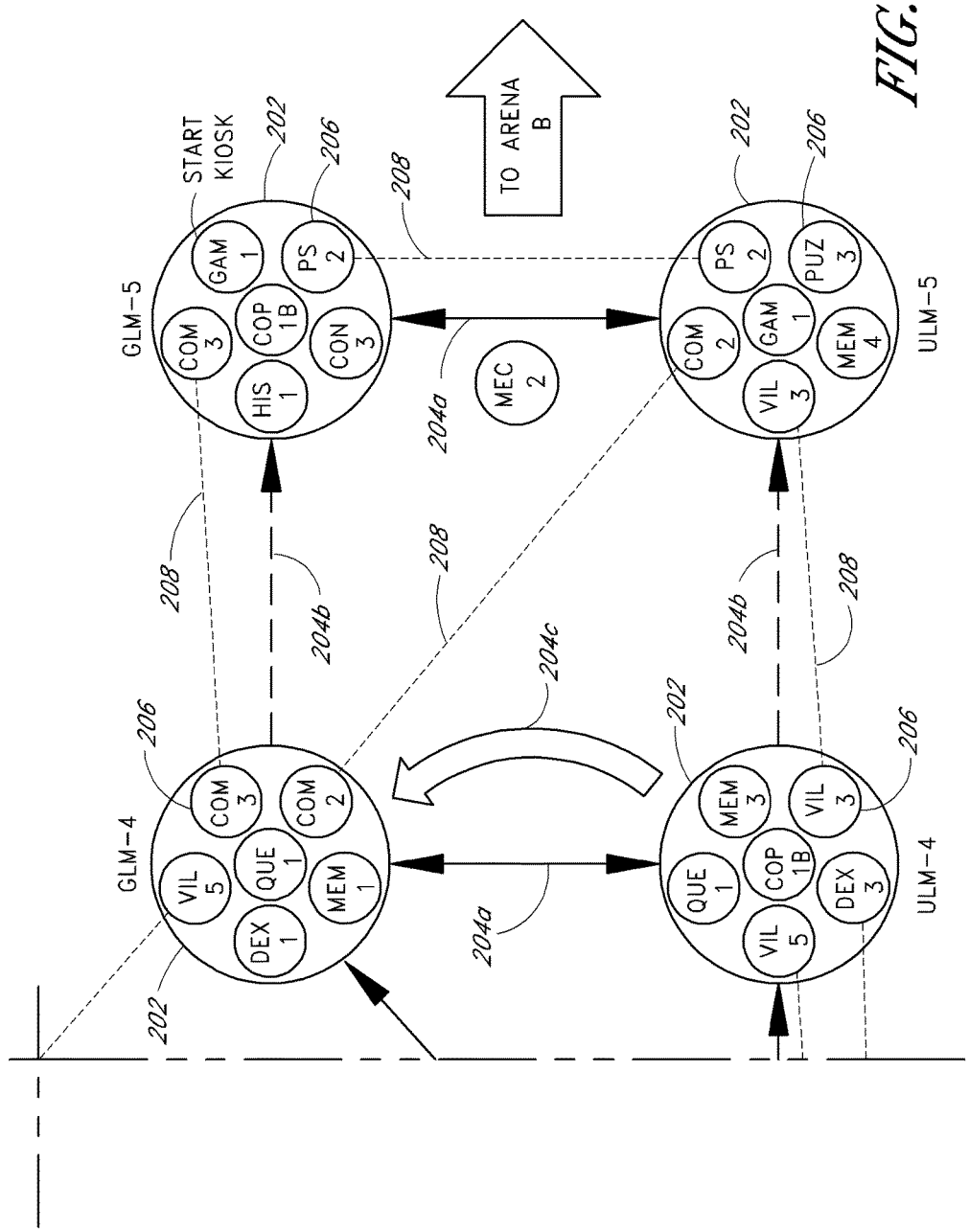
Figure 3:
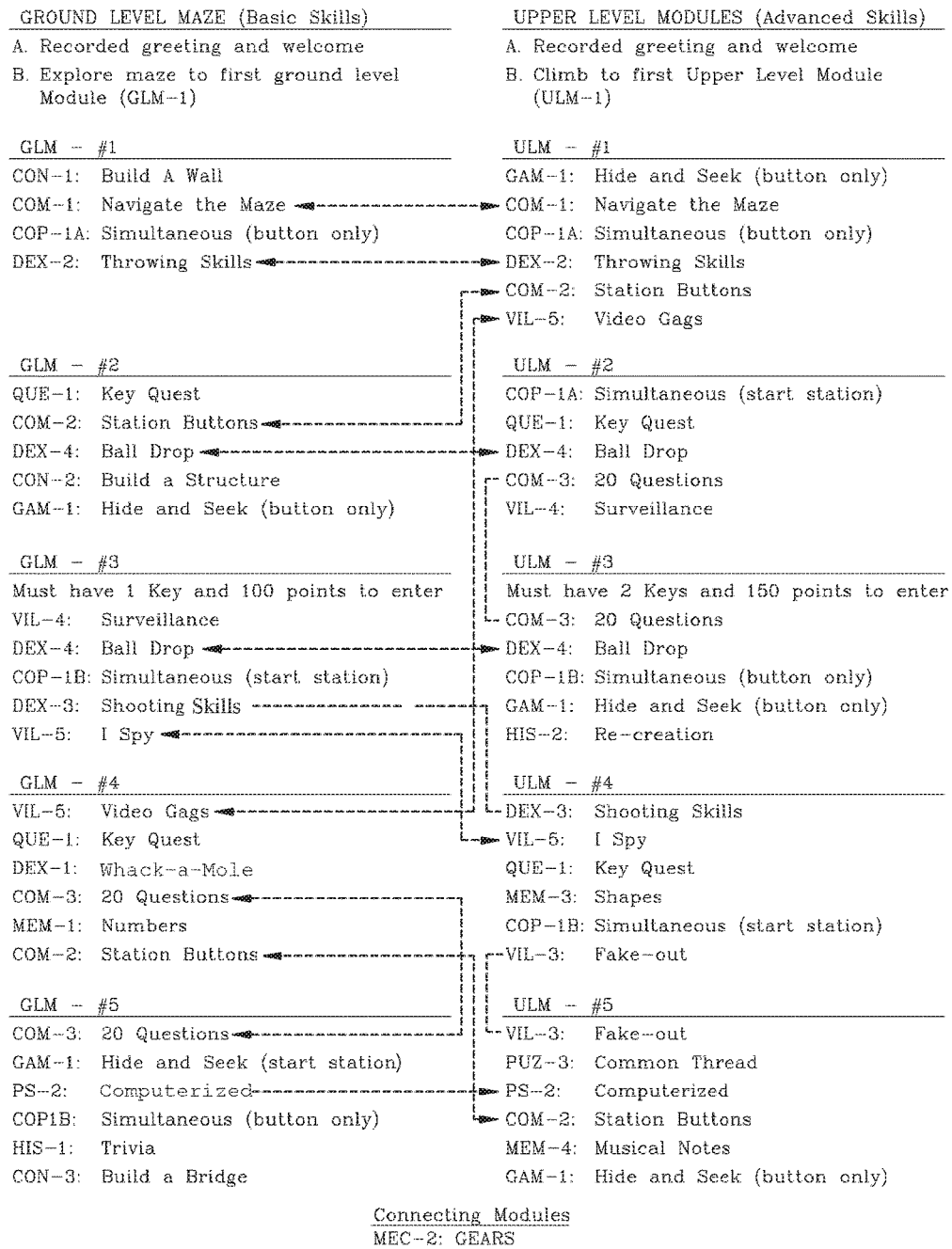
FIG. 3 is a chart detailing the codes that identify play elements shown in FIG. 2.

FIGS. 2 and 3 show schematically one preferred layout of a Links arena 200. However, one must note that a wide variety of combinations, configurations, link patterns, etc. may be utilized in constructing a Links arena, and that FIGS. 2 and 3 represent just one possible arena. With reference to FIG. 2, the arena 200 has a number of play modules 202 that are connected by module links 204a, 204b, 204c which may comprise challenge connections as detailed above, or other types of connections. The module links 204a, 204b, 204c comprise direct links 204a which permit the participant to advance upon completion of a requisite number of play elements 206 within the module 202; indirect links 204b which permit advancement only if the participant has accumulated enough points, credits, items, etc. either in the module 202 or in the game generally; and slide links 204c which connect modules located on an upper level to modules located on a lower level and permit one-way slide traffic downward.

The modules 204 and elements 206 are labeled according to the system shown in FIG. 3. The arena 200 shown in FIG. 2 has a two-story configuration; thus the modules 206 are divided into ground level maze or modules GLM-1 through GLM-5, and upper level modules ULM-1 through ULM-5. Preferably, the ground level modules involve application of basic skills, while the upper level modules test more advanced skills.

Each module 202 contains a number of play elements 206, each of which may comprise one of the play elements described above, or other play elements as may be devised in creating a Links arena. Each play element 206 is labeled to identify it according to type. FIG. 3 identifies the individual play elements corresponding to the labels in FIG. 2. The labels also indicate a class or group into which each play element falls: Communications (COM), Construction (CON), Cooperation (COP), Dexterity (DEX), Games (GAM), Historical (HIS), Mechanical (MEC), Memory (MEM), Problem Solving (PS), Puzzles (PUZ), Quests (QUE), and Villain (VIL).

As detailed above, a number of the play elements 206 require interaction between participants in separate modules 202. Thus FIGS. 2 and 3 show interactive links 208 connecting like elements 206 in separate modules 202, where the elements require interaction between participants. In the case of the play elements VIL-4 which comprise the "Surveillance" element, its interactive link 208 has an arrowhead to indicate the relative positions of the observer in ULM-2 and the person under surveillance in GLM-3.

The arena 200 also comprises a Creation Station 210. The arena 200 thus includes creative links 212 joining the Creation Station 210 with the play elements 206 which require the participant to use the station.

With the arena of FIGS. 2 and 3, or an entire Links play center, it is advantageous to include a number of preliminary areas through which participants may pass before entering the play space. For example, a participant may first enter a ticket counter area where a new participant can purchase a Links indicium and a ticket good for a certain amount of play time. A repeat participant may also purchase play time, and either a new or repeat participant could pay extra for additional Links points or credits.

New participants may proceed from the ticket counter area to a story booth which instructs the participants on the theme or story underlying the Links game. The story booth is preferably themed with graphics, photos and props, and includes a short video which details the story line of the quest or game that the participants are about to begin.

A programming booth preferably follows the story booth. In the programming booth the participants may enter identifying information (age, gender, hobbies, etc.) and select a character which is to be the participant's alter ego during the game. The character may be a composite of attributes selected by the participant, or it may be selected from a list of ready-made characters, or a combination of the two types. The participant selects an inventory of weapons, personal effects and character skills and may be shown on a video screen a composite photo of the character thus created. The participant may purchase a printout of this photo if so desired. The character information is made part of the record created for the participant, and is loaded onto the participant's indicium if it is of the memory-equipped type, or is saved in the central Links system.

From the programming booth a participant proceeds through a themed tunnel to the playspace entry 214 where the participant may view the arena 200 and identify the starting position and the goal or objective in the arena 200 or the game generally. The participant chooses between starting with the ground level maze/modules, or the upper level modules, and presents his or her indicia to proceed into the first module.

Figure 4:
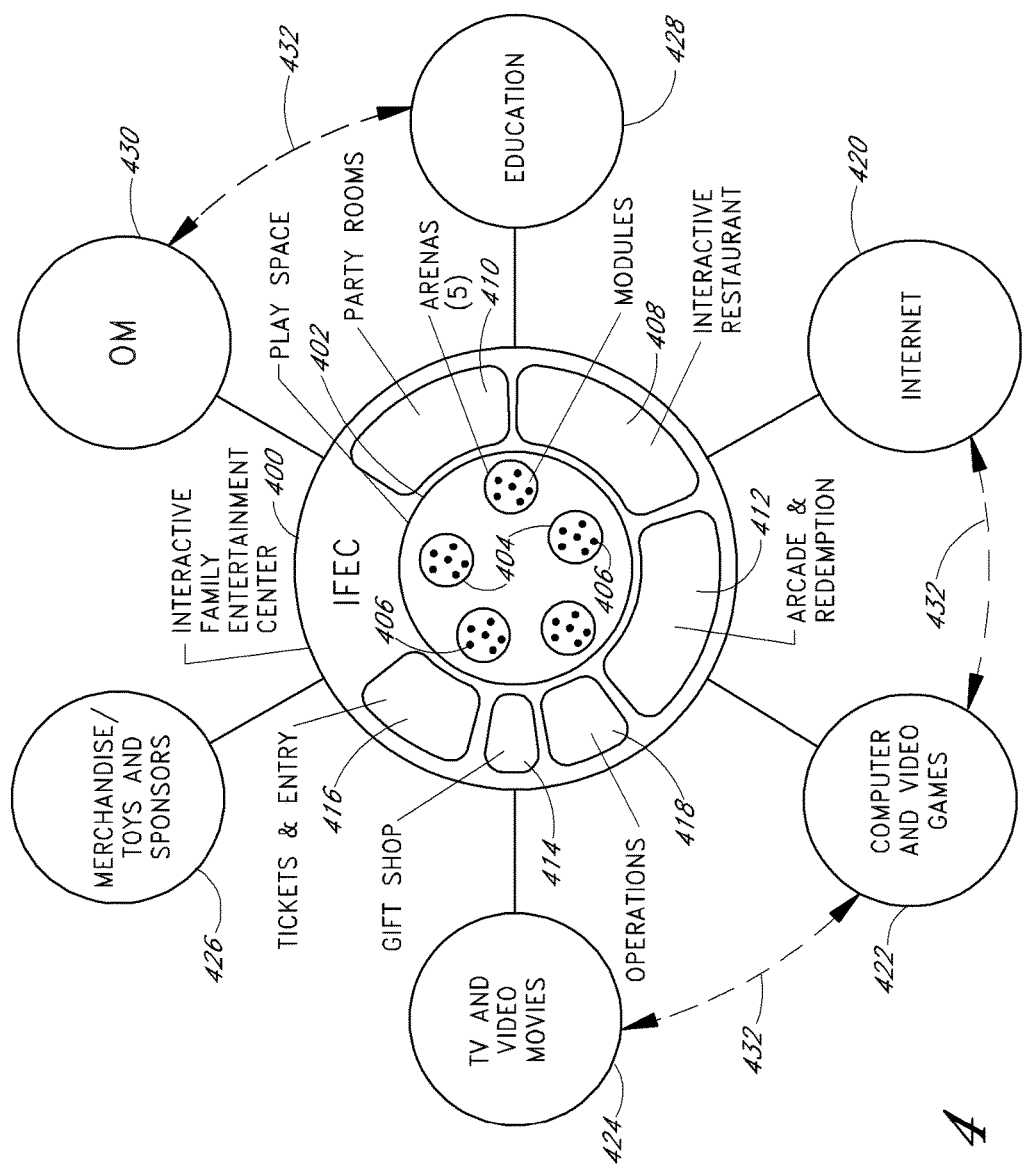
FIG. 4 is a schematic diagram showing the organization of a play center and associated play environments for use in a multi-media interactive play system.

FIG. 4 shows how a Links play center or Interactive Family Entertainment Center 400 fits into the overall Links organization. The core of the play center 400 is the play space 402, which contains play arenas 404 and play modules 406 within the arenas, as discussed in detail above. Preferably, the play center 400 also incorporates other areas to support additional Links play media. These include an interactive restaurant 408, one or more party rooms 410, an arcade/redemption center 412, where Links points/credits may be redeemed for merchandise and other incentives, and a Links gift shop 414. The play center further includes an entry and ticket-counter area 416, and an operations area 418.

FIG. 4 also shows additional Links play media or environments which are connected to the play center 400 but not necessarily a physical part of the center. These include play via the Internet 420, home video game systems 422, TV/home video 424, merchandise/toys 426, educational play 428, and play via ODYSSEY OF THE MIND type activities 430. A number of media links 432 show a close association between two or more of these play media, such as between educational play 428 and the Odyssey of the Mind 430, or between Internet play 420, home game system play 422, and TV/home video play 424.

Dream Masters Theme

DreamMasters is one example of a preferred theme or plot that can be applied to or carried out by the Links system, to provide a high level of participant involvement and interrelation between different play media encompassed by Links.

Overview

A complete fantasy adventure game is created in which a new toy, developed by a group of scientists, enables users to create, control and master their own dream states. The toy, called the DreamMaster Device (DMD) is, in reality, a major component of the Links play system. This device, which is preferably of a handheld size, emits and receives radio transmissions which activate play elements and record points, and sends and receives messages. By completing various play modules, participants become a part of an evolving fantasy game which encourages repetitive and continuous use of entertainment centers, the Internet, television and other media to reach higher, extreme levels of "dream creation."

The Story

The ability to master our fantasy dream world is now upon us. A brilliant group of research scientists who have been studying dreams for three decades have developed a unique technology, called the Dream Master Device (DMD). This device allows people of all ages to manipulate, power and create our own fantasy dream states. These scientists created DMD to give people the opportunity to visualize their most fantastic dreams. With intense training a person can use this amazing device to create magnificent worlds where he or she can fly, go on an exciting adventure, visit exotic places, become a super hero, a princess, a firefighter, a millionaire or even live in another time in history.

This powerful device is small enough to fit into the palm of your hand and puts out a highly advanced frequency that allows people to control their dreams. This device, however, is not easy to operate. Designing and creating your own dreams is considered an "art form" that requires many hours of hands-on training and fantasy skill development. Through interactive, highly specialized training methods, individuals learn how to use this miraculous device.

The Evil Force

While creating this technology, this elite group of scientists discovered that an evil force was trying to steal their technology and use it harmfully. If this secret technology was put into the wrong hands, dream making could become someone's nightmare (literally), or even worse, used for mind control. The scientists decided to go into hiding by keeping the location of their laboratory top secret and erasing their identities completely.

The scientists came up with a brilliant plan to share their incredible technology without exposing their identity. They would make the DMD available only to those willing to be specially trained in using the device. The DMD is introduced at special training centers. In order to use the device at its fullest potential, frequent visits to the training center are necessary. These centers then train users to become skillful at manipulating color, sound, communication, conflict resolution, social interaction, story telling, fantasy development, role playing, problem solving, physical agility and intellect and more, all of which are important skills in creating incredible dream states.

The way the training centers work is that dream masters-in-training are given their own DMD which they carry with them at all times while learning dream creation. The device itself is not fully "loaded" with the appropriate software and actually needs to go through the training process with its "owner." As the owner develops his or her skills in dream creation, the device's technology becomes increasingly more sophisticated and capable of producing vivid dream states realized though audiovisual equipment, virtual reality hardware and software, force and vibratory feedback equipment, scent and temperature generation equipment, etc.

At first, a new DMD user can only achieve very basic dream creation; i.e. silent black and white stick figures. As the user participates in several training sessions and achieves new skill levels, the DMD is programmed to allow for increasingly dynamic visual and auditory dream creation including full color, realistic backgrounds in 3D, high adventure options, auditory and sensory effects, and sophisticated character development. The highest level of dream mastery allows for extremely complex story development with 3D, surround sound and tactile experience (temperature, vibration and scents).

The Dream Masters

A creative, smart and talented group of kids became remarkably proficient in using the Dream Master Device. So proficient that they had reached the most extreme level of dream making and began their own special group over the Internet to chat, share techniques, ideas, and their newest dreams with each other. These kids, aged five through seventeen, live in different countries throughout the world such as the U.S., Australia, Japan, England, Egypt, and Mexico. The kids communicate often and have named themselves the DreamMasters Elite. For several months the research scientists kept a close eye on this talented bunch. The scientists began to make contact with the DreamMasters Elite by sending them secret messages on their DMDs. Given their exceptional abilities to use the technology, the scientists began trusting this group of kids with very guarded information. The Dream Masters Elite are now the scientists' only links to the outside world, and more importantly, their finest protectors against the evil forces.

The Dream Master Device

This unique handheld toy is able to transmit and receive radio frequencies from anything capable of putting out or receiving a signal including television, radio, computer systems and networks linked to RF modems or transmitters, videotape and DVD machines connected to transmitting equipment, fixed locations (Links facilities) and other DMD devices. The DMD preferably has a tiny screen that is able to receive messages and images. For example, while playing with a software program or watching a television show messages can be picked on the DMD and viewed on the tiny screen by the user.

In addition, the DMD device can be programmed like a smart card. More specifically, within the Links facilities, this device can be tracked by an internal system that interfaces with the central Links system to record the play and activities of the participant. A participant's record can be downloaded onto a personal disk or file that can be stored for continued play. The DMD can also transmit signals to other DMDs. When in the company of another DMD owner, a participant's DMD can signal the participant who may then send a message to the other DMD owner.

The Links Play Centers—Dream Zone (DZ)/Fantasy Factory

These specially designed Links play centers become the hub of the interactive game play. In the play centers the Links system combines interactive event arenas based on the DreamMasters story. Preferably, the play center is outfitted with radio frequency reading and transmitting devices that interface with the DMD.

The play center has several play arenas highlighting the development of specific skills in the dream creation process. The climax is a Fantasy Finale where a participant enters a computerized personal viewing booth where he or she can download data from his or her DMD, and create and view a dream fantasy with specially designed software. The content and complexity of the dream fantasy vary with the participant's level of progress in the DreamMasters story or game.

Entrance and Programming Booth

The entertainment experience starts with the purchase of a DMD (repeat participants have the contents of their DMDs downloaded into the central Links system). Participants then proceed to the story booth where new participants are told about the DMD and how to use the play center. Repeat participants are updated with the latest news. The participant may input specific goals that he or she wishes to reach and the DMD is programmed to respond to and receive information corresponding to the selected goals. The participants receive a suggested itinerary to help them reach their goals and may then proceed to the first play arena or module.

Dream Master Modules

The play center has a number of training modules that develop specific skills in dream creation. As the participant completes an interactive training module, his or her DMD is tracked by the RF system and performance and experience information is input into the central Links system.

There may be several training modules to explore and levels to reach. Each module focuses on a set of related dream creation skills. The modules may also have the ability to accommodate different levels of play for specific age groups or repeat users. For example, a very young child will be given less difficult games to play, focusing on simple play and exploration. More complicated game play would be designed for older children and even adults. Repeat participants would be challenged with more difficult games as they increase their skill level within each module. Within a module, the DMD may automatically activate the appropriate game difficulty setting according to age or skill level.

Only an elite group of highly trained dream masters will be given clues to the identity and location of the dream scientists.

Module A: Dream Device Activation and Protection

The DreamMasters storyline applicable to this module states that participants are to learn the basic skills in manipulating their DMD. This includes sharpening their reflexes, increasing their memory skills, and tapping into their creative problem solving and creative capabilities to exploit the full capabilities of the DMD. Special instruction and training is given to the participant to recognize danger and to use conflict resolution skills to protect the technology as well as himself or herself. There are provided several levels within these modules in which repeat visits and acquisition of skills allow the participant to take part in higher level interactive experiences. For example, an advanced level may allow the user to play games that require more sophisticated conflict resolution and/or combat skills for protecting the DMD.

Some of the play elements include: a pong game in which participants wear biofeedback devices that manipulate a control on a video screen that depicts the game; a maze game in which participants can manipulate figures to guide them to the exit; the Station Buttons game described above; reflex oriented games such as Musical Notes; conflict resolution games; problem solving games such as Build a Wall; Whack-A Mole; Shooting Games; Gears; video games to train users on how to recognize the Evil Force and how to protect the technology; and Good and Bad.

Module B: Life Form Creation

In this module individuals learn skills in developing life forms. Starting with a first level, the participant learns how to create a human in their likeness. Participants must go through a process that teaches their DMD about themselves, and as they proceed onto more difficult levels they can add more people, animals, create new identities, and add emotions, humor and other personality traits that make the experience feel very real.

Some of the play elements include: scanning in the participant's image; "describe yourself" games; games in which the participant stands in front of a green screen and a video system makes them appear to fly over mountains, scuba dive, surf a wave, become a king, be older, be younger, etc.; electronically recording a participant's physical movement so that it can be used for dream making; communication games such as Navigate the Maze; interactive, socially oriented games that build skills in conducting conversation or scripting interplay between characters; personality and character development games (such as create a hero, create a joker, create a villain); and group games in which several participants make walking, talking "technopeople" interact with each other on a large display screen.

Module C: Scenery Creation

This module teaches the participant how to create unique backgrounds, color, scenery, environment and visual beauty. The first level is in black and white, and the participant progresses to higher levels that allow him or her to create 3D images and "real time" environments.

Some of the play elements include: Musical Notes; mixing paint colors to get a specified shade; a large paint screen with stations where several people can create scenery as a group; games focusing on learning to create environments using software such as ADOBE PHOTOSHOP or COREL DRAW, programmed adventures to different places to increase awareness about possible escapades; using simulation technology to grow a tree, make a rainstorm/tornado/hurricane, erupt a volcano, etc; and a group scenery creation game in which several people are given specific items to make up a scene and have several minutes to design it.

Module D: Sound and Sensory Creation

This module trains the participant in many experiences of sound development and sensory creation. Lower levels begin with simple percussion sounds, and a final level facilitates full "surround sound" and elaborate sound effects, music and sensory experiences.

Some of the play elements include: games that require a participant to listen and track sound in a "sound maze"; a scent maze; Musical Notes; games that require a participant to read music; silent video to which the participant may add sound effects; orchestra games in which each player interacts to make a musical event or composition; a "Stomp" game in which participants create percussion using household items; games permitting the use of biofeedback technology to control the temperature; and video compositions to which a participant adds special sensory effects such as temperature and wind control.

Module E: Story Creation

This module instructs the participant on how to create a full-length story with a plot, scripting, interaction, characters, events and fantasy.

Some of the play elements include: role-playing games; green-screen character Karaoke games; scriptwriting games like MAD LIBS; plot development games; "end the story" games; "start the story" games; group story telling; games which challenge the participant to tell the best ghost story or the best funny story; and assembling a story line from video captures made of people in the entertainment center over the course of a predetermined time interval, preferably one hour.

Dream Download Center

At the conclusion of play, participants enter the Dream Creation center to download data from their DMDs and see how well they did in reaching their skill development goals. They are then able, according to their newly achieved level, to create a 2-minute dream on a software program. The dream is recorded and given to the participant on a floppy disk. All information is stored in the central Links system. This Dream Creation center has the latest technology including 3D screen viewing, virtual reality, surround sound and sensory effects for the highest levels of dream making.

Internet Cafe

This open-design eating area has a large screen of eight by eight feet or more for participants to join multi-site games, view the Links television show and take part in group Internet chat experiences.

Retail Store

Here a participant can buy the latest software related to the Dream Creation process. Software is available for any game that the participant may have played in the center. The software also interfaces with the participant's DMD. Participants may also buy special carrying pouches, key chain holders, backpacks, etc. that hold, protect and accompany the DMD. Also available are videotapes and DVDs of the Links television series and special toys that are used by the main characters in the TV show.

The Television Series

Every week the group of kids that make up the DreamMasters Elite star in their own television series. The show is about the kids' ordinary lives in their countries, in their homes, going to school, playing with friends and having a normal day. But in a matter of minutes their lives become very unordinary when they receive a secret message on their DMD asking them to participate in a quest. They all assemble via the Internet where the scientists explain the challenge for the day. The kids use their creative powers and DMD abilities to solve the problem and bring balance to the world once again. At the end of the show, one kid from the DreamMasters Elite shares with the other kids his or her latest dream creation the television audience to enjoy. As the series develops, new members (real kids) who have reached DreamMasters Elite levels of dream making are given the opportunity to have their dream shown on TV. Throughout the show, secret messages are also sent to the viewers through their DMDs.

The Computer Software

Software is designed to mimic the experiences in the Links play center as well as quests depicted on the television show. In addition, dream-making software is available for designing very intense dreams and fantasies. The software also interacts with the DMD, sending kids secret messages throughout the game.

Website

The DreamMasters website features chat forums, DreamMasters Elite Club, etc. The DMD may interface with the website as well.

Send/Receive Radio Frequency System

Figure 5:
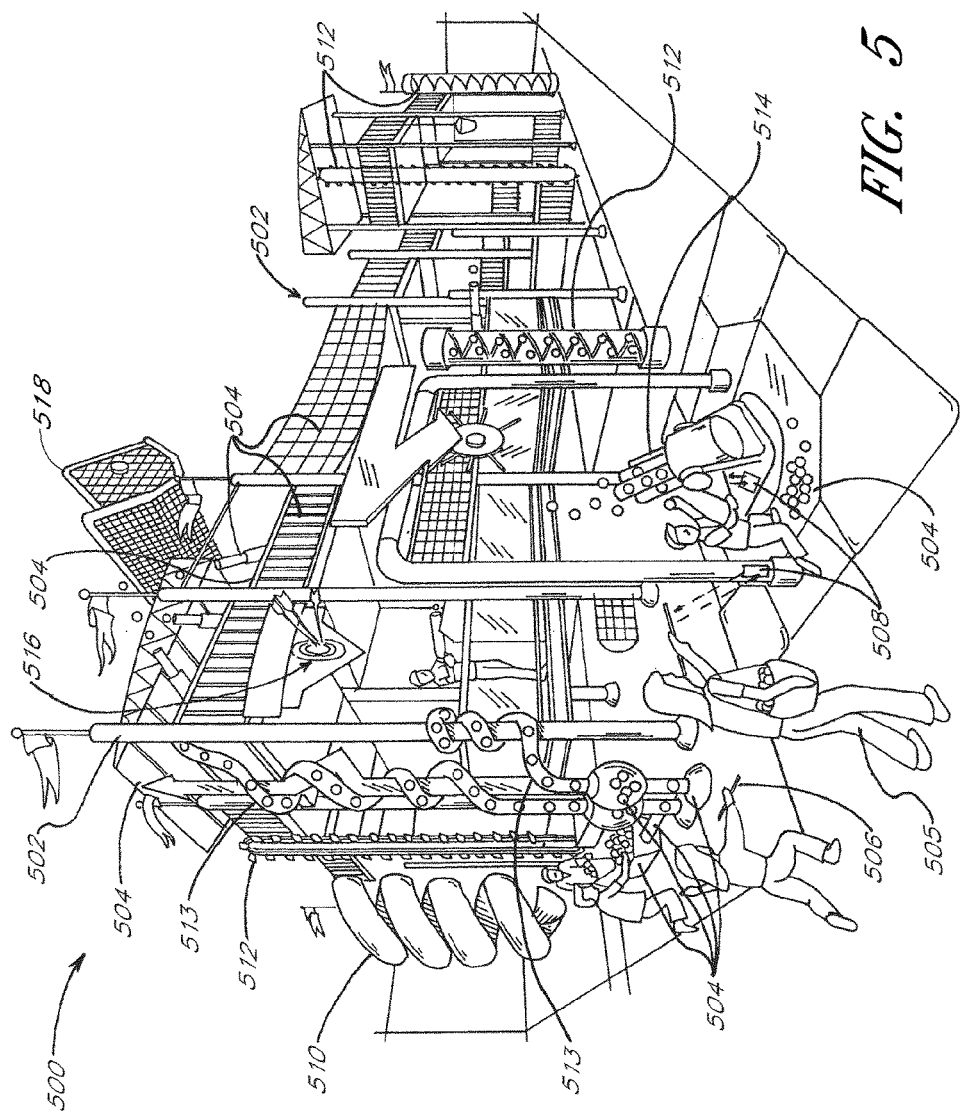
FIG. 5 is a perspective view of a play structure that incorporates a send/receive radio frequency system to track participants in the play structure.

FIG. 5 shows a play structure 500 suitable for use in a Links facility as a play element, module, or arena. The play structure has a supporting framework 502 and a variety of play equipment 504 mounted on or around the play structure 500. Participants 505 carry a Links indicium 506 (wand, sword, ring, etc.) while playing at or near the play structure 500.

A send/receive radio frequency ("SRRF") system is provided to facilitate an interface between the Links indicia 506 and the central Links system. The SRRF system comprises (1) an indicium 506 carried by a Links participant 505, (2) a network of fixed transceivers 508 installed throughout the play structure 500 or other Links facility, (3) a standard LAN communications system, and (4) a master computer system (possibly the central Links system itself) interfaced to the transceiver network.

Preferably, the indicium 506 and transceiver 508 use a novel SRRF communications protocol. SRRF is an RF-based communications technology and protocol that allows pertinent information and messages to be sent and received to and from two or more SRRF compatible devices or systems. While the specific embodiments described herein are specific to RF-based communication systems, those skilled in the art will readily appreciate that the broader interactive play concepts taught herein may be realized using any number of commercially available 2-way and/or 1-way medium range wireless communication devices and communication protocols such as, without limitation, infrared-, digital-, analog, AM/FM-, laser-, visual-, audio-, and/or ultrasonic-based systems, as desired or expedient.

The SRRF system can preferably send and receive signals up to 40-100 feet between indicia 506 and the fixed transceivers 508. The system is preferably able to associate an indicium with a particular zone as defined by an indicium activation area approximately ten to fifteen feet in diameter. Different transceiver and antenna configurations can be utilized depending on the SRRF requirements for each play station or element. The SRRF indicia 506 and transceivers are 508 networked throughout the play structure 500 or other facility. These transceivers 508 can be hidden in or integrated into the facility's infrastructure, such as the walls, floors, ceilings and play element equipment. Therefore, the size and packaging of these transceivers is not particularly critical.

In a preferred embodiment, an entire entertainment facility is configured with SRRF technology to provide a master control system for an interactive entertainment play environment using SRRF-compatible indicia and/or tracking devices. A typical entertainment facility provided with SRRF technology may allow 300-400 or more participants to more-or-less simultaneously send and receive electronic transmissions to and from the master control system using an indicium or other SRRF-compatible tracking device.

In particular, the SRRF system uses a software program and database that can track the locations and activities of up to a hundred or more participants. This information is then used to adjust the play experience for the participant based on "knowing" where the participant/player has been, what objectives that player has accomplished and how many points or levels have been reached. The system can then send messages to the participant throughout the play experience. For example, the system can allow or deny access to a participant into a new play element/module/arena based on how many points or levels have been reached by that participant and/or based on what objectives that participant has accomplished or helped accomplish. It can also indicate, via sending a message to the participant, the amount of points or specific play objectives necessary to complete an element, module, etc. or enter the next level of play. The master control system can also send messages to the participant from other participants.

The system is preferably sophisticated enough that it can allow multiple participants to interact with each other, adjusting the game instantly. The master system can also preferably interface with digital imaging and/or video capture so that the participants' activities can be visually tracked. Thus any participant can locate another participant either through the video capturing system or by sending a message to another device. At the end of a visit, participants are informed of their activities and the system interfaces with printout capabilities to provide a hard copy thereof.

Suitable embodiments of the SRRF technology described above may be obtained from a number of suitable sources, such as AXCESS, Inc. and, in particular, the AXCESS active RFID network system for asset and people tracking applications. In another preferred embodiment the system comprises a network of fixed transceivers 508 installed at specific points throughout a Links facility. Participants are outfitted or provided with a reusable indicium 506—a standard AXCESS personnel tag clipped to their clothing in the upper chest area. As each participant enters a specific interactive play area or "game zone" within the facility, the participant's indicium 506 receives a low frequency activation signal containing a zone identification number (ZID). The indicium 506 then responds to this signal by transmitting both its unique token/indicium identification number (TID) along with the ZID, thus identifying and associating the participant with a particular zone.

The indicium's transmitted signal is received by a transceiver 508 attached to a data network built into the facility. Using the data network, the transceiver 508 forwards the TID/ZID data to a host computer system. The host system uses the SRRF information to log/track the guest's progress through the facility while interfacing with other interactive systems within the venue. For example, upon receipt of a TID/ZID message received from Zone 1, the host system may trigger a digital camera focused on that area, thus capturing a digital image of the player which can now be associated with both their TID and the ZID at a specific time.

In this manner the SRRF technology allows the master control system to uniquely identify and track people as they interact with Links games and activities in a semi-controlled play environment. Optionally, the system may be configured for two-way messaging to enable more complex interactive gaming concepts.

The indicium 506 may also include the ability to produce light, vibration or other sound effects based on signals received through the SRRF module. In a more advanced implementation, the indicium 506 may be configured such that it is able to display preprogrammed messages of up to 50 characters on a LCD screen when triggered by participant action (e.g. button) or via signals received through the SRRF module. This device is also preferably capable of displaying short text messages transmitted over the SRRF wireless link from another Links device.

Preferably, the SRRF transceiver 508 is capable of supporting medium range (10-40 feet) two-way communications between SRRF indicia and a host system, such as a PC running special Links software. This transceiver 508 has an integral antenna and interfaces to the host computer through a dedicated communication port using industry standard RS232 serial communications. It is also desirable that the SRRF transmission method be flexible such that it can be embedded in television or radio signals, videotapes, DVDs, video games and other media, stripped out and re-transmitted using low cost components. The exact method for transposing these signals, as well as the exact interface between the home transceiver and common consumer electronics (i.e. TVs, radios, VCRs, DVD players, A/V receivers, etc.) is not particularly important, so long as the basic functionality as described above is achieved. The various components needed to assemble such a SRRF system suitable for use with the present invention are commercially available and their assembly to achieve the desired functionality described above can be readily determined by persons of ordinary skill in the art. If desired, each SRRF transceiver 508 may also incorporate a global positioning ("GPS") device to track the exact location of each play participant within one or more play environments.

Most desirably, a SRRF module can be provided in "chip" form to be incorporated with other electronics, or designed as a packaged module suitable for the consumer market. If desired, the antenna can be embedded in the module, or integrated into the toy and attached to the module. Different modules and antennas may be required depending on the function, intelligence and interfaces required for different devices. A consumer grade rechargeable or participant replaceable battery may also be used to power both the SRRF module and associated toy electronics.

Links Indicium

Preferably, a transmitter/receiver utilizing the SRRF technology is provided in a small and portable package that can be carried or worn by play participants. Most preferably, the SRRF transmitter/receiver is incorporated into or embodied in a Links indicium 506 that can be operated by play participants by waving, shaking, stroking and/or tapping it in a particular manner to actuate a particular desired function or effect. These operational aspects must be learned by play participants as they train in the various play environments. The ultimate goal, of course, is to become a "grand wizard" or master of the indicium 506. This means that the play participant has learned and mastered every aspect of operating the indicium 506 to produce desired effects within each play environment. Of course, additional effects and operational nuances can (and preferably are) always added in order to keep the interactive experience fresh continually changing.

Optionally, the indicium 506 or other SRRF device is configured so that it is able to display 50 or more characters on a LTD or LCD screen. Similarly, the indicium 506 or other SRRF compatible device may also be configured to display desired light, vibration and/or sound effects in order to complement the operation of the indicium and/or the effects achieved. Optionally, the SRRF protocol can use a transmission that can be adapted to computer software, television and video programming so that the SRRF system can be easily implemented using TV, radio and/or computer software. For example, a Links indicium 506 instrumented with SRRF technology can interact with a Links software program running on a PC connected to a SRRF transceiver.

FIG. 5 also depicts a variety of play equipment which may be used in creating a Links play element, structure, or arena. This equipment includes a slide 510, ball conveyors 512, ball distribution conduits 513, ball cannon 514, a projectile target 516, and ball collection nets 518.

Interactive Play Systems

Figure 6:
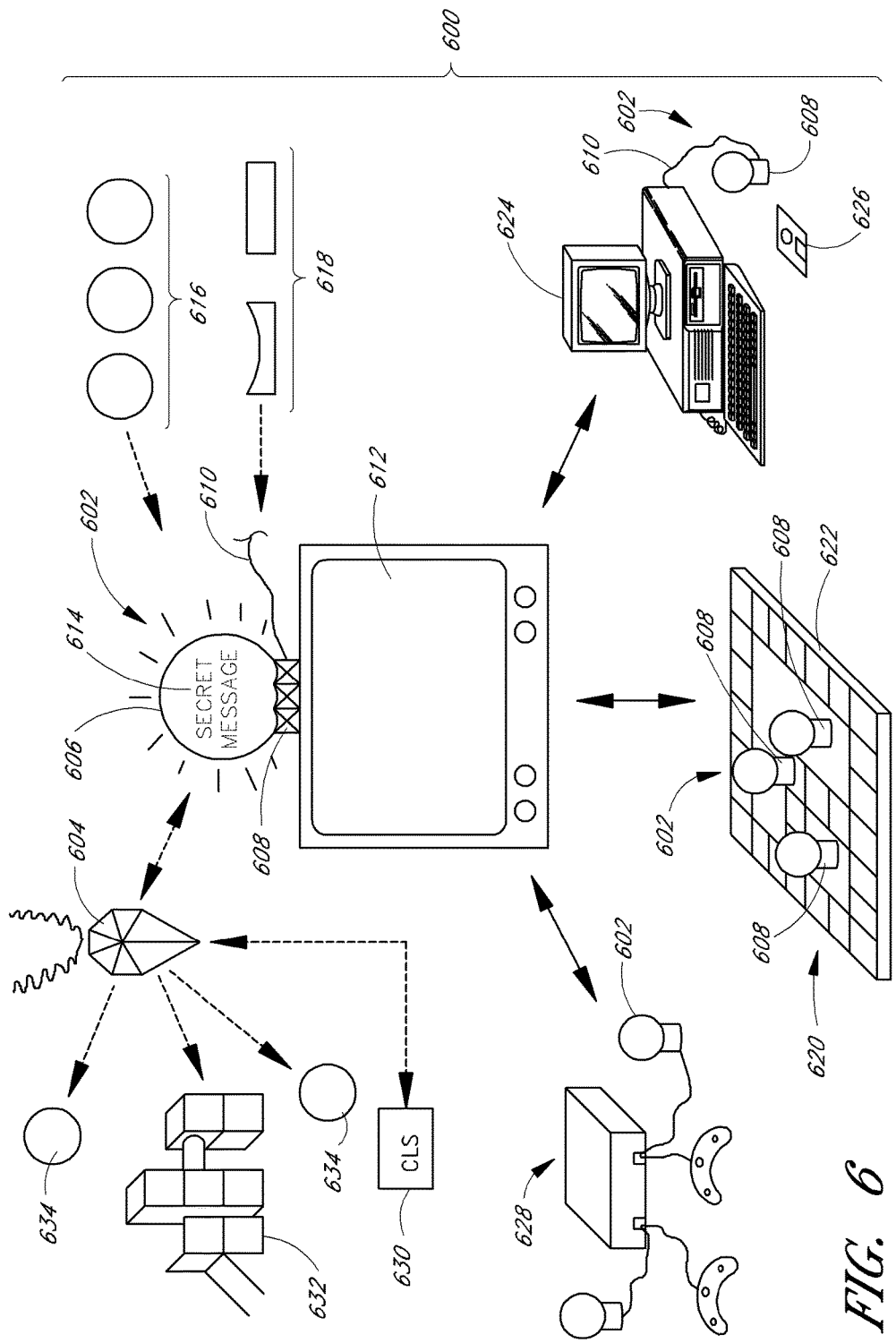
FIG. 6 is a schematic view of an interactive play system having features in accordance with another preferred embodiment of the invention.

FIG. 6 depicts another preferred embodiment of an interactive play system 600 having features in accordance with the invention. This play system 600 incorporates a simulated crystal ball assembly 602 and/or a crystal necklace 604 that serve as a Links indicium within the play system 600. The crystal ball assembly 602 comprises a crystal ball 606 that serves as a visual communication device, and a transmitter/receiver in the form of a base 608. The ball 606 and base 608 are connected so that signals received by the base 608 can be displayed as alphanumeric, graphic or other types of information on or in the ball 606. The base 608 can receive signals through a base interface 610 that preferably comprises one or more of an RF airwave receiver, coaxial cable, modem, ethernet, or serial connection, or any other type of data/signal connection known to those skilled in the art. The base interface 610 may connect the base 608 to a television 612 as one way of using the crystal ball assembly in conjunction with the Links interactive television show detailed above. The base 608 preferably has a memory device (not shown) in the form of a standard RAM chip or chip set, flash memory, magnetic or optical disk, or any other suitable memory device known to those skilled in the art. The memory device may record all previous play activities of the participant to facilitate the assignment of a skill or experience level or a set of attributes, a point total, etc. to the participant or the participant's character, corresponding to the activities completed. This earned/assigned skill level, attribute set, etc. may in turn be recorded on the base memory device.

The television 612 is one example of a play medium that is usable with the crystal ball assembly 602. At a predetermined time, for example several minutes, before the Links television show begins, the base 608 receives a signal from the television or from some other signal or data connection. Upon receipt of the signal the base 608 causes the ball 606 to glow (for example) and subsequently display a secret message 614. The secret message 614 may impart certain knowledge to the person watching the program about events that will happen or have already happened that will assist and guide the person through specific adventures, activities, or actions. Upon completion of these or of other actions within a Links game, the participant may obtain additional or more advanced versions 616, 618 of the crystal ball and/or base 618. These more advanced versions may have special abilities beyond the basic versions 606, 608 used previously.

The advanced versions 616, 618 of the ball/base, as well as an updated/enhanced participant level or skill set, facilitate repeat value of a given episode of the Links television show. When a repeat episode is broadcast, a participant who has reached a new level or obtained the upgraded ball/base, will receive a different secret message 614 on the ball/base. The new secret message may contain additional secret information needed to continue in the Links game or adventure, thereby potentially casting the events occurring on the Links television show in an entirely new light.

In addition to engaging in play activities with the television, the participant may take the crystal ball assembly 602 to another location or activity and continue the adventure or actions in a new play medium. The secret-message feature of the crystal ball 606 may be used to direct the participants to one or more of these additional play media or locations. In the new play medium/location the participant can exploit the skills and attributes that have been added, by the completion of prior activities, to her crystal ball assembly/other Links indicium/character. These skills and attributes are thus used in the new medium or location to further the participant's actions in another environment.

One example of such a play medium is a board game 620 in which the participant places her crystal ball assembly 602 on a board 622 next to those belonging to other participants. The bases 608 of each assembly can then communicate with each other to assist or hinder other players in the board game 620. The outcome of the game may then be decided in part by the information that each crystal ball assembly 602 gained while engaging in one of the prior Links activities, or from one of the other assemblies during the board game. For example, a first player's base 608 might send information to a second player's base providing clues to questions or choices that the second player will encounter later in the game. These "clues" may be true (actual clues) or false (bluffs), depending on prior achievements of the first or second player in earlier Links activities, as recorded in his base 608. Or the second player may be able to "call" the "bluff" if he has gained certain knowledge in earlier Links activities.

Another suitable play medium is a computer game, internet chat room, or internet game. In this play medium the crystal ball assembly 602 or other Links indicium is connected to a computer 624 via the base interface 610 or other suitable connection such as a port connection of the type used to connect a keyboard or mouse to the computer 624. Software 626 may be obtained that allows the participant to expand the capabilities of the base 608 or a character associated with the participant by engaging in and completing various activities and challenges on the computer/internet.

A console-type video game 628 is another play medium that may be used with the crystal ball assembly 602, or other Links indicia as detailed above. One or more crystal ball assemblies 602 are connected to the video game 628 via the base interface 610 or other suitable connection. In the video game 628 the participant can further use and develop the skills and attributes gained in prior activities, by participating in a game designed specifically for use with Links and the crystal ball assembly or other Links indicia.

To participate in Links activities in other play media, a participant may be required to travel to different locations, such as Links facilities, play arenas, restaurants, etc. The secret-message feature of the crystal-ball assembly 602 may be used to direct the participant to a "training center" or some other Links facility for skill development, new experiences, etc. Other remote locations include a library or government facility, theme park, family entertainment center, shopping mall, store, etc., that is equipped with electronics supporting Links. To facilitate this travel, the participant might upload the necessary information from the crystal ball assembly or other Links indicium to a more portable Links indicium such as the crystal necklace 604, a radio-frequency card, a magnetic-strip card, or a standard RAM or flash-memory chip small enough to be placed in an item that can be attached to clothing, worn, or placed in a pocket. The crystal necklace 604 or other portable Links indicium is preferably small enough to be easily carried or worn by the participant, but large enough to contain the necessary electronics to interface with the crystal ball assembly 602 and the Links system at a Links facility or other remote location.

When the participant reaches the Links facility, he or she interfaces the crystal necklace 604 or other portable Links indicium with the central Links system 630 (or portion of the central Links system) that serves the Links facility in question. This interface is preferably accomplished by presenting the crystal necklace, swiping a card, plugging in a memory-chip device, etc. Thus the participant/character experience level, attributes skills, points, etc. are transferred to the central Links system 630. These data are used by the central Links system to affect game parameters and outcomes for the participant as he engages in a series of Links play elements in a play structure or arena 632 or other Links play media 634 housed in the Links facility. Alternatively, the participant may purchase or consult a "magic book" or other item at the facility that contains secret knowledge or tricks to be used later in the game, or in operation of the crystal-ball assembly 602. The results of, and experience, points, skills, etc. gained in, the play elements or other experiences are then uploaded to the crystal necklace or other portable Links indicium when the participant exits the Links facility. The updated data could then also be transferred from the crystal necklace 604, etc. to the crystal ball assembly 602.

A further aspect of the play system 600 may be a defined ultimate goal, such as reaching a certain status known as GAMEMASTER, or to earn an appearance on the Links television show. Upon reaching this goal, the participant may be presented with the further goal of becoming one of the best players on the show, either for a given season or for all time.

Figure 7:
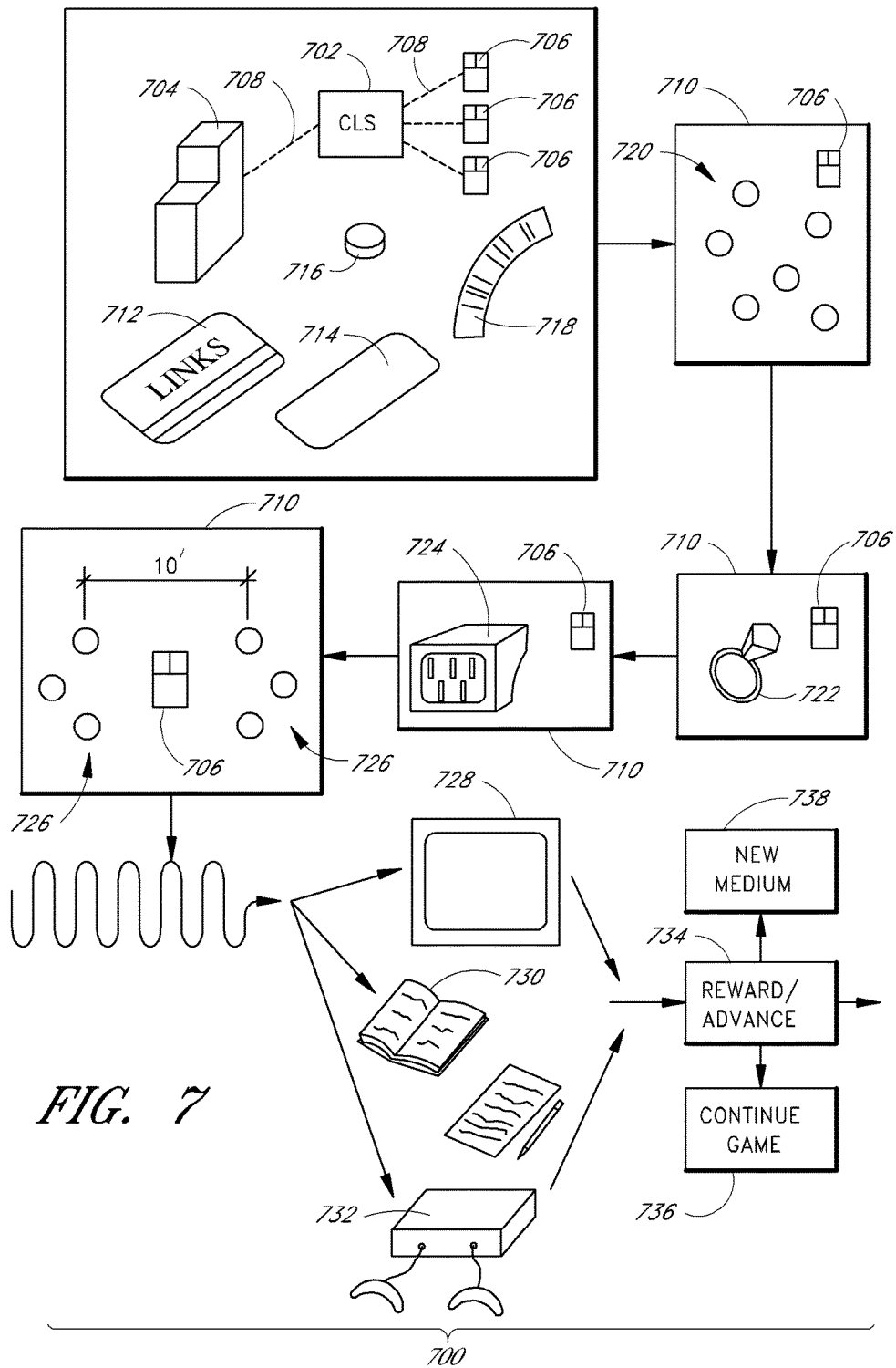
FIG. 7 is a schematic view of an interactive play system having features in accordance with another preferred embodiment of the invention.

FIG. 7 depicts another preferred embodiment of an interactive play system 700. The play system 700 comprises in part a central Links system 702 that is connected to one or more entrance terminals 704 and a number of local terminals 706 via a series of data links 708. The local terminals 706 are each situated in or near a Links play element 710, a series of which make up a Links play module or arena. The data links 708 preferably comprise serial connections such as RS232 or RS485, ethernet or modem connections, or any other suitable network links for communicating data. Any of these links may be hardwired or may have intervening RF connections.

Each participant is issued a Links indicium in the form of a magnetic strip card 712, a radio-frequency card 714, an I-button 716 or a barcoded wristband 718. The entrance terminal 704 may sell/issue the indicium to new participants and query them on information such as the participant's name, age (used to set difficulty levels, etc.), vital statistics and preferences. These data are then added to a record created for the participant in the central Links system 702 and/or on the indicium itself. Returning participants present their indicia to be read by the entrance terminal 704, which receives data from the indicium. Where the indicium comprises a magnetic-strip card 712, the card is presented to the entrance terminal by (for example) swiping the card through a card reader built into the entrance terminal 704. The data received by the entrance terminal preferably allows it to identify the participant with a record maintained in the central Links system 702 of the participant's skill/experience level, character type/attributes, points, achievements, etc. Alternatively, the received data may comprise this entire record itself.

The play elements 710 preferably define a path along which the participant proceeds after completion of the necessary activities at the entrance terminal 704. Each play element 710 has an associated local terminal 706. Upon the successful completion of each play element, the participant swipes her card 712 or otherwise presents her indicium to be read by the local terminal 706. Depending on the participant's performance in the play element, the local terminal 706 and/or central Links system 702 awards the participant a certain amount or type of experience, points, character attributes, etc.

One play element contemplated for use in the play system 700 requires the participant to push a group of colored buttons 720 in a particular sequence. Successful completion of this task could earn the participant 50 points. In another play element, the participant must find a hidden object such as a piece of jewelry 722. Points may be awarded for simply finding the object or based on the amount of time needed to find it. Another play element requires the participant to answer trivia questions that are presented on a touchscreen device 724. Still another play element involves two or more participants who must work together by pressing a series of buttons 726 simultaneously and in the correct order. Preferably, more points are awarded at such play elements where multiple participants must complete activities together.

At some point during the play sequence, the participant may arrive at a point where he preferably cannot proceed without additional input or information from outside the particular play environment, be it a Links facility or other area that supports Links technology. The participant is then required to visit another play environment or watch a television show 728 to find clues or hints to a question or riddle. The participant may also be required to research a particular subject in books 730 in a library, or play a video game 732 and achieve certain objectives. Once the assigned task is completed, the participant receives a reward 734 and is given the choice of continuing the game 736 or advancing to another play medium 738 to experience the game in a different way. In this manner, the Links system advantageously encourages play participants to engage in different activities and enjoy other experiences.

Figure 8:
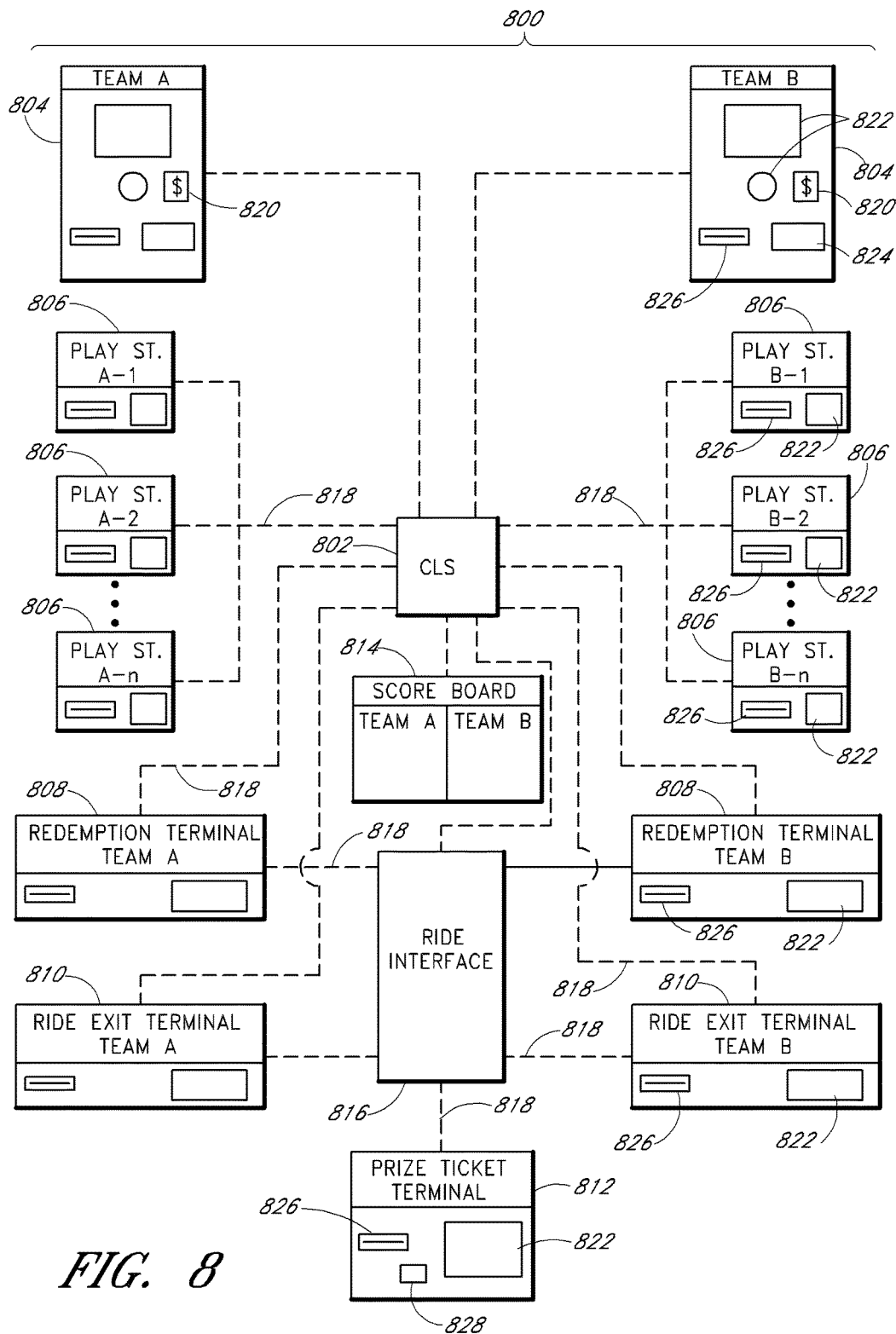
FIG. 8 is a schematic view of an interactive play system having features in accordance with another preferred embodiment of the invention.

FIG. 8 depicts another preferred embodiment of an interactive play system 800. The play system 800 may serve as an interactive addition to a theme-park ride, to provide interactive play to participants waiting in line to board the ride. However, this play system 800 can also be a stand-alone attraction to provide an advanced "treasure hunt" game, with no reference (in terms of points or other performance rewards) to any subsequent ride or attraction.

The play system 800 includes a central Links system 802 which is connected to two or more entrance terminals 804 and to two or more sets of local terminals 806. The central Links system 802 is also connected to two or more redemption terminals 808, two or more ride exit terminals 810, a prize ticket terminal 812, a scoreboard 814, and a ride interface 816. The ride interface 816 is also connected to the redemption terminals 808, the ride exit terminals 810 and the prize ticket terminal 812. A series of data links 818 provides the connections between the central Links system 802 and the other components of the play system 800. The data links 818 preferably comprise serial connections such as RS232 or RS485, ethernet or modem connections, or any other suitable network links. Any of these data links may be hardwired or may have intervening RF connections. The play system 800 is depicted as having a number of mostly direct data links 818 from the various terminals, etc. to the central Links system 802. However, it will be appreciated that the present invention comprehends other patterns for interconnecting the various devices making up the play system 800, so long as the resulting network supports the necessary communications among the devices. For example, a token-ring system could be used, or intervening hubs or controllers could be interposed to handle communications between the central Links system 802 and a number of grouped devices, such as the local terminals 806 serving Team A.

The central Links system 802 preferably comprises a PC server having an advanced Pentium® processor or equivalent. The server should be Fast Ethernet capable with a 56K modem and at least two RS232 ports. An 8 point Fast Ethernet hub is preferred for interlinking the central Links system with some or all of the outlying devices in the play system 800.

The central Links system 802 preferably maintains a database of participant records and other information relevant to operation of the play system 800. For each current participant, the database contains a record that may comprise some or all of the following: first name, last name, a participant "unique key," age, total point score, points available for redemption, and play station visit information (including numbers of stations visited number and corresponding time stamps). A similar record of historical data may be maintained for past participants, for a predetermined time period such as one year. An all-time top-10 database may be maintained, with a record maintained for each member of the top-10 having some or all of the following fields: rank number, first name, last name, an all-time top-10 "unique key," age, total point score, and date. The corresponding records in a daily top-10 database have some or all of the following fields: rank number, first name, last name, a daily top-10 "unique key," age, and total point score.

The play system 800 contemplates an initial division of participants into two teams, Team A and Team B. One alternative player division involves a LOONEY TUNES theme and divides players into Roadrunners and Coyotes. Thus the system includes two or more entrance terminals 804, one for each team of participants. Each entrance terminal 804 accepts the required amount of money from a new participant and queries the participant for personal data such as name, age, etc. The entrance terminal 804 includes a coin/bill acceptor 820 to receive the money and appropriate I/O devices 822 such as a monitor, keyboard, speaker, touchscreen, etc., to communicate with the participant. When this payment/data-entry stage is complete the entrance terminal 804 issues the new participant a Links indicium such as a magnetic-strip card with the participant's name and other data recorded on it. The magnetic-strip card is presented to the participant via a card dispenser 824. The participant data is passed to the central Links system 802 for the creation of a record for that participant. A repeat participant swipes his magnetic card in a Links card reader 826 built into or connected to the entrance terminal 804 to register as a member of Team A or Team B and begin play. The repeat participant may also be required to insert money into the coin/bill acceptor 820.

The local terminals 806 are located in one or more play areas to which the participants proceed after interacting with the entrance terminal 804. The embodiment shown in FIG. 8 is set up to handle two separate teams of participants; however, the local terminals can be located in a single play area for all participants where there is no division into teams, or in three or more areas as necessary. Here, the play areas for each of Team A and Team B have a number n of local terminals 806 that are associated with a like number of play stations A-1 . . . A-n, and B-1 . . . B-n. In one preferred embodiment n=9, so that each play area has 9 local terminals 806 and corresponding play stations. Preferably, within the play area each local terminal 806 is in a hidden location so that the participant's task is to find all of (or as many as possible of) the local terminals 806, or hidden objects adjacent the local terminal. Alternatively, each local terminal is associated with a play station or play element comprising one or more of the interactive play elements disclosed above. A preferred layout for the play area has the local terminals 806 positioned on platforms that are located from 5 to 40 feet apart and interconnected with nets, bridges, ladders and slides.

Upon successfully finding a local terminal 806 or otherwise completing the play element at the play station associated with the local terminal, the participant swipes her magnetic-strip card in a Links card reader 826 in the local terminal 806. The local terminal 806 passes the participant information to the central Links system 802 for validation and ascertainment that a required time interval has passed since the last time the participant visited the station. If these requirements are met, the local terminal 806 plays a short audiovisual presentation, preferably in the form of an audio message indicating that the participant has just received 50 points and the illumination of a green LED, on I/O devices 822 in the local terminal 806. Of course, other audiovisual presentations, such as a short video or computer animation displayed on a monitor screen, a light show, etc. are possible as well.

The participant accumulates a number of points by finding as many of the local terminals 806 as possible, or otherwise successfully completing the associated play elements. Preferably, signs are posted near the local terminals 806 and elsewhere in the play area that detail the benefits or "power-ups" that the participant receives at the end of the play area for earning a given number of points. These "power-ups" are used by the participant in the ride or attraction associated with the game, to enhance his ride experience or to increase his chances of winning a race (and additional points for victory or beating a set time). Whether the play system 800 has an associated ride or attraction, or functions a stand-alone game, the points may subsequently be used at a booth to purchase prizes.

The participants may purchase the power-ups or other benefits at the redemption terminals 808 located at the end of the play area or at the beginning of the ride. The participant swipes her card in a Links card reader 826 on the redemption terminal 808 and, after the central Links system validates the participant's identification, her total points and other data are displayed via appropriate I/O devices 822. The participant selects one or more of the power-ups for which she is eligible, preferably by pressing one or more of a series of buttons incorporated in the I/O devices 822. The redemption terminal 808 displays the selections made by the participant, who can choose to accept the selections or clear them and start over, by pressing appropriate buttons. When the final power-up selections have been made, the redemption terminal 808 communicates them to the ride interface 816, which causes the ride control system (not shown) to implement the participant's powerups while the participant is on the ride, providing her with additional capabilities or experiences corresponding to the selected powerups. To confirm the selection of powerups, the I/O devices 822 may play a short audio or audiovisual presentation.

Upon completion of the ride, the participant may earn additional points depending on how the participant places in a race or whether the participant beats a predetermined time standard. Thus, at the ride exit terminal, the participant swipes his card in the Links card reader 826 and is awarded a certain number of points corresponding to his performance in the ride. The ride exit terminal may acquire performance and/or points data from the ride interface 816 or the central Links system 802. To confirm the points award, the I/O devices 822 may play a short audio or audiovisual presentation.

At the prize ticket terminal 812 the participant may convert his earned points into prize tickets or other currency that may be used to purchase prizes, or directly into prizes. The prize ticket terminal 812 is equipped with a Links card reader 826, I/O devices 822 to facilitate communication with the participant, and a ticket dispenser 828.

The scoreboard 814 interfaces with the central Links system 802 and can display a variety of statistics to enhance the participants' enjoyment of the game. The displayed statistics may include: an all-time top 10, today's top 10, each team's current point total, points earned by individual members of each team, or any combination of these statistics. The scoreboard 814 may display each of these in turn for a predetermined time interval, or occasionally flash funny or encouraging messages or graphics. The scoreboard 814 may comprise a centralized display or a number of individual displays distributed throughout the play area.

One of skill in the art will appreciate that the play system 800 can be re-configured to support a stand-alone, advanced "treasure hunt" or similar game. To facilitate this game, the central Links system 802 is preferably connected to one entrance terminal 804, one set of local terminals 806 and, optionally, one exit terminal 810 and one scoreboard 814. In the "treasure hunt" game the participants pass through the entrance terminal 804 in the usual manner to the play area, where they must locate the local terminals 806 or hidden objects nearby. The participants swipe their cards in the local terminals 806 in the usual manner to accumulate points. When finished, the participants may visit the exit terminal 810 to claim a final total of points.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A multi-media interactive play system for playing a game carried out in both a physical play environment and a computer-simulated play environment, said multi-media interactive play system comprising:
    a plurality of radiofrequency (RF) transceivers disposed within a physical play environment, each said RF transceiver configured to provide two-way wireless communications with a user-wearable tracking device;
    a first game module comprising computer-executable instructions that, when executed, instruct a first computer to carry out a first interactive gaming experience conducted within said physical play environment, wherein said plurality of RF transceivers are used to track the physical locations or movements of a play participant wearing said user-wearable tracking device, and wherein said first game module causes said first computer to generate a first selection of game progress information for said play participant in accordance with said first interactive gaming experience;
    a second game module comprising computer-executable instructions that, when executed, instruct a second computer to carry out a second interactive gaming experience conducted within a computer-simulated play environment displayed on a display device, and wherein said second game module causes said second computer to generate a second selection of game progress information for said play participant in accordance with said second interactive gaming experience; and
    a network-accessible data storage system that is configured to receive, via a computer network connection, said first selection of game progress information from said first computer and said second selection of game progress information from said second computer, and wherein said data storage system is configured to create or update an overall progress record for said play participant based at least in part on said first and second selections of game progress information.

2. The multi-media interactive play system of claim 1, wherein said physical play environment comprises at least one of an entertainment facility, restaurant, and retail store, and wherein said first interactive gaming experience comprises at least one of a quest, treasure hunt and scavenger hunt, carried out at least in part within said at least one of entertainment facility, restaurant, and retail store.

3. The multi-media interactive play system of claim 1, wherein said plurality of RF transceivers are communicatively coupled to at least said first computer and are each configured to provide two-way wireless communications with said user-wearable tracking device over a limited communication range of less than 100 feet.

4. The multi-media interactive play system of claim 1, further comprising a camera disposed within said physical play environment and communicatively coupled to said first computer, and wherein said first game module comprises additional computer-executable instructions that, when executed, cause said camera to capture a digital image of said play participant.

5. The multi-media interactive play system of claim 4, wherein said first game module further comprises additional computer-executable instructions that, when executed, cause said digital image to be stored in said data storage system in association with a unique identifier.

6. The multi-media interactive play system of claim 1, wherein said second game module further comprises additional computer-executable instructions that, when executed, instruct the second computer to: (i) receive a selection of a game character to represent said play participant in said game, (ii) receive a selection of one or more attributes of said game character, and (iii) generate for display on said display device an image of said game character having said selected attributes.

7. The multi-media interactive play system of claim 1, wherein said second game module further comprises additional computer-executable instructions that, when executed, instruct the second computer to: (i) receive a selection of a virtual game character to represent said play participant in said computer-simulated play environment, (ii) receive a selection of one or more attributes of said virtual game character, and (iii) generate for display on said display device an image of said virtual game character having said selected attributes.

8. An entertainment system for playing an interactive game that combines elements of physical play and virtual play, said entertainment system comprising:
    a plurality of radiofrequency (RF) transceivers disposed within a physical play environment, each said RF transceiver configured to provide two-way wireless communications with a user-wearable tracking device;
    a first computer communicatively coupled to said plurality of RF transceivers and comprising a first set of computer-executable instructions that, when executed, instruct said first computer to carry out a first interactive gaming experience comprising wirelessly tracking the physical locations or movements of a game participant wearing said user-wearable tracking device, and generating a corresponding first selection of game progress information;
    a second computer communicatively coupled to said first computer and comprising a second set of computer-executable instructions that, when executed, instruct said second computer to carry out a second interactive gaming experience comprising tracking the progress of a virtual game character in a computer-simulated play environment displayed on a display device, and generating a corresponding second selection of game progress information; and
    a network-accessible data storage system that is configured to receive, via a computer network connection, said first selection of game progress information from said first computer and said second selection of game progress information from said second computer, and wherein said data storage system is configured to create or update an overall progress record for said game participant based at least in part on said first and second selections of game progress information.

9. The entertainment system of claim 8, wherein said physical play environment comprises at least one of an entertainment facility, restaurant, and retail store, and wherein said first interactive gaming experience comprises at least one of a quest, treasure hunt, and scavenger hunt carried out at least in part within said at least one of entertainment facility, restaurant, and retail store.

10. The entertainment system of claim 8, wherein each said RF transceiver is configured to provide two-way wireless communications with said user-wearable tracking device over a limited communication range of less than 100 feet.

11. The entertainment system of claim 8, further comprising a camera disposed within said physical play environment and communicatively coupled to said first computer, and wherein said first set of computer-executable instructions, when executed, cause said camera to capture a digital image of said game participant.

12. The entertainment system of claim 11, wherein said first set of computer-executable instructions, when executed, cause said digital image to be stored in said data storage system in association with a unique identifier.

13. The entertainment system of claim 8, wherein said second computer further comprises an additional set of computer-executable instructions that, when executed, instruct said second computer to: (i) receive a selection of said virtual game character, (ii) receive a selection of one or more attributes of said virtual game character, and (iii) generate for display on said display device an image of said virtual game character having said selected attributes.

14. The entertainment system of claim 8, further comprising a scoreboard disposed within said physical play environment that displays said overall progress record for said game participant and/or other game participants.

15. An entertainment facility for playing an interactive game that combines elements of both physical play and virtual play, said entertainment facility comprising:
a plurality of radiofrequency (RF) transceivers disposed within said entertainment facility, each said RF transceiver configured to provide two-way wireless communications with a user-wearable tracking device;
a first computer communicatively coupled to said plurality of RF transceivers and comprising a first set of computer-executable instructions that, when executed, instruct said first computer to carry out a first portion of said interactive game comprising tracking the physical locations or movements of a game participant wearing said user-wearable tracking device, and generating a corresponding first selection of game progress information;
a second computer communicatively coupled to said first computer and comprising a second set of computer-executable instructions that, when executed, instruct said second computer to carry out a second portion of said interactive game comprising tracking the virtual locations or movements of a virtual game character in a computer-simulated play environment, and generating a corresponding second selection of game progress information; and
a data storage system that is configured to receive, via a computer network connection, said first selection of game progress information from said first computer and said second selection of game progress information from said second computer, and wherein said data storage system is configured to create or update an overall progress record for said game participant based at least in part on said first and second selections of game progress information.

16. The entertainment system of claim 15, wherein said first portion of said interactive game comprises a quest, treasure hunt or scavenger hunt carried out at least in part within said entertainment facility.

17. The entertainment system of claim 15, wherein each said RF transceiver is configured to provide two-way wireless communications with said user-wearable tracking device over a limited communication range of less than 100 feet.

18. The entertainment system of claim 15, further comprising a camera communicatively coupled to said first computer, and wherein said first set of computer-executable instructions, when executed, cause said camera to capture a digital image of said game participant.

19. The entertainment system of claim 18, wherein said first set of computer-executable instructions further comprises additional computer-executable instructions that, when executed, cause said digital image to be stored in said data storage system in association with a unique identifier.

20. The entertainment system of claim 15, wherein said second computer further comprises an additional set of computer-executable instructions that, when executed, instruct said second computer to: (i) receive a selection of said virtual game character, (ii) receive a selection of one or more attributes of said virtual game character, and (iii) generate for display on a display device an image of said virtual game character having said selected attributes.

* * * * *